(12) United States Patent
Nishijima et al.

(10) Patent No.: US 9,477,294 B2
(45) Date of Patent: Oct. 25, 2016

(54) MICROCONTROLLER AND METHOD FOR MANUFACTURING THE SAME

(71) Applicant: Semiconductor Energy Laboratory Co., Ltd., Atsugi-shi, Kanagawa-ken (JP)

(72) Inventors: Tatsuji Nishijima, Kanagawa (JP); Hidetomo Kobayashi, Kanagawa (JP); Tomoaki Atsumi, Kanagawa (JP); Kiyoshi Kato, Kanagawa (JP); Shunpei Yamazaki, Tokyo (JP)

(73) Assignee: Semiconductor Energy Laboratory Co., Ltd., Atsugi-shi, Kanagawa-ken (JP)

( * ) Notice: Subject to any disclaimer, the term of this patent is extended or adjusted under 35 U.S.C. 154(b) by 185 days.

(21) Appl. No.: 14/055,200

(22) Filed: Oct. 16, 2013

(65) Prior Publication Data

US 2014/0108836 A1   Apr. 17, 2014

(30) Foreign Application Priority Data

Oct. 17, 2012   (JP) .................................. 2012-230352

(51) Int. Cl.
*G06F 1/32*   (2006.01)

(52) U.S. Cl.
CPC ........... *G06F 1/3275* (2013.01); *G06F 1/3206* (2013.01); *G06F 1/3243* (2013.01); *G06F 1/3287* (2013.01); *Y02B 60/1239* (2013.01); *Y02B 60/1282* (2013.01)

(58) Field of Classification Search
CPC .. G06F 1/3275; G06F 1/3206; G06F 1/3243; G06F 1/3287; Y02B 60/1239; Y02B 60/1282
See application file for complete search history.

(56) References Cited

U.S. PATENT DOCUMENTS

| | | |
|---|---|---|
| 5,528,032 A | 6/1996 | Uchiyama |
| 5,731,856 A | 3/1998 | Kim et al. |
| 5,744,864 A | 4/1998 | Cillessen et al. |
| 6,294,274 B1 | 9/2001 | Kawazoe et al. |
| 6,563,174 B2 | 5/2003 | Kawasaki et al. |
| 6,727,522 B1 | 4/2004 | Kawasaki et al. |

(Continued)

FOREIGN PATENT DOCUMENTS

| | | |
|---|---|---|
| CN | 102376584 A | 3/2012 |
| CN | 102668028 A | 9/2012 |

(Continued)

OTHER PUBLICATIONS

Ohara, H et al., "Amorphous In—Ga—Zn—Oxide TFTs with Suppressed Variation for 4.0 inch QVGA AMOLED Display," AM-FPD '09 Digest of Technical Papers, Jul. 1, 2009, pp. 227-230, The Japan Society of Applied Physics.

(Continued)

*Primary Examiner* — Dennis M Butler
(74) *Attorney, Agent, or Firm* — Fish & Richardson P.C.

(57) ABSTRACT

A microcontroller which operates in a low power consumption mode is provided. A microcontroller includes a CPU, a memory, and a peripheral circuit such as a timer circuit. A register in the peripheral circuit is provided in an interface with a bus line. A power gate for controlling supply control is provided. The microcontroller can operate not only in a normal operation mode where all circuits are active, but also in a low power consumption mode where some of the circuits are active. A volatile memory and nonvolatile memory are provided in a register, such as a register of the CPU. Data in the volatile memory is backed up in the nonvolatile memory before the power supply is stopped. In the case where the operation mode returns to the normal mode, when power supply is started again, data in the nonvolatile memory is written back into the volatile memory.

20 Claims, 25 Drawing Sheets

(56) References Cited

U.S. PATENT DOCUMENTS

| | | |
|---|---|---|
| 7,007,180 B2 | 2/2006 | Hashimoto |
| 7,049,190 B2 | 5/2006 | Takeda et al. |
| 7,061,014 B2 | 6/2006 | Hosono et al. |
| 7,064,346 B2 | 6/2006 | Kawasaki et al. |
| 7,105,868 B2 | 9/2006 | Nause et al. |
| 7,211,825 B2 | 5/2007 | Shih et al |
| 7,282,782 B2 | 10/2007 | Hoffman et al. |
| 7,297,977 B2 | 11/2007 | Hoffman et al. |
| 7,323,356 B2 | 1/2008 | Hosono et al. |
| 7,385,224 B2 | 6/2008 | Ishii et al. |
| 7,402,506 B2 | 7/2008 | Levy et al. |
| 7,411,209 B2 | 8/2008 | Endo et al. |
| 7,453,065 B2 | 11/2008 | Saito et al. |
| 7,453,087 B2 | 11/2008 | Iwasaki |
| 7,462,862 B2 | 12/2008 | Hoffman et al. |
| 7,468,304 B2 | 12/2008 | Kaji et al. |
| 7,501,293 B2 | 3/2009 | Ito et al. |
| 7,674,650 B2 | 3/2010 | Akimoto et al. |
| 7,732,819 B2 | 6/2010 | Akimoto et al. |
| 9,054,678 B2 | 6/2015 | Ohmaru et al. |
| 2001/0046027 A1 | 11/2001 | Tai et al. |
| 2002/0056838 A1 | 5/2002 | Ogawa |
| 2002/0132454 A1 | 9/2002 | Ohtsu et al. |
| 2003/0061526 A1 | 3/2003 | Hashimoto |
| 2003/0189401 A1 | 10/2003 | Kido et al. |
| 2003/0218222 A1 | 11/2003 | Wager, III et al. |
| 2004/0038446 A1 | 2/2004 | Takeda et al. |
| 2004/0127038 A1 | 7/2004 | Carcia et al. |
| 2005/0017302 A1 | 1/2005 | Hoffman |
| 2005/0199959 A1 | 9/2005 | Chiang et al. |
| 2006/0035452 A1 | 2/2006 | Carcia et al. |
| 2006/0043377 A1 | 3/2006 | Hoffman et al. |
| 2006/0091793 A1 | 5/2006 | Baude et al. |
| 2006/0108529 A1 | 5/2006 | Saito et al. |
| 2006/0108636 A1 | 5/2006 | Sano et al. |
| 2006/0110867 A1 | 5/2006 | Yabuta et al. |
| 2006/0113536 A1 | 6/2006 | Kumomi et al. |
| 2006/0113539 A1 | 6/2006 | Sano et al. |
| 2006/0113549 A1 | 6/2006 | Den et al. |
| 2006/0113565 A1 | 6/2006 | Abe et al. |
| 2006/0169973 A1 | 8/2006 | Isa et al. |
| 2006/0170111 A1 | 8/2006 | Isa et al. |
| 2006/0197092 A1 | 9/2006 | Hoffman et al. |
| 2006/0208977 A1 | 9/2006 | Kimura |
| 2006/0228974 A1 | 10/2006 | Thelss et al. |
| 2006/0231882 A1 | 10/2006 | Kim et al. |
| 2006/0238135 A1 | 10/2006 | Kimura |
| 2006/0244107 A1 | 11/2006 | Sugihara et al. |
| 2006/0284171 A1 | 12/2006 | Levy et al. |
| 2006/0284172 A1 | 12/2006 | Ishii |
| 2006/0292777 A1 | 12/2006 | Dunbar |
| 2007/0024187 A1 | 2/2007 | Shin et al. |
| 2007/0046191 A1 | 3/2007 | Saito |
| 2007/0052025 A1 | 3/2007 | Yabuta |
| 2007/0054507 A1 | 3/2007 | Kaji et al. |
| 2007/0090365 A1 | 4/2007 | Hayashi et al. |
| 2007/0106884 A1* | 5/2007 | Bracamontes ............... 712/227 |
| 2007/0108446 A1 | 5/2007 | Akimoto |
| 2007/0152217 A1 | 7/2007 | Lai et al. |
| 2007/0172591 A1 | 7/2007 | Seo et al. |
| 2007/0187678 A1 | 8/2007 | Hirao et al. |
| 2007/0187760 A1 | 8/2007 | Furuta et al. |
| 2007/0194379 A1 | 8/2007 | Hosono et al. |
| 2007/0252928 A1 | 11/2007 | Ito et al. |
| 2007/0272922 A1 | 11/2007 | Kim et al. |
| 2007/0287296 A1 | 12/2007 | Chang |
| 2008/0006877 A1 | 1/2008 | Mardilovich et al. |
| 2008/0038882 A1 | 2/2008 | Takechi et al. |
| 2008/0038929 A1 | 2/2008 | Chang |
| 2008/0050595 A1 | 2/2008 | Nakagawara et al. |
| 2008/0073653 A1 | 3/2008 | Iwasaki |
| 2008/0083950 A1 | 4/2008 | Pan et al. |
| 2008/0106191 A1 | 5/2008 | Kawase |
| 2008/0128689 A1 | 6/2008 | Lee et al. |
| 2008/0129195 A1 | 6/2008 | Ishizaki et al. |
| 2008/0148083 A1* | 6/2008 | Pesavento et al. ............ 713/322 |
| 2008/0166834 A1 | 7/2008 | Kim et al. |
| 2008/0182358 A1 | 7/2008 | Cowdery-Corvan et al. |
| 2008/0224133 A1 | 9/2008 | Park et al. |
| 2008/0254569 A1 | 10/2008 | Hoffman et al. |
| 2008/0258139 A1 | 10/2008 | Ito et al. |
| 2008/0258140 A1 | 10/2008 | Lee et al. |
| 2008/0258141 A1 | 10/2008 | Park et al. |
| 2008/0258143 A1 | 10/2008 | Kim et al. |
| 2008/0296568 A1 | 12/2008 | Ryu et al. |
| 2009/0068773 A1 | 3/2009 | Lai et al. |
| 2009/0073325 A1 | 3/2009 | Kuwabara et al. |
| 2009/0114910 A1 | 5/2009 | Chang |
| 2009/0134399 A1 | 5/2009 | Sakakura et al. |
| 2009/0152506 A1 | 6/2009 | Umeda et al. |
| 2009/0152541 A1 | 6/2009 | Maekawa et al. |
| 2009/0278122 A1 | 11/2009 | Hosono et al. |
| 2009/0280600 A1 | 11/2009 | Hosono et al. |
| 2010/0065844 A1 | 3/2010 | Tokunaga |
| 2010/0092800 A1 | 4/2010 | Itagaki et al. |
| 2010/0109002 A1 | 5/2010 | Itagaki et al. |
| 2011/0127521 A1 | 6/2011 | Yamazaki |
| 2012/0032163 A1 | 2/2012 | Yamazaki |
| 2012/0140550 A1 | 6/2012 | Endo et al. |
| 2012/0170355 A1 | 7/2012 | Ohmaru et al. |
| 2013/0015904 A1* | 1/2013 | Priel et al. .................... 327/419 |
| 2013/0191673 A1 | 7/2013 | Koyama et al. |
| 2013/0326244 A1 | 12/2013 | Koyama et al. |
| 2014/0068300 A1* | 3/2014 | Nishijima et al. ............ 713/322 |

FOREIGN PATENT DOCUMENTS

| | | |
|---|---|---|
| EP | 1 164 460 A1 | 12/2001 |
| EP | 1 737 044 A1 | 12/2006 |
| EP | 2 226 847 A2 | 9/2010 |
| JP | 60-198861 A | 10/1985 |
| JP | 63-210022 A | 8/1988 |
| JP | 63-210023 A | 8/1988 |
| JP | 63-210024 A | 8/1988 |
| JP | 63-215519 A | 9/1988 |
| JP | 63-239117 A | 10/1988 |
| JP | 63-265818 A | 11/1988 |
| JP | 05-251705 A | 9/1993 |
| JP | 05-282214 A | 10/1993 |
| JP | 06-275697 A | 9/1994 |
| JP | 08-264794 A | 10/1996 |
| JP | 10-301659 A | 11/1998 |
| JP | 11-505377 A | 5/1999 |
| JP | 2000-044236 A | 2/2000 |
| JP | 2000-150900 A | 5/2000 |
| JP | 2002-076356 A | 3/2002 |
| JP | 2002-289859 A | 10/2002 |
| JP | 2003-086000 A | 3/2003 |
| JP | 2003-086808 A | 3/2003 |
| JP | 2004-013404 A | 1/2004 |
| JP | 3507822 B | 3/2004 |
| JP | 2004-103957 A | 4/2004 |
| JP | 2004-273614 A | 9/2004 |
| JP | 2004-273732 A | 9/2004 |
| JP | 2011-135066 A | 7/2011 |
| JP | 2012-054547 A | 3/2012 |
| JP | 2012-134961 A | 7/2012 |
| KR | 2012-0022614 A | 3/2012 |
| KR | 2012-0109526 A | 10/2012 |
| TW | 201137984 A | 11/2011 |
| TW | 201222734 A | 6/2012 |
| TW | 201234377 A | 8/2012 |
| WO | 2001/052027 A1 | 7/2001 |
| WO | 2004/114391 A1 | 12/2004 |
| WO | 2011/065216 A1 | 6/2011 |

OTHER PUBLICATIONS

Orita, M et al., "Amorphous transparent conductive oxide InGaO3(ZnO)m (m<4):a Zn4s conductor," Philosophical Magazine, 2001, vol. 81, No. 5, pp. 501-515.

(56) References Cited

OTHER PUBLICATIONS

Orita, M et al., "Mechanism of Electrical Conductivity of Transparent InGaZnO4," Phys. Rev. B (Physical Review. B), Jan. 15, 2000, vol. 61, No. 3, pp. 1811-1816.
Osada, T et al., "15.2: Development of Driver-Integrated Panel using Amorphous In—Ga—Zn—Oxide TFT," SID Digest '09 : SID International Symposium Digest of Technical Papers, May 31, 2009, pp. 184-187.
Osada, T et al., "Development of Driver-Integrated Panel Using Amorphous In—Ga—Zn—Oxide TFT," AM-FPD '09 Digest of Technical Papers, Jul. 1, 2009, pp. 33-36.
Park, J et al., "Dry etching of ZnO films and plasma-induced damage to optical properties," J. Vac. Sci. Technol. B (Journal of Vacuum Science & Technology B), Mar. 1, 2003, vol. 21, No. 2, pp. 800-803.
Park, J et al., "Improvements in the Device Characteristics of Amorphous Indium Gallium Zinc Oxide Thin-Film Transistors by Ar Plasma Treatment," Appl. Phys. Lett. (Applied Physics Letters), Jun. 26, 2007, vol. 90, No. 26, pp. 262106-1-262106-3.
Park, J et al., "Electronic Transport Properties of Amorphous Indium—Gallium—Zinc Oxide Semiconductor Upon Exposure to Water," Appl. Phys. Lett. (Applied Physics Letters), 2008, vol. 92, pp. 072104-1-072104-3.
Park, J et al., "High performance amorphous oxide thin film transistors with self-aligned top-gate structure," IEDM 09: Technical Digest of International Electron Devices Meeting, Dec. 7, 2009, pp. 191-194.
Park, Sang-Hee et al., "42.3: Transparent ZnO Thin Film Transistor for the Application of High Aperture Ratio Bottom Emission AM-OLED Display," SID Digest '08 : SID International Symposium Digest of Technical Papers, May 20, 2008, vol. 39, pp. 629-632.
Park, J et al., "Amorphous Indium—Gallium—Zinc Oxide TFTS and Their Application for Large Size AMOLED," AM-FPD '08 Digest of Technical Papers, Jul. 2, 2008, pp. 275-278.
Park, S et al., "Challenge to Future Displays: Transparent AMOLED Driven by Peald Grown ZnO TFT," IMID '07 Digest, 2007, pp. 1249-1252.
Prins, M et al., "A Ferroelectric Transparent Thin-Film Transistor," Appl. Phys. Lett. (Applied Physics Letters), Jun. 17, 1996, vol. 68, No. 25, pp. 3650-3652.
Sakata, J et al., "Development of 4.0-In. AMOLED Display With Driver Circuit Using Amorphous In—Ga—Zn—Oxide TFTS," IDW '09 : Proceedings of the 16th International Display Workshops, 2009, pp. 689-692.
Son, K et al., "42.4L: Late-News Paper: 4 Inch QVGA AMOLED Driven by the Threshold Voltage Controlled Amorphous GIZO (Ga2O3—In2O3-ZnO) TFT," SID Digest '08 : SID International Symposium Digest of Technical Papers, May 20, 2008, vol. 39, pp. 633-636.
Takahashi, M et al., "Theoretical Analysis of IGZO Transparent Amorphous Oxide Semiconductor," IDW '08 : Proceedings of the 15th International Display Workshops, Dec. 3, 2008, pp. 1637-1640.
Tsuda, K et al., "Ultra Low Power Consumption Technologies for Mobile TFT-LCDs," IDW '02 : Proceedings of the 9th International Display Workshops, Dec. 4, 2002, pp. 295-298.
Ueno, K et al., "Field-Effect Transistor on SrTiO3 With Sputtered Al2O3 Gate Insulator," Appl. Phys. Lett. (Applied Physics Letters), Sep. 1, 2003, vol. 83, No. 9, pp. 1755-1757.
Van De Walle, C, "Hydrogen as a Cause of Doping in Zinc Oxide," Phys. Rev. Lett. (Physical Review Letters), Jul. 31, 2000, vol. 85, No. 5, pp. 1012-1015.
Asakuma, N et al., "Crystallization and Reduction of SOL-GEl-Derived Zinc Oxide Films by Irradiation With Ultraviolet Lamp," Journal of SOL-GEL Science and Technology, 2003, vol. 26, pp. 181-184.
Asaoka, Y et al., "29.1: Polarizer-Free Reflective LCD Combined With Ultra Low-Power Driving Technology," SID Digest '09 : SID International Symposium Digest of Technical Papers, 2009, pp. 395-398.

Chern, H et al., "An Analytical Model for the Above-Threshold Characteristics of Polysilicon Thin-Film Transistors," IEEE Transactions on Electron Devices, Jul. 1, 1995, vol. 42, No. 7, pp. 1240-1246.
Cho, D et al., "21.2: Al and Sn-Doped Zinc Indium Oxide Thin Film Transistors for AMOLED Back-Plane," SID Digest '09 : SID International Symposium Digest of Technical Papers, May 31, 2009, pp. 280-283.
Clark, S et al., "First Principles Methods Using CASTEP," Zeitschrift fur Kristallographie, 2005, vol. 220, pp. 567-570.
Coates. D et al., "Optical Studies of the Amorphous Liquid-Cholesteric Liquid Crystal Transition: The Blue Phase," Physics Letters, Sep. 10, 1973, vol. 45A, No. 2, pp. 115-116.
Costello, M et al., "Electron Microscopy of a Cholesteric Liquid Crystal and Its Blue Phase," Phys. Rev. A (Physical Review. A), May 1, 1984, vol. 29, No. 5, pp. 2957-2959.
Dembo, H et al., "RFCPUS on Glass and Plastic Substrates Fabricated by TFT Transfer Technology," IEDM 05: Technical Digest of International Electron Devices Meeting, Dec. 5, 2005, pp. 1067-1069.
Fortunato, E et al., "Wide-Bandgap High-Mobility ZnO Thin-Film Transistors Produced at Room Temperature," Appl. Phys. Lett. (Applied Physics Letters), Sep. 27, 2004, vol. 85, No. 13, pp. 2541-2543.
Fung, T et al., "2-D Numerical Simulation of High Performance Amorphous In—Ga—Zn—O TFTs for Flat Panel Displays,"AM-FPD '08 Digest of Technical Papers, Jul. 2, 2008, pp. 251-252, The Japan Society of Applied Physics.
Godo, H et al., "P-9: Numerical Analysis on Temperature Dependence of Characteristics of Amorphous In—Ga—Zn—Oxide TFT," SID Digest '09 : SID International Symposium Digest of Technical Papers, May 31, 2009, pp. 1110-1112.
Godo, H et al., "Temperature Dependence of Characteristics and Electronic Structure for Amorphous In—Ga—Zn—Oxide TFT," AM-FPD '09 Digest of Technical Papers, Jul. 1, 2009, pp. 41-44.
Hayashi, R et al., "42.1: Invited Paper: Improved Amorphous In—Ga—Zn—O TFTS," SID Digest '08 : SID International Symposium Digest of Technical Papers, May 20, 2008, vol. 39, pp. 621-624.
Hirao, T et al., "Novel Top-Gate Zinc Oxide Thin-Film Transistors (ZnO TFTS) for AMLCDS," Journal of the SID , 2007, vol. 15, No. 1, pp. 17-22.
Hosono, H et al., "Working hypothesis to explore novel wide band gap electrically conducting amorphous oxides and examples," J. Non-Cryst. Solids (Journal of Non-Crystalline Solids), 1996, vol. 198-200, pp. 165-169.
Hosono, H, "68.3: Invited Paper:Transparent Amorphous Oxide Semiconductors for High Performance TFT," SID Digest '07 : SID International Symposium Digest of Technical Papers, 2007, vol. 38, pp. 1830-1833.
Hsieh, H et al., "P-29: Modeling of Amorphous Oxide Semiconductor Thin Film Transistors and Subgap Density of States," SID Digest '08 : SID International Symposium Digest of Technical Papers, 2008, vol. 39, pp. 1277-1280.
Ikeda, T et al., "Full-Functional System Liquid Crystal Display Using CG-Silicon Technology," SID Digest '04 : SID International Symposium Digest of Technical Papers, 2004, vol. 35, pp. 860-863.
Janotti, A et al., "Native Point Defects in ZnO," Phys. Rev. B (Physical Review. B), 2007, vol. 76, No. 16, pp. 165202-1-165202-22.
Janotti, A et al., "Oxygen Vacancles in ZnO," Appl. Phys. Lett. (Applied Physics Letters), 2005, vol. 87, pp. 122102-1-122102-3.
Jeong, J et al., "3.1: Distinguished Paper: 12.1-Inch WXGA AMOLED Display Driven by Indium—Gallium—Zinc Oxide TFTs Array," SID Digest '08 : SID International Symposium Digest of Technical Papers, May 20, 2008, vol. 39, No. 1, pp. 1-4.
Jin, D et al., "65.2: Distinguished Paper:World-Largest (6.5") Flexible Full Color Top Emission AMOLED Display on Plastic Film and Its Bending Properties," SID Digest '09 : SID International Symposium Digest of Technical Papers, May 31, 2009, pp. 983-985.

(56) References Cited

OTHER PUBLICATIONS

Kanno, H et al., "White Stacked Electrophosphorecent Organic Light-Emitting Devices Employing MOO3 as a Charge-Generation Layer," Adv. Mater. (Advanced Materials), 2006, vol. 18, No. 3, pp. 339-342.
Kikuchi, H et al., "39.1: Invited Paper: Optically Isotropic Nano-Structured Liquid Crystal Composites for Display Applications," SID Digest '09 : SID International Symposium Digest of Technical Papers, May 31, 2009, pp. 578-581.
Kikuchi, H et al., "62.2: Invited Paper: Fast Electro-Optical Switching in Polymer-Stabilized Liquid Crystalline Blue Phases for Display Application," SID Digest '07 : SID International Symposium Digest of Technical Papers, 2007, vol. 38, pp. 1737-1740.
Kikuchi, H et al., "Polymer-Stabilized Liquid Crystal Blue Phases," Nature Materials, Sep. 1, 2002, vol. 1, pp. 64-68.
Kim, S et al., "High-Performance oxide thin film transistors passivated by various gas plasmas," The Electrochemical Society, 214th ECS Meeting, 2008, No. 2317, 1 page.
Kimizuka, N et al., "SPINEL,YbFe2O4, and Yb2Fe3O7 Types of Structures for Compounds in the IN2O3 and SC2O3—A2O3—BO Systems [A; Fe, Ga, or Al; B: Mg, Mn, Fe, Ni, Cu,or Zn] at Temperatures Over 1000° C.," Journal of Solid State Chemistry, 1985, vol. 60, pp. 382-384.
Kimizuka, N et al., "Syntheses and Single-Crystal Data of Homologous Compounds, In2O3(ZnO)m (m=3, 4, and 5), InGaO3(ZnO)3, and Ga2O3(ZnO)m (m=7, 8, 9, and 16) in the In2O3—ZnGa2O4—ZnO System," Journal of Solid State Chemistry, Apr. 1, 1995, vol. 116, No. 1, pp. 170-178.
Kitzerow, H et al., "Observation of Blue Phases in Chiral Networks," Liquid Crystals, 1993, vol. 14, No. 3, pp. 911-916.
Kurokawa, Y et al., "UHF RFCPUS on Flexible and Glass Substrates for Secure RFID Systems," Journal of Solid-State Circuits , 2008, vol. 43, No. 1, pp. 292-299.
Lany, S et al., "Dopability, Intrinsic Conductivity, and Nonstoichiometry of Transparent Conducting Oxides," Phys. Rev. Lett. (Physical Review Letters), Jan. 26, 2007, vol. 98, pp. 045501-1-045501-4.
Lee, H et al., "Current Status of, Challenges to, and Perspective View of AM-OLED," IDW '06 : Proceedings of the 13th International Display Workshops, Dec. 7, 2006, pp. 663-666.
Lee, J et al., "World's Largest (15-Inch) XGA AMLCD Panel Using IGZO Oxide TFT," SID Digest '08 : SID International Symposium Digest of Technical Papers, May 20, 2008, vol. 39, pp. 625-628.
Lee, M et al., "15.4: Excellent Performance of Indium—Oxide—Based Thin-Film Transistors by DC Sputtering," SID Digest '09 : SID International Symposium Digest of Technical Papers, May 31, 2009, pp. 191-193.
Li C et al., "Modulated Structures of Homologous Compounds InMO3(ZnO)m (M=In,Ga; m=Integer) Described by Four-Dimensional Superspace Group," Journal of Solid State Chemistry, 1998, vol. 139, pp. 347-355.
Masuda, S et al., "Transparent thin film transistors using ZnO as an active channel layer and their electrical properties," J. Appl. Phys. (Journal of Applied Physics), Feb. 1, 2003, vol. 93, No. 3, pp. 1624-1630.
Meiboom, S et al., "Theory of the Blue Phase of Cholesteric Liquid Crystals," Phys. Rev. Lett. (Physical Review Letters), May 4, 1981, vol. 46, No. 18, pp. 1216-1219.
Miyasaka, M, "SUFTLA Flexible Microelectronics on Their Way to Business," SID Digest '07 : SID International Symposium Digest of Technical Papers, 2007, vol. 38, pp. 1673-1676.
Mo, Y et al., "Amorphous Oxide TFT Backplanes for Large Size AMOLED Displays," IDW '08 : Proceedings of the 6th International Display Workshops, Dec. 3, 2008, pp. 581-584.

Nakamura, "Synthesis of Homologous Compound with New Long-Period Structure," NIRIM Newsletter, Mar. 1995, vol. 150, pp. 1-4 with English translation.
Nakamura, M et al., "The phase relations in the In2O3—Ga2ZnO4—ZnO system at 1350° C.," Journal of Solid State Chemistry, Aug. 1, 1991, vol. 93, No. 2, pp. 298-315.
Nomura, K et al., "Thin-Film Transistor Fabricated in Single-Crystalline Transparent Oxide Semiconductor," Science, May 23, 2003, vol. 300, No. 5623, pp. 1269-1272.
Nomura, K et al., "Amorphous Oxide Semiconductors for High-Performance Flexible Thin-Film Transistors," Jpn. J. Appl. Phys. (Japanese Journal of Applied Physics) , 2006, vol. 45, No. 5B, pp. 4303-4308.
Nomura, K et al., "Room-Temperature Fabrication of Transparent Flexible Thin-Film Transistors Using Amorphous Oxide Semiconductors," Nature, Nov. 25, 2004, vol. 432, pp. 488-492.
Nomura, K et al., "Carrier transport in transparent oxide semiconductor with intrinsic structural randomness probed using single-crystalline InGaO3(ZnO)5 films," Appl. Phys. Lett. (Applied Physics Letters) , Sep. 13, 2004, vol. 85, No. 11, pp. 1993-1995.
Nowatari, H et al., "60.2: Intermediate Connector With Suppressed Voltage Loss for White Tandem OLEDS," SID Digest '09 : SID International Symposium Digest of Technical Papers, May 31, 2009, vol. 40, pp. 899-902.
Oba, F et al., "Defect energetics in ZnO: A hybrid Hartree-Fock density functional study," Phys. Rev. B (Physical Review. B), 2008, vol. 77, pp. 245202-1-245202-6.
Oh, M et al., "Improving the Gate Stability of ZnO Thin-Film Transistors With Aluminum Oxide Dielectric Layers," J. Electrochem. Soc. (Journal of the Electrochemical Society), 2008, vol. 155, No. 12, pp. H1009-H1014.
Ohara, H et al., "21.3: 4.0 In. QVGA AMOLED Display Using In—Ga—Zn—Oxide TFTS With a Novel Passivation Layer," SID Digest '09 : SID International Symposium Digest of Technical Papers, May 31, 2009, pp. 284-287.
Masahiro Takahashi et al.; "C-Axis Aligned Crystalline In—Ga—Zn—Oxide FET with High Reliability"; AM-FPD '11 Digest of Technical Papers; 2011; pp. 271-274.
Kiyoshi Kato et al.; "Evaluation of Off-State Current Characteristics of Transistor Using Oxide Semiconductor Material, Indium—Gallium—Zinc Oxide", Japanese Journal of Applied Physics 51; 2012; pp. 021201-1-021201-7.
Hiroki Inoue et al.; "Nonvolatile Memory With Extremely Low-Leakage Indium—Gallium—Zinc—Oxide Thin-Film Transistor"; IEEE Journal of Solid-State Circuits, vol. 47, No. 9; Sep. 2012; pp. 2258-2265.
Shunpei Yamazaki et al.; "Research, Development, and Application of Crystalline Oxide Semiconductor"; SID Digest '12 : SID International Symposium Digest of Technical Papers; 2012; pp. 183-186.
E. Kitagawa et al.; "Impact of ultra low power and fast write operation of advanced perpendicular MTJ on power reduction for high-performance mobile CPU"; IEDM2012: Technical Digest of International Electron Devices Meeting; 2012; pp. 677-680.
Y. Shuto et al.; "Design and performance of pseudo-spin-MOSFETs using nano-CMOS devices"; IEDM12: Technical Digest of International Electron Devices Meeting; 2012; pp. 685-688.
Hidetomo Kobayashi et al.; "Processor with 4.9-ps. Break-even Time in Power Gating Using Crystalline In—Ga—Zn—Oxide Transistor"; Cool Chips XVI, IEEE; 2013; pp. 1-3.
International Search Report, PCT Application No. PCT/JP2013/078250, dated Jan. 14, 2014, 4 pages.
Written Opinion, PCT Application No. PCT/JP2013/078250, dated Jan. 14, 2014, 4 pages.

* cited by examiner

FIG. 14
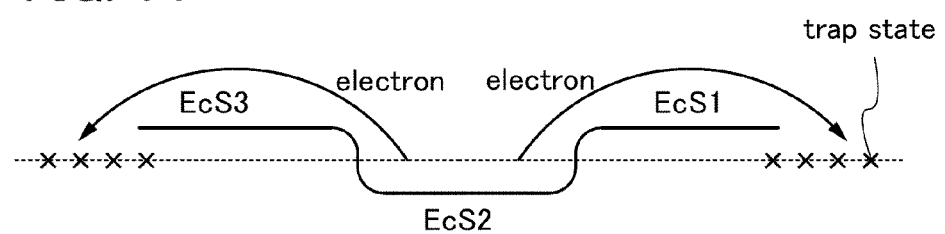
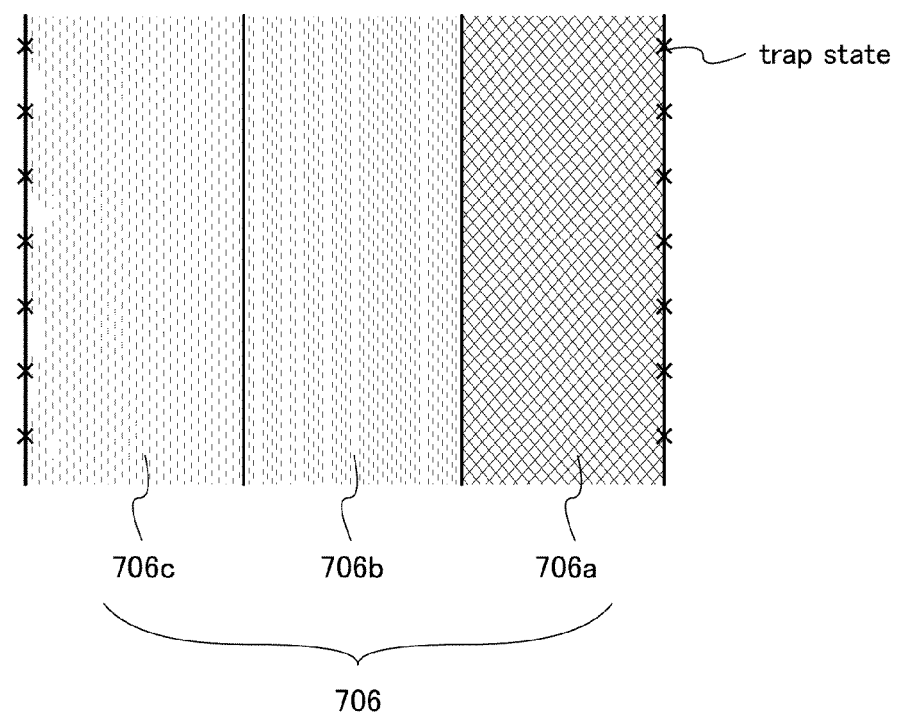

MICROCONTROLLER AND METHOD FOR MANUFACTURING THE SAME

TECHNICAL FIELD

The present invention relates to a microcontroller and a method for manufacturing the microcontroller. Note that the term "microcontroller" means one kind of semiconductor devices and is referred to as "microcontroller unit", "MCU", "µC", and the like.

Note that a semiconductor device in this specification means all devices that can function by utilizing semiconductor characteristics, and all of electronic optical devices, semiconductor circuits, and electronic devices fall within the category of the semiconductor device.

BACKGROUND ART

With the development of a technique for miniaturizing a semiconductor device, the degree of integration of a microcontroller has been increased year by year. Accordingly, the leakage current of a variety of semiconductor elements (e.g., a transistor and the like) provided inside the microcontroller has been increased, which has resulted in a large increase in power consumption of the microcontroller. Thus, one of important issues in recent years is to reduce power consumption of a microcontroller.

As one of methods for reducing power consumption of a microcontroller, there is a technique in which a circuit block unnecessary for operation of the microcontroller, of circuit blocks in the microcontroller, is shifted to a low power consumption mode (see Patent Document 1).

REFERENCE

Patent Document

[Patent Document 1] Japanese Published Patent Application No. H10-301659

In a circuit block in which power supply is stopped, at the very moment of power supply stop, logics of all nodes in the integrated circuit are volatilized; therefore, timing of stopping the power supply is limited to timing after the complete finish of running processing.

In view of the above, an object of one embodiment of the present invention is to provide a microcontroller of which power consumption is reduced by stopping power supply to a circuit unnecessary for operation.

Further, another object of one embodiment of the present invention is to provide a highly reliable microcontroller.

One embodiment of the invention disclosed in this application is a microcontroller including: a terminal to which a power supply potential is input; a CPU; a nonvolatile memory; a first peripheral circuit that measures time and outputs a first interrupt signal; a second peripheral circuit that acts as an interface with an external device and outputs a second interrupt signal; a third peripheral circuit that is a circuit for processing an analog signal input externally and outputs a third interrupt signal; an interrupt controller that determines priorities of the first to third interrupt signals and outputs a fourth interrupt signal, first to fifth registers for the first to third peripheral circuits, the CPU, and the interrupt controller; a power gate that supplies the power supply potential to the first to third peripheral circuits and stops the supply of the power supply potential to the first to third peripheral circuits, the CPU, the memory, the interrupt controller, and the first, the fourth, and the fifth registers; a controller that controls the power gate; and a sixth register for the controller.

An operation mode of the microcontroller includes at least first to third operation modes. The first operation mode is a mode where all circuits included in the microcontroller are made active; the second operation mode is a mode where the controller, the first peripheral circuit, and the first, the second, and the sixth registers are made active but the other circuits are made non-active; and the third operation mode is a mode where the controller and the sixth register are made active but the other circuits are made non-active. Under an instruction of the CPU, a shift from the first operation mode to the second or the third operation mode is started. By inputting the first interrupt signal to the controller, a shift from the second operation mode to the first operation mode is started. By inputting an external interrupt signal to the controller, a shift from the third operation mode to the first operation mode is started.

The first, the fourth, and the fifth registers each include a volatile memory and a nonvolatile memory, and in a case where power supply is stopped by the power gate, data in the volatile memory is backed up in the nonvolatile memory before the power supply is stopped, and in a case where power supply is started again by the power gate, the data backed up in the nonvolatile memory is written into the volatile memory.

Like the first register or the like, for example, the third register also can include a volatile memory and a nonvolatile memory. In a case where power supply is stopped by the power gate, data in the volatile memory is backed up in the nonvolatile memory before the power supply is stopped, and in a case where power supply is started again by the power gate, the data backed up in the nonvolatile memory is written into the volatile memory.

In the microcontroller, a memory cell in the memory may include a transistor formed using an oxide semiconductor layer and a transistor formed using silicon. Further, the nonvolatile memory may include a transistor formed using an oxide semiconductor layer and a transistor formed using silicon.

When a transistor using a multilayer film including an oxide semiconductor layer is used for a memory cell in the memory in the microcontroller, an improvement in reliability can be achieved.

The transistor using a multilayer including an oxide semiconductor layer is a semiconductor device that includes: a multilayer film including a first oxide layer, a second oxide layer, and an oxide semiconductor layer; a gate insulating film provided in contact with the multilayer film; and a gate electrode provided to overlap with the multilayer film with the gate insulating film positioned therebetween. The oxide semiconductor layer contains indium and is provided in contact with the first oxide layer. The first oxide layer has a larger energy gap than the oxide semiconductor layer and contains indium. The oxide semiconductor layer is provided between and in contact with the first oxide layer and the second oxide layer. The second oxide layer has a larger energy gap than the oxide semiconductor layer and contains indium.

In order to give stable electrical characteristics to a transistor whose channel is formed in an oxide semiconductor layer, it is effective to highly purify the oxide semiconductor layer to be a highly purified intrinsic oxide semiconductor layer by reducing the impurity concentration of the oxide semiconductor layer. Obtaining a highly purified intrinsic oxide semiconductor layer refers to purifying or substantially purifying the oxide semiconductor layer to be an intrinsic or substantially intrinsic oxide semiconductor layer. When the oxide semiconductor layer is substantially intrinsic, the carrier density of the oxide semiconductor layer is lower than $1\times10^{17}/cm^3$, lower than $1\times10^{15}/cm^3$, or lower than $1\times10^{13}/cm^3$. For the oxide semiconductor layer, metal elements except for hydrogen, nitrogen, carbon, silicon, and main components of the oxide semiconductor layer serve as impurities. To reduce the impurity concentration of the oxide semiconductor layer, it is preferable to also reduce the impurity concentrations of the first and second oxide layers that are provided in close contact with the oxide semiconductor layer.

For example, silicon in an oxide semiconductor layer forms impurity states. Further, the impurity states serve as traps to deteriorate the electrical characteristics of the transistor. Specifically, the silicon concentration of the oxide semiconductor layer is set to lower than $1\times10^{19}$ atoms/cm$^3$, preferably lower than $5\times10^{18}$ atoms/cm$^3$, further preferably lower than $1\times10^{18}$ atoms/cm$^3$. Note that since an insulating film containing silicon, such as a silicon oxide film, a silicon oxynitride film, a silicon nitride film, or a silicon nitride oxide film is used for the gate insulating film of the transistor in many cases, it is preferable that the oxide semiconductor layer be not in contact with the gate insulating film.

Further, hydrogen and nitrogen in the oxide semiconductor layer form donor levels to increase carrier density.

In the case where a channel is formed at an interface between the gate insulating film and the oxide semiconductor layer, interface scattering occurs at the interface and the field-effect mobility of the transistor is decreased. In view of the above, it is preferable that the oxide semiconductor layer be not in contact with the gate insulating film and a channel be separated from the gate insulating film.

Accordingly, when the channel of the transistor is formed to be separated from the gate insulating film, the transistor can have stable electrical characteristics and high field-effect mobility. When the transistor is used as a switching element of a display device, the display device can have high reliability because the transistor has the stable electrical characteristics. Further, the transistor has high field-effect mobility.

For example, the multilayer film including the oxide semiconductor layer preferably has the following structure in order that the channel of the transistor is separated from the gate insulating film.

The multilayer film including the oxide semiconductor layer includes at least an oxide semiconductor layer (referred to as a second oxide layer for convenience) and a first oxide layer (also referred to as a barrier layer) between the second oxide layer and the gate insulating film. The first oxide layer contains one or more kinds of elements contained in the second oxide layer. The energy of the bottom of the conduction band in the first oxide layer is located closer to the vacuum level than that in the second oxide layer by 0.05 eV or more, 0.07 eV or more, 0.1 eV or more, or 0.15 eV or more and 2 eV or less, 1 eV or less, 0.5 eV or less, or 0.4 eV or less. Note that the second oxide layer preferably contains at least indium in order that the carrier mobility is high. When an electric field is applied to the gate electrode at this time, a channel is formed in the second oxide layer of the multi-layer film including the oxide semiconductor layer, whose energy of the bottom of the conduction band is low. In other words, forming the first oxide layer between the second oxide layer and the gate insulating film enables the channel of the transistor to be formed in the layer (here, the second oxide layer) which is not in contact with the gate insulating film. Further, since the first oxide layer is formed of one or more kinds of elements forming the second oxide layer, interface scattering is not likely to occur at an interface between the first oxide layer and the second oxide layer. Thus, carriers are not inhibited from moving at the interface, which results in an increase in the field-effect mobility of the transistor.

The first oxide layer may contain, for example, aluminum, titanium, silicon, gallium, germanium, yttrium, zirconium, tin, lanthanum, cerium, or hafnium at a higher atomic ratio than the second oxide layer. Specifically, the amount of any of the above elements in the first oxide layer in an atomic ratio is 1.5 times or more, preferably twice or more, more preferably three times or more as much as that in the second oxide layer in an atomic ratio. The above element is strongly bonded to oxygen, and thus has a function of preventing generation of oxygen vacancies in the oxide layer. In other words, the first oxide layer is an oxide layer in which oxygen vacancies are less likely to occur than in the second oxide layer.

Alternatively, when each of the first oxide layer and the second oxide layer is an In-M-Zn oxide and the first oxide layer and the second oxide layer contain In, M, and Zn at an atomic ratio of $x_1:y_1:z_1$ and an atomic ratio of $x_2:y_2:z_2$ respectively, $y_1/x_1$ needs to be larger than $y_2/x_2$. Note that the element M is a metal element whose bonding strength to oxygen is larger than that of In, and Al, Ti, Ga, Y, Zr, Sn, La, Ce, Nd, and Hf can be given as examples. Preferably, the first oxide layer and the second oxide layer in which $y_1/x_1$ is 1.5 times or more as large as $y_2/x_2$ are selected. Further preferably, the first oxide layer and the second oxide layer in which $y_1/x_1$ is twice or more as large as $y_2/x_2$ are selected. Still further preferably, the first oxide layer and the second oxide layer in which $y_1/x_1$ is three times or more as large as $y_2/x_2$ are selected. Here, in the second oxide layer, $y_1$ is preferably larger than or equal to $x_1$ because the transistor can have stable electrical characteristics. However, when $y_1$ is three times or more as large as $x_1$, the field-effect mobility of the transistor is reduced; accordingly, $y_1$ is preferably smaller than three times $x_1$.

The first oxide layer has a thickness greater than or equal to 3 nm and less than or equal to 100 nm, preferably greater than or equal to 3 nm and less than or equal to 50 nm. The second oxide layer has a thickness greater than or equal to 3 nm and less than or equal to 200 nm, preferably greater than or equal to 3 nm and less than or equal to 100 nm, further preferably greater than or equal to 3 nm and less than or equal to 50 nm.

The multi-layer film including the oxide semiconductor layer may include a third oxide layer (also referred to as a barrier layer) which is in contact with an insulating film and the second oxide layer on the opposite side of the gate insulating film, which contains one or more kinds of elements contained in the second oxide layer, and the energy of the bottom of the conduction band of which is located closer to the vacuum level than that of the second oxide layer by 0.05 eV or more, 0.07 eV or more, 0.1 eV or more, or 0.15 eV or more and 2 eV or less, 1 eV or less, 0.5 eV or less, or 0.4 eV or less. Note that the second oxide layer preferably contains at least indium in order that that the carrier mobility is high. When an electric field is applied to the gate electrode at this time, a channel is not formed in the third oxide layer. Further, since the third oxide layer contains one or more kinds of elements contained in the second oxide layer, an interface state is unlikely to be formed at the interface between the second oxide layer and the third oxide layer. When the interface has an interface state, in some cases, a second transistor in which the interface serves as a channel and which has a different threshold voltage is formed; accordingly, the apparent threshold voltage of the transistor is changed. Thus, providing the third oxide layer makes it possible to reduce variation in the electrical characteristics of the transistor, such as threshold voltage.

Specifically, the amount of any of the above elements in the third oxide layer in an atomic ratio is 1.5 times or more, preferably twice or more, more preferably three times or more as much as that in the second oxide layer in an atomic ratio. Any of the above elements is strongly bonded to oxygen and thus has a function of preventing generation of oxygen vacancies in the oxide layer. In other words, the third oxide layer is an oxide film in which oxygen vacancies are less likely to occur than in the second oxide layer.

Further alternatively, when each of the second oxide layer and the third oxide layer is an In-M-Zn oxide and the second oxide layer and the third oxide layer contain In, M, and Zn at an atomic ratio of $x_2:y_2:z_2$ and an atomic ratio of $x_3:y_3:z_3$ respectively, $y_3/x_3$ needs to be larger than $y_2/x_2$. Note that the element M is a metal element whose bonding strength to oxygen is larger than that of In, and Al, Ti, Ga, Y, Zr, Sn, La, Ce, In, M, and Hf can be given as examples. Preferably, the second oxide layer and the third oxide layer in which $y_3/x_3$ is 1.5 times or more as large as $y_2/x_2$ are selected. Preferably, the second oxide layer and the third oxide layer in which $y_3/x_3$ is twice or more as large as $y_2/x_2$ are selected. Preferably, the second oxide layer and the third oxide layer in which $y_3/x_3$ is three times or more as large as $y_2/x_2$ are selected. Here, in the second oxide layer, $y_2$ is preferably larger than or equal to $x_2$ because the transistor can have stable electrical characteristics. However, when $y_2$ is three times or more as large as $x_2$, the field-effect mobility of the transistor is reduced; accordingly, $y_2$ is preferably smaller than three times $x_2$.

The third oxide layer has a thickness greater than or equal to 3 nm and less than or equal to 100 nm, preferably greater than or equal to 3 nm and less than or equal to 50 nm.

Note that when the first oxide layer is an In-M-Zn oxide, the atomic ratio between In and M is preferably as follows: the atomic percentage of In is less than 50 atomic % and the atomic percentage of M is greater than or equal to 50 atomic %, further preferably the atomic percentage of In is less than 25 atomic % and the atomic percentage of M is greater than or equal to 75 atomic %. When the second oxide layer is an In-M-Zn oxide, the atomic ratio between In and M is preferably as follows: the atomic percentage of In is greater than or equal to 25 atomic % and the atomic percentage of M is less than 75 atomic %, further preferably the atomic percentage of In is greater than or equal to 34 atomic % and the atomic percentage of M is less than 66 atomic %. When the third oxide layer is an In-M-Zn oxide, the atomic ratio between In and M is preferably as follows: the atomic percentage of In be less than 50 atomic % and the atomic percentage of M is greater than or equal to 50 atomic %, further preferably the atomic percentage of In is less than 25 atomic % and the atomic percentage of M is greater than or equal to 75 atomic %.

The first oxide layer or the third oxide layer is provided in contact with a source electrode and a drain electrode of the transistor. However, in the case where the first oxide layer, the second oxide layer, or the third oxide layer is provided in contact with the source electrode and the drain electrode of the transistor, depending on a material used for the source electrode and the drain electrode, oxygen vacancies are generated in and around a region of the first oxide layer, the second oxide layer, or the third oxide layer, which is in contact with the source electrode and the drain electrode, so that the region becomes an n-type. Accordingly, the n-type region can serve as a source or drain of the transistor. In the case where the material used for the source electrode and the drain electrode is a conductive material which is easily bonded to oxygen, such as a tungsten, contact between the conductive material and the oxide semiconductor layer causes a phenomenon in which oxygen in the oxide semiconductor layer diffuses into the conductive material which is easily bonded to oxygen. Some heating steps are included in the manufacturing process of the transistor, and thus owing to the phenomenon, oxygen vacancies are generated in and around the region of the oxide semiconductor layer which is in contact with the source electrode and the drain electrode, so that the region becomes an n-type.

In accordance with one embodiment of the present invention, power supply can be stopped to circuits unnecessary for operation of the microcontroller; therefore, lower power consumption of the microcontroller can be achieved.

In addition, a register to which no power is supplied in a low power consumption mode includes a nonvolatile memory, which leads to an increase of flexibility in timing of power supply stop. Therefore, the microcontroller that can return rapidly to the state before power supply stop can be provided.

Further, when a transistor using a multilayer film including an oxide semiconductor layer is used for a microcontroller, high reliability can be achieved.

BRIEF DESCRIPTION OF DRAWINGS

FIG. 14 illustrates a band structure of a multilayer film according to one embodiment of the present invention.

BEST MODE FOR CARRYING OUT THE INVENTION

Hereinafter, embodiments and example of the present invention will be described in detail with reference to the accompanying drawings. However, the present invention is not limited to the description below, and it is easily understood by those skilled in the art that modes and details disclosed herein can be modified in various ways without departing from the spirit and the scope of the present invention. Therefore, the present invention is not construed as being limited to description of the embodiments and example.

(Embodiment 1)

Figure 1:
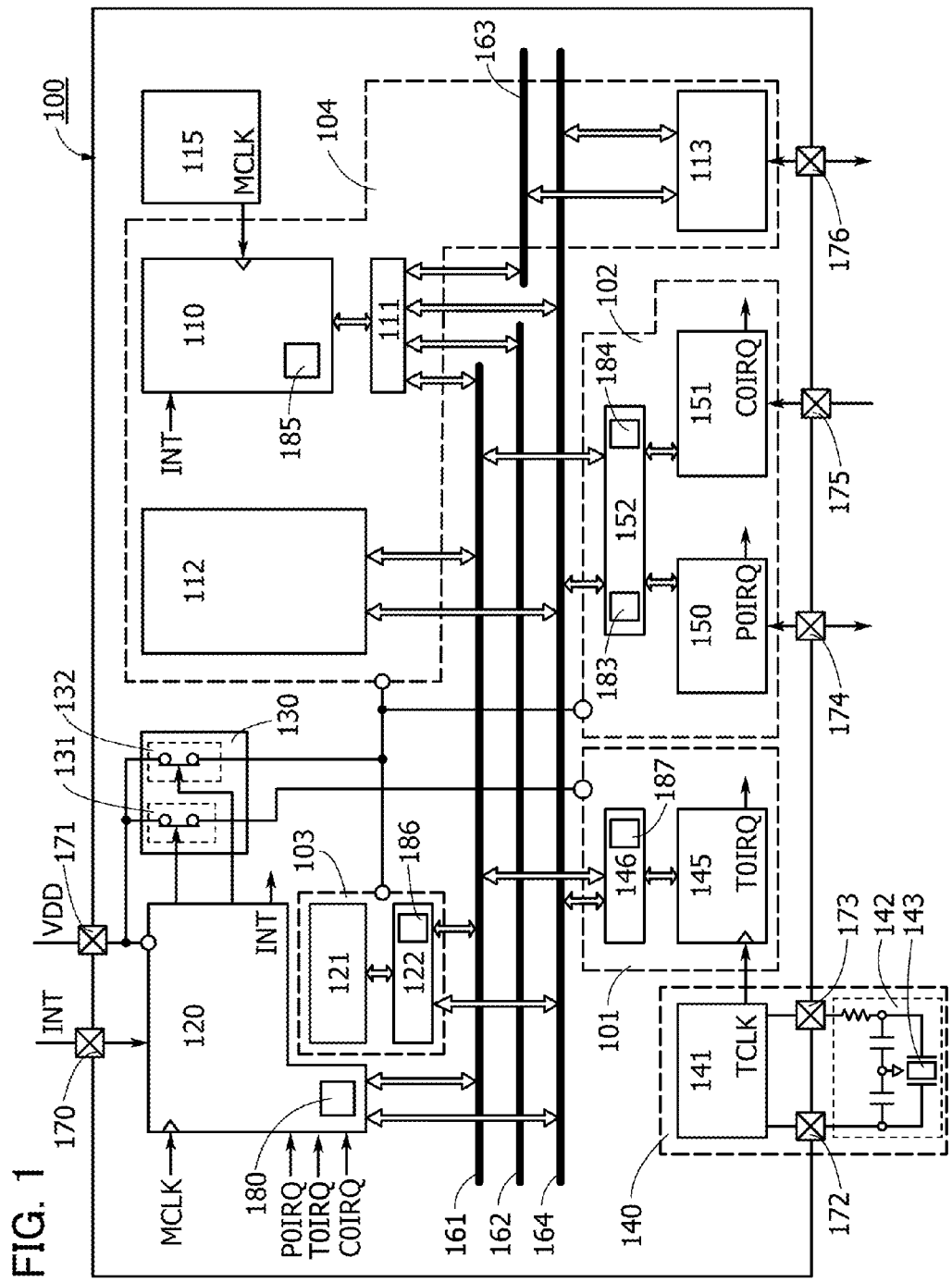
FIG. 1 is a block diagram illustrating an example of a microcontroller configuration.

A configuration and operation of a microcontroller is described with reference to FIG. 1. FIG. 1 is a block diagram of a microcontroller 100.

The microcontroller 100 includes a central processing unit (CPU) 110, a bus bridge 111, a random access memory (RAM) 112, a memory interface 113, a controller 120, an interrupt controller 121, an input/output interface (I/O interface) 122, and a power gate unit 130.

The microcontroller 100 further includes a crystal oscillation circuit 141, a timer circuit 145, an I/O interface 146, an I/O port 150, a comparator 151, an I/O interface 152, a bus line 161, a bus line 162, a bus line 163, and a data bus line 164. Further, the microcontroller 100 includes at least connection terminals 170 to 176 as connection parts with external devices. Note that the connection terminals 170 to 176 each represent one terminal or a terminal group including plural terminals.

Figure 2:
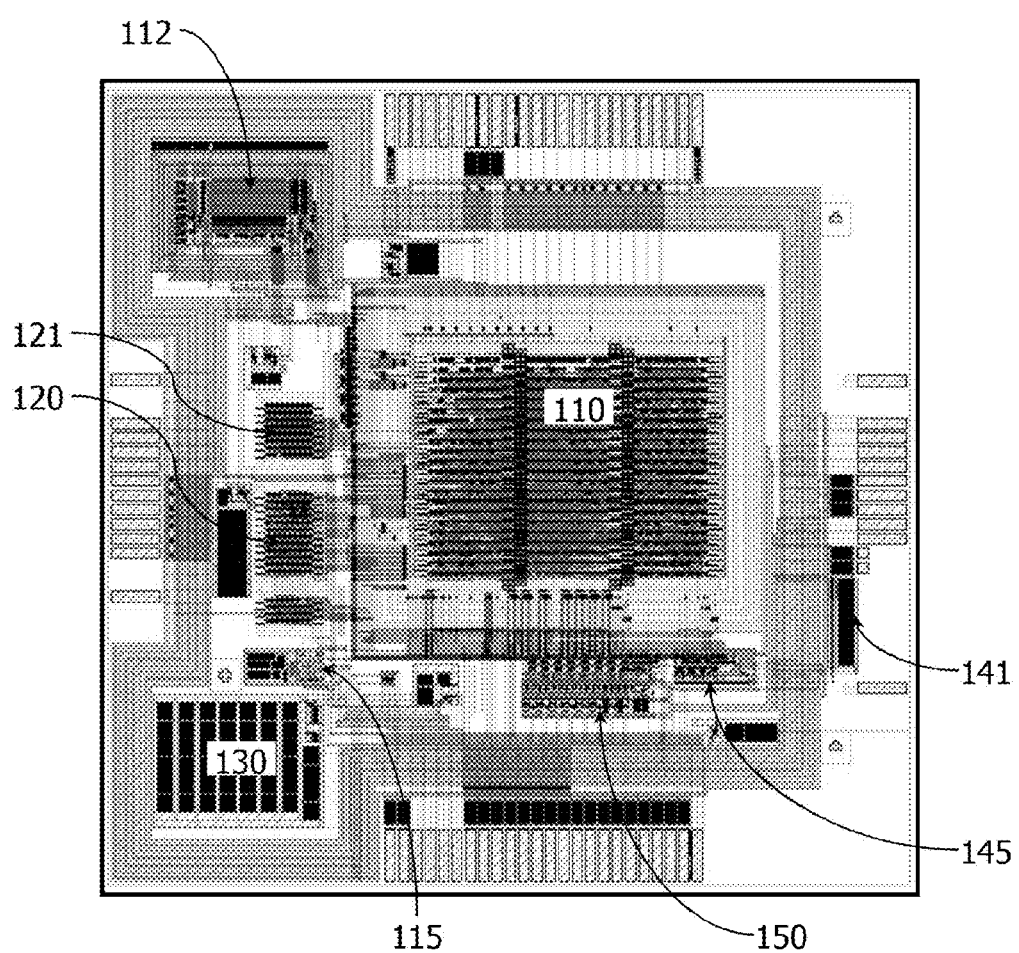
FIG. 2 is a diagram of an example of a layout in a microcontroller.

FIG. 2 is a layout example of circuit blocks included in the microcontroller 100. In the layout in FIG. 2, the reference numerals used for some of the circuit blocks in FIG. 1 are written.

In the layout in FIG. 2, as transistors included in each circuit, a transistor formed using a silicon substrate and a transistor formed using an oxide semiconductor layer are given. In the layout in FIG. 2, the process technology of the transistor formed using silicon is 0.35 μm and the process technology of the transistor formed using an oxide semiconductor layer is 0.8 μm.

The CPU 110 includes a register 185, and is connected to the bus lines 161 to 163 and the data bus line 164 via the bus bridge 111.

The RAM 112 is a memory serving as a main memory of the CPU 110 and is a nonvolatile random access memory. The RAM 112 is a device that stores an instruction to be executed by the CPU 110, data necessary for execution of the instruction, and data processed by the CPU 110. Under the instruction by the CPU 110, data is written into and read out from the RAM 112.

In the microcontroller 100, power supply to the RAM 112 is stopped in a low power consumption mode. Thus, the RAM 112 is made up of a nonvolatile memory that can store data when no power is supplied.

The memory interface 113 is an input-output interface with an external memory. Under the instruction to be executed by the CPU 110, data is written into and read out from the external memory connected to the connection terminal 176 via the memory interface 113.

A clock generation circuit 115 is a circuit that generates a clock signal MCLK (hereinafter, referred to as MCLK) to be used in the CPU 110, and includes an RC oscillator and the like. MCLK is also input into the controller 120 and the interrupt controller 121.

The controller 120 is a circuit that controls the whole microcontroller 100, for example, controls the power of the microcontroller 100, and controls the clock generation circuit 115, and the crystal oscillation circuit 141, and the like. In addition, the controller 120 also controls the power gate unit 130 described later. Into the controller 120 is input an external interrupt signal INT1 via the connection terminal 170. The connection terminal 170 is an input terminal of an external interrupt signal. Further, into the controller 120 are input interrupt signals (T0IRQ, P0IRQ, C0IRQ) from the peripheral circuits (145, 150, 151), without going through the buses (161 to 164).

The interrupt controller 121 is connected to the bus line 161 and the data bus line 164 via the I/O interface 122. The interrupt controller 121 has a function of setting priorities to interrupt requests. Into the interrupt controller 121 are input an external interrupt signal INT1 and interrupt signals (T0IRQ, P0IRQ, and C0IRQ) from the peripheral circuits (145, 150, and 151). When the interrupt controller 121 detects the interrupt signal, the interrupt controller 121 determines if the interrupt request is valid or not. If the interrupt request is valid, the interrupt controller 121 outputs an internal interrupt signal INT2 into the controller 120.

When the controller 120 receives the external interrupt signal INT1, the controller 120 outputs the internal interrupt signal INT2 into the CPU 110 so that the CPU 110 executes interrupt processing.

The register 180 for the controller 120 is formed in the controller 120 and the register 186 for the interrupt controller 121 is formed in the I/O interface 122.

Peripheral circuits of the microcontroller 100 will be described below. The CPU 110 has the timer circuit 145, the I/O port 150, and the comparator 151 as the peripheral circuits. The circuits are examples of the peripheral circuits, and a circuit needed for an electronic device using the microcontroller 100 can be provided as appropriate.

The timer circuit 145 has a function of measuring time in response to a clock signal TCLK (hereinafter, referred to as TCLK). In addition, the timer circuit 145 has a function of outputting the interrupt signal T0IRQ into terminals for requesting interrupt of the controller 120 and the interrupt controller 121 at a set time interval. The timer circuit 145 is connected to the bus line 161 and the data bus line 164 via the I/O interface 146.

In addition, the TCLK used in the timer circuit 145 is generated by a clock generation circuit 140. TCLK is a clock signal of which frequency is lower than that of MCLK. For example, the frequency of MCLK is about several megahertz (MHz) (e.g., 8 MHz) and the frequency of TCLK is about several tens of kilohertz (kHz) (e.g., 32 kHz). The clock generation circuit 140 includes the crystal oscillation circuit 141 incorporated in the microcontroller 100 and an oscillator 142 connected to the connection terminals 172 and 173. The oscillation unit of the oscillator 142 is a quartz crystal unit 143. In addition, the clock generation circuit 140 is made up of a CR oscillator and the like, and thereby, all modules in the clock generation circuit 140 can be incorporated in the microcontroller 100.

The I/O port 150 is an interface for connecting an external device to the connection terminal 174 in a state where information can be input and output, and an input/output interface for a digital signal. The I/O port 150 outputs interrupt signals P0IRQ to the terminals for requesting interrupt of the controller 120 and the interrupt controller 121 in response to an input digital signal.

The comparator 151 is a peripheral circuit that processes an analog signal input from the connection terminal 175. The comparator 151 compares a potential (or current) of the analog signal input from the connection terminal 175 with a potential (or current) of a reference signal and generates a digital signal of which the level is 0 or 1. Further, the comparator 151 generates an interrupt signal C0IRQ when the level of the digital signal is 1. The interrupt signals C0IRQ are output to the terminals for requesting interrupt of the controller 120 and the interrupt controller 121.

The I/O port 150 and the comparator 151 are connected to the bus line 161 and the data bus line 164 via the I/O interface 152 common to the both. Here, one I/O interface 152 is used because the I/O interfaces of the I/O port 150 and the comparator 151 can share a circuit; however, the I/O port 150 and the comparator 151 can have an I/O interface different from each other.

In addition, a register of each peripheral circuit is placed in the input/output interface corresponding to the peripheral circuit. A register 187 of the timer circuit 145 is placed in the I/O interface 146, and a register 183 of the I/O port 150 and a register 184 of the comparator 151 are placed in the I/O interface 152.

The microcontroller 100 includes the power gate unit 130 that can stop power supply to the internal circuits. Power is supplied to a circuit necessary for operation by the power gate unit 130, so that power consumption of the whole microcontroller 100 can be lowered.

As illustrated in FIG. 1, the circuits included in the units 101 to 104 surrounded by the dashed lines in the microcontroller 100 are connected to the connection terminal 171 via the power gate unit 130. The connection terminal 171 is a power supply terminal for supplying a high power supply potential VDD (hereinafter, referred to as VDD).

The power gate unit 130 is controlled by the controller 120. The power gate unit 130 includes switch circuits 131 and 132 for blocking supply of VDD to the units 101 to 104. ON/OFF of the switch circuits 131 and 132 is controlled by the controller 120. Specifically, the controller 120 outputs a control signal of the switch circuits 131 and 132 to the power gate unit 130 by using a request of the CPU 110, the external interrupt signal INT1, and the interrupt signal T0IRQ from the timer circuit 145 as a trigger.

In FIG. 1, the power gate unit 130 includes two switch circuits 131 and 132; however, the number of switch circuits can be set as needed for power supply stop. In this embodiment, the switch circuits can be provided so that power can be supplied to the timer circuit 145 and I/O interface 146 (unit 101) independently from other circuits.

FIG. 1 illustrates a state where power supply to the units 102 to 104 is stopped by the common switch circuit 132, but there is no limitation on the power supply path. For example, power supply to the RAM 112 can be controlled by another switch circuit, which is different from the switch circuit 132 for the CPU 110. Further, a plurality of switch circuits can be provided for one circuit.

In addition, VDD is constantly supplied from the connection terminal 171 to the controller 120 without going through the power gate unit 130. In order to reduce noise, a power supply potential from an external power supply circuit, which is different from the power supply circuit for VDD, is given to each of the oscillation circuit of the clock generation circuit 115 and the crystal oscillation circuit 141.

By provision of the controller 120, the power gate unit 130, and the like, the microcontroller 100 can operate in three kinds of operation modes. The first operation mode is a normal operation mode where all circuits included in the microcontroller 100 are active. This mode is referred to as "Active mode".

The second and third operation modes are low power consumption modes where some of the circuits are active. In one of the low power consumption modes, the controller 120, the timer circuit 145, and circuits (the crystal oscillation circuit 141 and the I/O interface 146) associated thereto are active. In the other of the low power consumption modes, the controller 120 alone is active. Here, the former low power consumption mode is referred to as "Noff1 mode" and the latter low power consumption mode is referred to as "Noff2 mode".

Table 1 below shows a relation between each mode and active circuits. In Table 1, ON is given to circuits that are active. As shown in Table 1, the controller 120 and some of the peripheral circuits (circuits necessary for timer operation) alone operate in Noff1 mode and the controller 120 alone operates in Noff2 mode.

TABLE 1

|  | Active | Noff1 | Noff2 |
|---|---|---|---|
| CPU 110 | ON | — | — |
| Bus bridge 111 | ON | — | — |
| RAM 112 | ON | — | — |
| Memory interface 113 | ON | — | — |
| Clock generation circuit 115 | ON | — | — |
| Crystal oscillation circuit 141 | ON | ON | — |
| Controller 120 | ON | ON | ON |
| Interrupt controller 121 | ON | — | — |
| I/O interface 122 | ON | — | — |
| Timer circuit 145 | ON | ON | — |
| I/O interface 146 | ON | ON | — |
| I/O port 150 | ON | — | — |
| Comparator 151 | ON | — | — |
| I/O interface 152 | ON | — | — |

Note that power is constantly supplied to the oscillator of the clock generation circuit 115 and the crystal oscillation circuit 141 regardless of the operation modes. In order to bring the clock generation circuit 115 and the crystal oscillation circuit 141 into non-active modes, an enable signal is input from the controller 120 or an external circuit to stop oscillation of the clock generation circuit 115 and the crystal oscillation circuit 141.

In addition, in Noff1 and Noff2 modes, power supply is stopped by the power gate unit 130, so that the I/O port 150 and the I/O interface 152 are non-active, but power is supplied to parts of the I/O port 150 and the I/O interface 152 in order to allow the external device connected to the connection terminal 174 to operate normally. Specifically, power is supplied to an output buffer of the I/O port 150 and the register 183 of the I/O port 150. In the Noff1 and Noff2 modes, actual functions of the I/O port 150, that is, functions of data transmission between the I/O interface 152 and the external device and generation of an interrupt signal, are stopped. In addition, a communication function of the I/O interface 152 is also stopped similarly.

Note that in this specification, the phrase "a circuit is non-active" includes a state where major functions in Active mode (normal operation mode) are stopped and an operation state with power consumption lower than that of Active mode, as well as a state that a circuit is stopped by power supply stop.

Further, in order that the microcontroller 100 can return from the Noff1 or Noff2 mode to Active mode more rapidly, the registers 185 to 187 each have a backup storage portion for saving data at the time of power supply stop. In other words, the registers 185 to 187 each include a volatile data storage portion (volatile memory) and a nonvolatile data storage portion (nonvolatile memory). In Active mode, by accessing the volatile memories of the registers 185 to 187, data is written and read out.

On the other hand, because data stored in the register 184 of the comparator 151 is not required to be stored at the time of power supply stop, the register 184 includes no nonvolatile memories. In addition, as described above, in Noff1 and Noff2 modes, the I/O port 150 acts as an output buffer and the register 183 also operates, and thus the register 183 includes no nonvolatile memories.

In the shift from Active mode to Noff1 or Noff2 mode, prior to power supply stop, data stored in the volatile memories of the registers 185 to 187 are written into the nonvolatile memories, so that data in the volatile memories are reset to initial values.

In the return from Noff1 or Noff2 mode to Active mode, when power is supplied again to the registers 185 to 187, data in the volatile memories are reset to initial values. Then, data in the nonvolatile memories are written into the volatile memories.

Accordingly, even in the low power consumption mode, data necessary for processing of the microcontroller 100 are stored in the registers 185 to 187, and thus, the microcontroller 100 can be returned instantly from the low power consumption mode to Active mode.

The switching of operation modes is controlled by the CPU 110 and the controller 120. The switching of operation modes will be described with reference to FIG. 3, FIG. 4, and FIG. 5.

Figure 3:
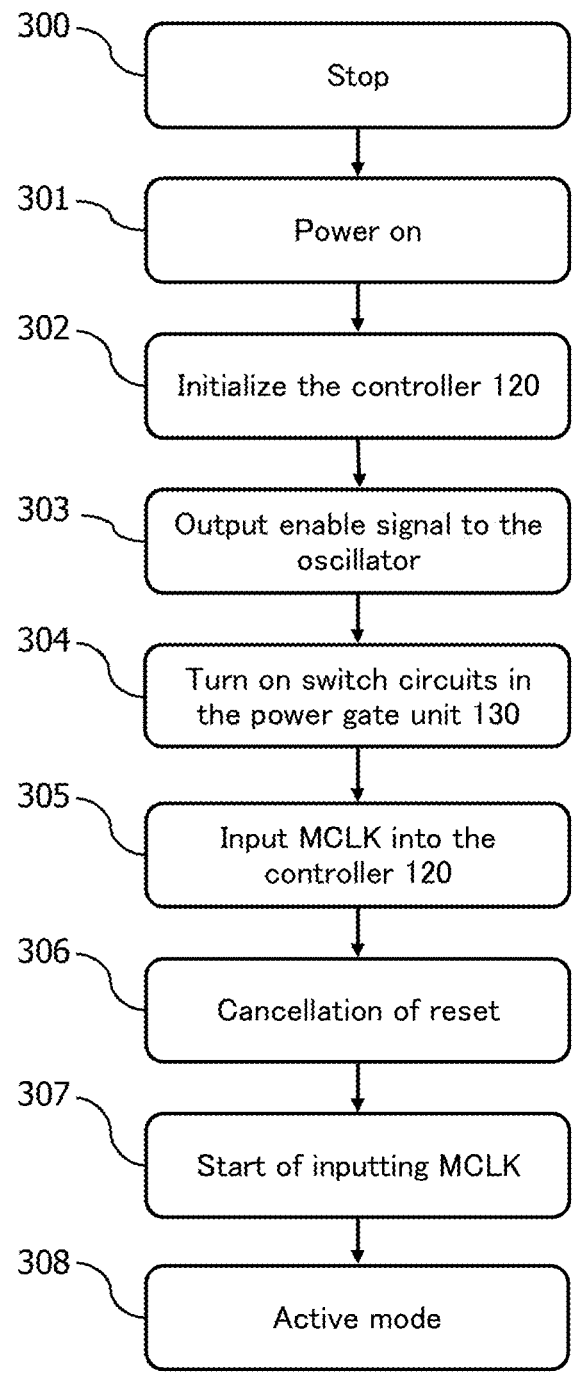
FIG. 3 is a flow chart of an example of processing at the time of power supply.

FIG. 3 is a flow chart showing processing by the controller 120 when power is supplied to the microcontroller 100. First, power is supplied to some circuits of the microcontroller 100 from an external power supply (Steps 309 and 310). In Step 309, VDD is supplied to only a control portion of the power gate unit 130 in the controller 120. In addition, power is also supplied to an oscillator of the clock generation circuit 115 and the crystal oscillation circuit 141. In the controller 120, the control portion of the power gate unit 130 is initialized (Step 302).

The controller 120 outputs an enable signal for starting oscillation to the clock generation circuit 115 and the crystal oscillation circuit 141 (Step 303). In addition, the controller 120 outputs a control signal to the power gate unit 130, so that all switch circuits (131 and 132) in the controller 120 are turned on (Step 304). In Step 303, MCLK is generated by the clock generation circuit 115, and TCLK is generated by the clock generation circuit 140. In addition, in Step 304, VDD is supplied to all circuits connected to the connection terminal 171. Then, inputting MCLK into the controller 120 is started so that all the circuits in the controller 120 are active (Step 305).

The controller 120 cancels reset of each circuit in the microcontroller 100 (Step 306), so that inputting MCLK into the CPU 110 is started (Step 307). By inputting MCLK, the CPU 110 starts to operate and thus the microcontroller 100 operates in Active mode (Step 308).

The shift from Active mode to the power consumption mode (Noff1 or Noff2 mode) is determined by execution of a program by the CPU 110. The CPU 110 writes a request for shifting the operation mode to the low power consumption mode in an address for requesting the low power consumption mode in the register 180 of the controller 120 (hereinafter, the address is referred to as Noff_TRIG). In addition, the CPU 110 writes data for shifting the operation mode to either Noff1 mode or Noff2 mode in a predetermined address of the register 180 (hereinafter, the address is referred to as Noff_MODE).

The controller 120 starts to shift the operation mode to Noff1 mode or Noff2 mode by using data written in Noff_TRIG of the register 180 as a trigger.

In the register 180, the data storage portion for a shift of the operation mode includes a volatile memory alone. Accordingly, by power supply stop, Noff_TRIG and Noff_MODE are initialized. Here, the initial value of Noff_MODE is Active mode. By setting in this manner, the operation mode can be returned from the low power consumption mode to Active mode, even when the CPU 110 does not operate and data is not written into Noff_TRIG.

Figure 4:
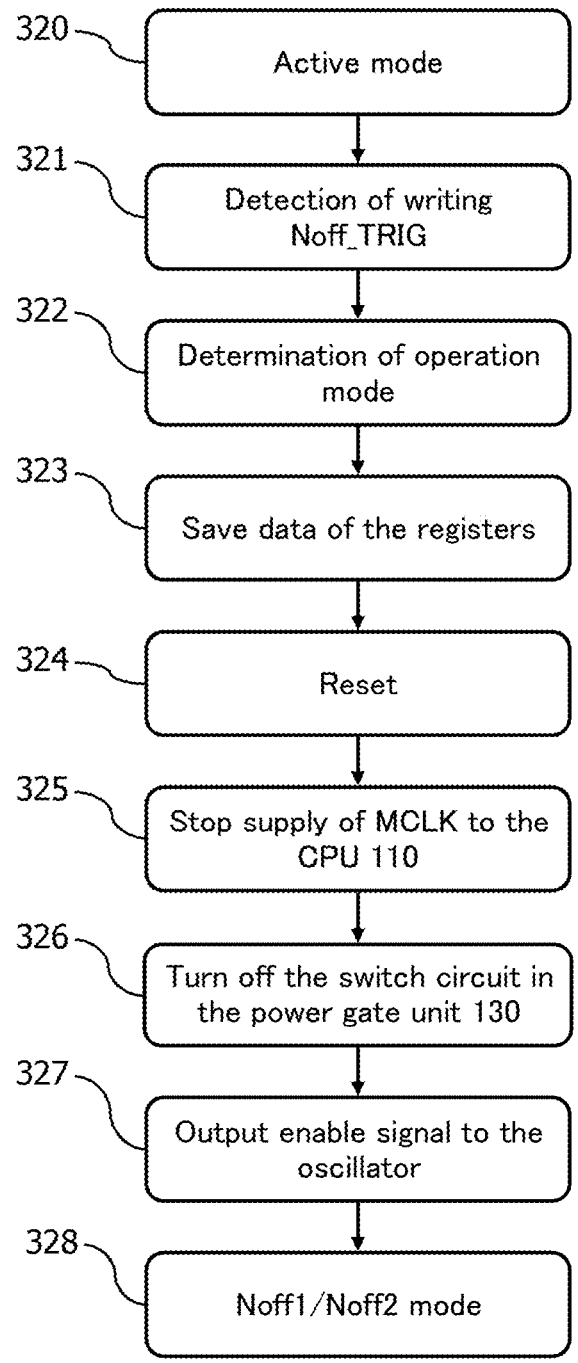
FIG. 4 is a flow chart of an example of a shift from Active mode to Noff1/Noff2 modes.

FIG. 4 is a flow chart showing the shift from Active mode to Noff1 or Noff2 mode. In Active mode, by detection of writing data in Noff_TRIG of the register 180 (Steps 320 and 321), the controller 120 determines an operation mode to be shifted from Active mode, depending on a value of Noff_MODE (Step 322). Here, in processing in FIG. 4, an example of the shift to Noff1 mode is described; however, the same can be applied to the shift to Noff2 mode.

The controller 120 outputs a control signal for requesting saving data to the registers 185 and 186 to which no power is supplied (Step 323) in Noff1 mode. When the registers 185 and 186 receive a control signal from the controller 120, data of the volatile memories are saved (backed up) in the nonvolatile memories.

Next, the controller 120 outputs a control signal for resetting a circuit to which no power is supplied in Noff1 mode (Step 324), and stops supply of MCLK to the CPU 110 (Step 325). The controller 120 outputs a control signal to the power gate unit 130, so that the switch circuit 132 is turned off (Step 326). In Step 326, power supply to the units 102 to 104 is stopped. Then, the controller 120 outputs an enable signal for stopping oscillation to the clock generation circuit 115 (Step 327). Through these steps, the operation mode is shifted to Noff1 mode (Step 328).

When the shift to Noff2 mode is determined in Step 322, data is backed up also in the register 187 for the timer circuit 145 in Step 323. In Step 326, the switch circuit 131 is also turned off. In Step 327, the enable signal for stopping oscillation is output to the crystal oscillation circuit 141 too.

The shift from Noff1 or Noff2 mode to Active mode is triggered by an interrupt signal received by the controller 120. In Noff1 mode, an external interrupt signal INT1 or an interrupt signal T0IRQ from the timer circuit 145 serves as a trigger, and in Noff2 mode, and an external interrupt signal INT1 serves as a trigger.

Figure 5:
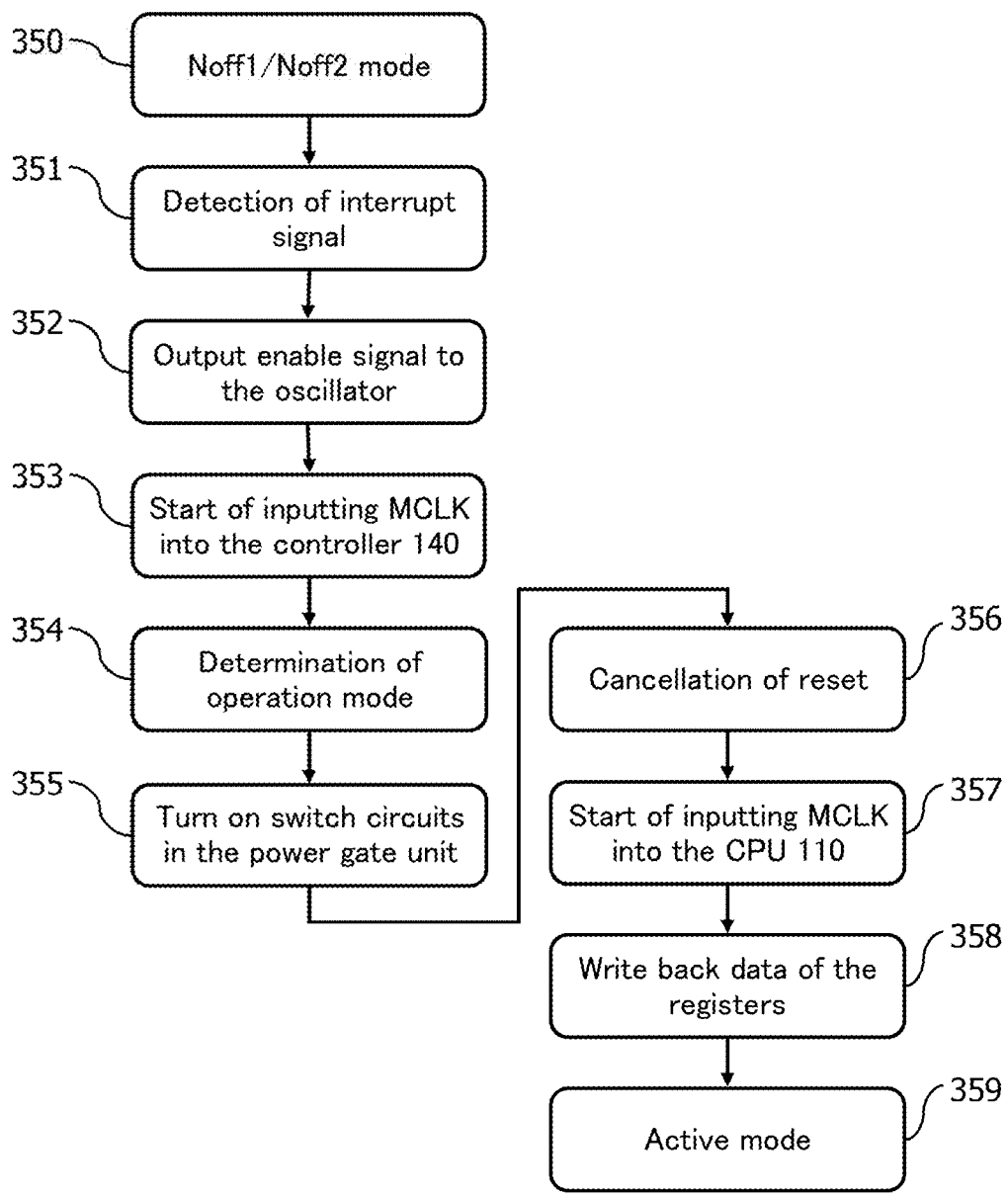
FIG. 5 is a flow chart of an example of a shift from Noff1/Noff2 modes to Active mode.

FIG. 5 is a flow chart showing a return process from Noff1 or Noff2 mode to Active mode. Here, a case where the operation mode is returned from Noff1 mode to Active mode is described and the same can be applied to Noff2 mode too.

In Noff1 or Noff2 mode, when the controller 120 detects an interrupt signal and the controller 120 outputs an enable signal to the oscillator of the clock generation circuit 115 to restart oscillation, so that MCLK is output from the clock generation circuit 115 to the controller 120 (Steps 350 to 353).

The controller 120 determines an operation mode to be shifted, depending on a value of Noff_MODE in the register 180 (Step 354). In Noff1 or Noff2 mode, data in Noff_MODE is reset to an initial value, and thus Active mode is selected.

The controller 120 controls the power gate unit 130 to turn on the switch circuit 132 (Step 355). Then, the controller 120 cancels reset of the units 102 to 104 for which power supply is started again (Step 356), and supply of MCLK to the CPU 110 is started again (Step 357). Then, control signals are output to the registers 185 and 186 and data backed up in the nonvolatile memories are written back into the volatile memories (Step 358). Through these steps, the microcontroller 100 returns to Active mode (Step 359).

As described above, in Noff1 mode, the controller 120 enables the microcontroller 100 to return to Active mode in response to the interrupt signal T0IRQ from the timer circuit 145. Accordingly, by the timer function of the timer circuit 145, the microcontroller 100 can operate intermittently. In other words, the interrupt signal T0IRQ is output at regular intervals, so that the operation mode can be returned from Noff1 mode to Active mode regularly. In Active mode, when the controller 120 determines that processing in the microcontroller 100 finishes, the controller 120 executes the above-described control processing to bring the microcontroller 100 into Noff1 mode.

The microcontroller 100 should be in Active mode so that the CPU 110 can operate and process signals input from the connection terminals 174 and 175, but the time needed for the arithmetic processing of the CPU 110 is extremely short. Accordingly, in accordance with this embodiment, the microcontroller 100 can operate in the low power consumption mode (Noff1 mode), except for the period in which an external signal is processed.

Therefore, the microcontroller 100 is very suitable for devices that operate by intermittent control, such as a sensing device and a monitoring device. For example, the microcontroller 100 is suitable for control devices of fire alarms, smoke detectors, management units of secondary batteries, and the like. In particular, devices having batteries as power sources have a problem of power consumption due to long time operation. However, because in most part of the operation period of the microcontroller 100, only circuits needed for allowing the microcontroller 100 to return to Active mode operate, the power consumption during operation can be lowered.

Accordingly, in accordance with this embodiment, it is possible to provide the microcontroller that can operate with low power consumption by employing the low power consumption mode and can return to the normal operation mode rapidly from the low power consumption mode.

Further, necessary data can be backed up in nonvolatile memories of registers before power supply is stopped and thus, processing for power supply stop can be started before the finish of CPU processing, which leads to an increase of flexibility in timing for power supply stop.

This embodiment can be combined with another embodiment as appropriate.

(Embodiment 2)

A register including both a nonvolatile memory and a volatile memory will be described with reference to FIG. 6.

Figure 6:
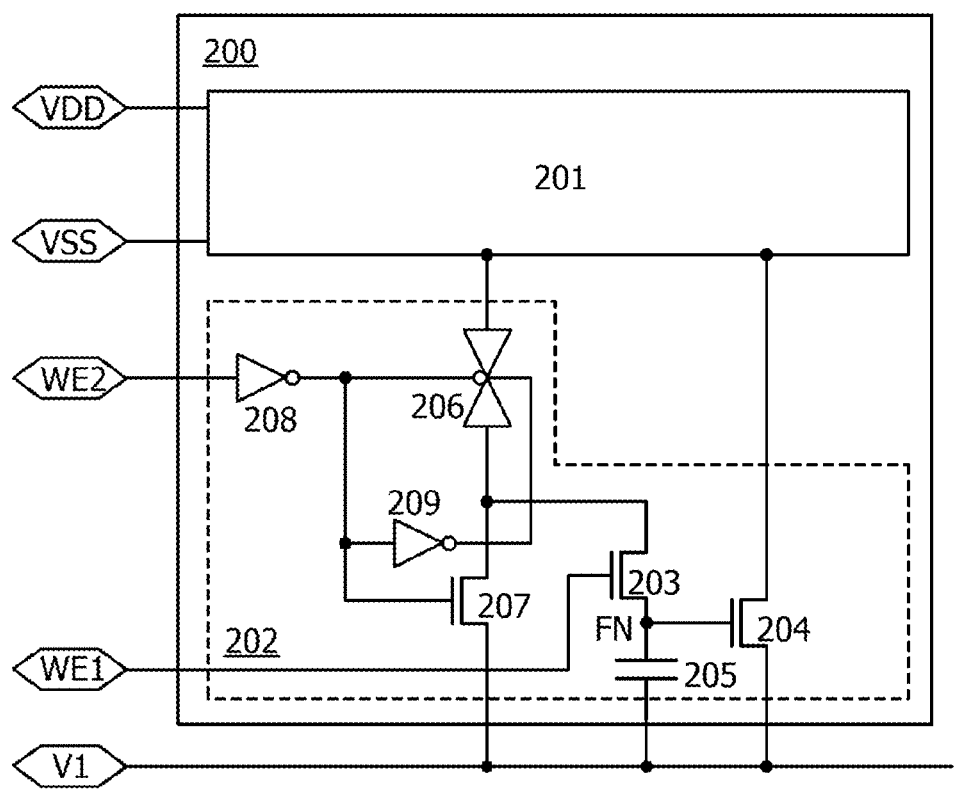
FIG. 6 is a circuit diagram illustrating an example of a register configuration.

FIG. 6 is a circuit diagram of a register including both a nonvolatile memory and a volatile memory. FIG. 6 illustrates a register 200 having a one-bit memory capacity. The register 200 includes memory circuits 201 and 202. The memory circuit 201 is a one-bit volatile memory, while the memory circuit 202 is a one-bit nonvolatile memory. Note that the register 200 can include another component such as a diode, a resistor, or an inductor.

To the memory circuit 201 is given a low power supply potential VSS (hereinafter, referred to as VSS) and a high power supply potential VDD (hereinafter, referred to as VDD) as power supply potentials. The memory circuit 201 can store data during a period in which a potential difference between VDD and VSS is supplied as a power supply potential.

The memory circuit 202 includes a transistor 203, a transistor 204, a capacitor 205, a transmission gate 206, a transistor 207, an inverter 208, and an inverter 209.

A potential based on data of the memory circuit 201 is input into the memory circuit 202 through the transmission gate 206. The transistor 203 controls supply of the potential to a node FN. Further, the transistor 203 controls supply of a potential V1 to the node FN. In FIG. 6, ON/OFF of the transistor 203 is controlled by a signal WE1. Note that the potential V1 may be equal to VSS or VDD.

The node FN is a data storage portion in the memory circuit 202. The potential of the node FN is stored by the transistor 203 and the capacitor 205. Based on the potential of the node FN, ON/OFF of the transistor 204 is controlled. When the transistor 204 is turned on, the potential V1 is supplied to the memory circuit 201 through the transistor 204.

In response to a signal WE2, ON/OFF of the transmission gate 206 is controlled. To the transmission gate 206 are input a signal having an inverted polarity of the signal WE2 and a signal having the same polarity as the signal WE2. Here, the transmission gate 206 is turned off when the potential of the signal WE2 is at a high level and is turned on when it is at a low level.

In response to the signal WE2, ON/OFF of the transistor 207 is controlled. Here, the transistor 207 is turned on when the potential of the signal WE2 is at a high level, and the transistor 207 is turned off when the signal WE2 is at a low level. Note that instead of the transistor 207, another switch, such as a transmission gate, having a form different from the transistor 207 can be used.

In order to enhance the charge retention characteristics of the memory circuit 202, an off-state current of the transistor 203 is preferably as small as possible. This is because when an off-state current of the transistor 203 is small, the amount of charge leaked from the node FN can be reduced. As a transistor which allows leakage current to be lower than a transistor formed of single crystal silicon, a transistor formed using a thin film of oxide semiconductor which has a bandgap wider than silicon and an intrinsic carrier density lower than silicon is given.

Among oxide semiconductors, in particular, a highly purified oxide semiconductor (purified OS) obtained by reduction of impurities such as moisture or hydrogen serving as an electron donor (donor) and by reduction of oxygen vacancies is an intrinsic (i-type) semiconductor or a substantially i-type semiconductor. For this reason, a transistor having a channel formation region in a highly purified oxide semiconductor layer has an extremely small amount of off-state current and high reliability, and thus is suitable for the transistor 203.

Here, in order to describe "low off-state current" of the transistor whose channel is formed in the oxide semiconductor film of the multilayer film, measurement results of off-state current of the transistor including the multilayer film are described.

<Measurement of Off-state Current of Transistor Including Multilayer Film>

First, a measurement sample is described.

First, a base insulating film was formed over a silicon substrate. A 300-nm-thick silicon oxynitride was formed as the base insulating film by a CVD method.

Next, a first oxide film was formed over the base insulating film. The first oxide film was formed to a thickness of 5 nm by a sputtering method using a target that is an In—Ga—Zn oxide (having an atomic ratio of In:Ga:Zn=1:3:2). Note that the deposition was performed under a condition where an argon gas at a flow rate of 30 sccm and an oxygen gas at a flow rate of 15 sccm were used as a deposition gas, the pressure was 0.4 Pa, the substrate temperature was 200° C., and a DC power of 0.5 kW was applied.

Next, an oxide semiconductor film was formed over the first oxide film. As the oxide semiconductor film, a 15-nm-thick In—Ga—Zn oxide was formed by a sputtering method using a target that was an In—Ga—Zn oxide (having an atomic ratio of In:Ga:Zn=1:1:1. Note that an argon gas (flow rate: 30 sccm) and an oxygen gas (flow rate: 15 sccm) were used as a deposition gas, the pressure was set to be 0.4 Pa, the substrate temperature was set to be 300° C., and a DC power of 0.5 kW was applied.

Next, a second oxide film was formed over the oxide semiconductor film. As the second oxide film, a 5-nm-thick In—Ga—Zn oxide was formed by a sputtering method using a target that was an In—Ga—Zn oxide (having an atomic ratio of In:Ga:Zn=1:3:2. Note that an argon gas (flow rate: 30 sccm) and an oxygen gas (flow rate: 15 sccm) were used as a deposition gas, the pressure was set to be 0.4 Pa, the substrate temperature was set to be 200° C., and a DC power of 0.5 kW was applied.

Next, heat treatment was performed to release water, hydrogen, and the like contained in the oxide semiconductor film. Here, heat treatment at 450° C. for one hour in a nitrogen atmosphere was performed, and then heat treatment at 450° C. for one hour in an oxygen atmosphere was performed.

Then, a conductive film was formed over the base insulating film and the second oxide film, a mask was formed over the conductive film by a photolithography process, and the conductive film was partly etched using the mask, so that a source electrode and a drain electrode were formed. Note that as the conductive film to be the source electrode and the drain electrode, a 100-nm-thick tungsten film was formed.

Next, a gate insulating film was formed over the second oxide film, the source electrode, and the drain electrode. A 30-nm-thick silicon oxynitride film was formed as the gate insulating film by a CVD method.

Then, a gate electrode was formed over the gate insulating film. A 30-nm-thick tantalum nitride film was formed by a sputtering method and a 135-nm-thick tungsten film was formed over the tantalum nitride film by a sputtering method. A mask was formed over the tungsten film by a photolithography process, and the tantalum nitride film and the tungsten film were partly etched using the mask, so that the gate electrode was formed.

Next, an interlayer insulating film was formed to cover the components. The interlayer insulating film was formed in such a manner that a 70-nm-thick aluminum oxide film was formed by a sputtering method and a 300-nm-thick silicon oxynitride film was formed over the aluminum oxide film by a CVD method.

In the transistor, the channel length L is 0.73 μm, the channel width W is 1 cm, and the length Loff between the gate electrode and the source electrode (or the drain electrode) is 0.67 μm.

Through the above process, the sample transistor was fabricated.

Next, measurement results of leakage current of the fabricated transistor are described.

The following two measurement conditions in a dark condition were employed: a condition where a dry atmosphere was used, Vgs was −4 V, VDS was −1V, and the temperature was 85° C.; and a condition which is the same as the condition except that the temperature was 125° C.

Figure 25:
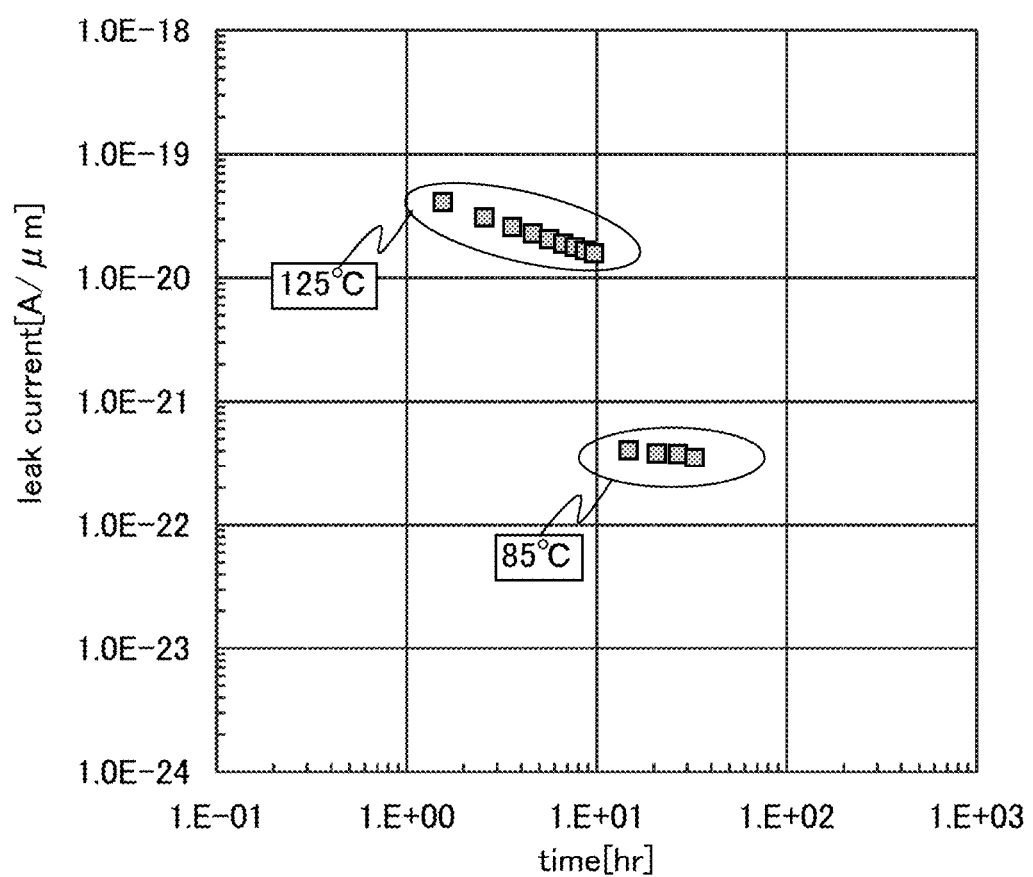
FIG. 25 shows measurement results of off-state current of a transistor including a multilayer film.

As shown in FIG. 25, the low off-state currents are low at 85° C. and 125° C., i.e., less than or equal to $1 \times 10^{-21}$ A/μm and less than or equal to $1 \times 10^{-19}$ A/μm, respectively, even after time has passed.

The above results show that the transistor including a multilayer film has extremely low off-state current.

As described above, the transistor whose channel is formed in the oxide semiconductor film in the multilayer film is used, whereby the transistor can have extremely low off-state current. Further, in a register including the transistor, charge holding characteristics of a memory circuit can be improved.

Next, an example of operation of the register 200 is described.

For the shift from Active mode to the low power consumption mode, data is backed up in the memory circuit 202 from the memory circuit 201. In order to reset the memory circuit 202 before backup of data, the transmission gate 206 is turned off, the transistor 207 is turned on, and the transistor 203 is turned on, so that the potential V1 is supplied to the node FN. In this manner, the potential of the node FN is set to an initial state.

Then, data is backed up from the memory circuit 201 into memory circuit 202. By turning on the transmission gate 206, turning off the transistor 207, and turning on the transistor 203, a potential reflecting the amount of charge stored in the memory circuit 201 is given to the node FN. In other words, data of the memory circuit 201 is written into the memory circuit 202. After writing data, the transistor 203 is turned off so that the potential of the node FN is stored. In this manner, data of the memory circuit 201 is stored in the memory circuit 202.

Then, power supply to the register 200 is stopped. In order to stop the power supply, VSS is given to a node to which VDD is given, by the power gate unit 130. Because the transistor 203 has extremely low off-state current, even when no VDD is supplied to the register 200, charge stored in the capacitor 205 or the gate capacitor of the transistor 204 can be stored for a long period. Thus, the memory circuit 202 can store data even during a period in which power supply is stopped.

For the return from the low power consumption mode to Active mode, supply VDD to the register 200 is restarted. Then, the memory circuit 201 is reset to an initial state. This step is made by giving VSS to the node storing the charge of the memory circuit 201.

Then, data stored in the memory circuit 202 is written into the memory circuit 201. When the transistor 204 is turned on, the potential V1 is given to the memory circuit 201. Since the memory circuit 201 receives the potential V1, a potential VDD is given to the node storing data. When the transistor 204 is turned off, the potential of the node storing data in the memory circuit 201 remains initial. Through the operation, data of the memory circuit 202 is stored in the memory circuit 201.

By using the register 200 for the registers to which power is not supplied, in the microcontroller 100 in a low power consumption mode, data can be backed up in a short period during processing by the microcontroller 100. Further, after power supply is restarted, the operation mode can be returned to a state before power supply stop in a short period. Thus, in the microcontroller 100, the power supply can be stopped even for a period as long as 60 seconds or as short as several milliseconds. As a result, the microcontroller 100 that consumes less power can be provided.

In the register 200, in accordance with the potential stored in the node FN in the memory circuit 202, the operation state (ON or OFF) of the transistor 204 is selected, so that data of 0 or 1 is read out based on the selected operation mode. Thus, the original data can be accurately read even when the amount of charge stored in the node FN fluctuates to some degree during the power supply stop.

In addition, VDD or VSS is supplied to the node FN in the memory circuit 202, based on the amount of charge stored in the memory circuit 201. In a case where the potential of the node FN when the gate voltage of the transistor 204 is equal to a threshold voltage is set as a potential V0, the potential V0 is a value between VDD and VSS and the operation mode of the transistor 204 is switched when the node FN takes the potential V0. However, the potential V0 is not necessarily equal to a medial between VDD and VSS. For example, if a potential difference between VDD and the potential V0 is larger than a potential difference between VSS and the potential V0, it takes longer for the node FN to reach the potential V0 by giving VSS to the node FN storing VDD than by giving VDD to the node FN storing VSS. For this reason, switching of the transistor 204 is performed slowly.

However, in the register 200, before data of the memory circuit 201 is written into the memory circuit 202, the potential V1 is given to the node FN, so that the potential of the node FN can be set into an initial state. In this manner, even when the potential V0 is smaller than the median between VDD and VSS, the potential V1 equal to the potential VSS is given in advance to the node FN, thereby shortening the time required for giving the potential VSS to the node FN. As a result, data can be written into the memory circuit 202 rapidly.

In addition, the register 200 including the transistor 203 with extremely low off-state current can reduce power consumption (overhead) resulting from operations such as data backup and data recovery, as compared with nonvolatile memories such as an MRAM. As a comparative example, a magnetoresistive random access memory (MRAM) is given. A general MRAM needs 50 µA to 500 µA as a current for writing data. On the other hand, the current of the register 200 for writing data can be about 1/100 of that of such an MRAM because in the register 200, data is backed up by supply of charge to a capacitor. Accordingly, in the register 200, a period of power supply stop, in which overhead and power reduced by power supply stop are equal, that is break even time (BET) can be shorter than the case where an MRAM is used for a register. In other words, power consumed when data is backed up in the register at the time of shifting the operation mode can be reduced by applying the register 200 to the registers of the microcontroller 100.

This embodiment can be combined with another embodiment as appropriate.

(Embodiment 3)

Figure 7:
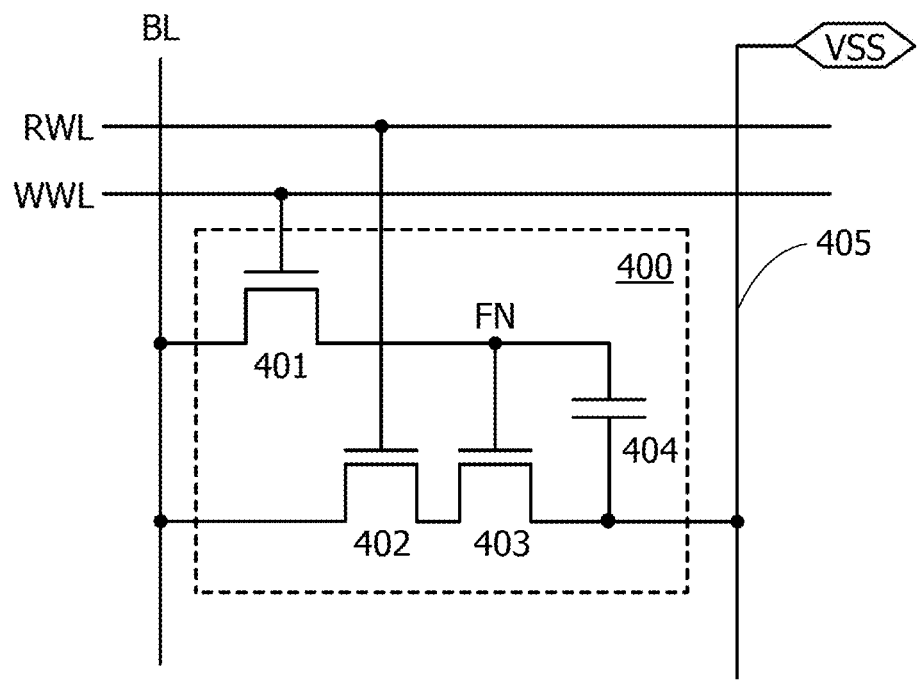
FIG. 7 is a circuit diagram illustrating an example of a RAM memory cell configuration.

A memory cell structure of the RAM 112 is described with reference to FIG. 7. FIG. 7 is a circuit diagram of a memory cell 400 in the RAM 112. The memory cell 400 includes three transistors 401 to 403 and a capacitor 404. The memory cell 400 is connected to a bit line BL, a word line RWL, and a word line WWL. The word line RWL is a read word line, and the word line WWL is a write word line. In addition, VSS is supplied from a power supply line 405 to the memory cell 400. When VSS is a potential higher than 0 V, the potential of the power supply line 405 can be 0 V.

The bit line BL is connected to a read-out circuit and a write circuit of the RAM 112. In addition, the word lines RWL and WWL are connected to a row driver.

In order that the memory cell 400 can act as a nonvolatile memory circuit, the transistor 401 is preferably a transistor with extremely low off-state current, like the transistor 203 in the register 200. This is because the charge of the node FN (the gate of the transistor 403) is stored as data in the memory cell 400.

Operations of readout and write are described below. In order that data can be written in the memory cell 400, the potential of the word line RWL is set at a low level and the potential of the word line WWL is set at a high level, so that the transistor 401 alone is turned on. The charge corresponding to the potential of the bit line BL is accumulated in the node FN. After the potential of the word line WWL is kept at a high level for a certain period, the potential is set back to a low level, whereby the write operation is finished.

To perform readout operation, the potential of the bit line BL is set at a high level (precharge). Then, the potential of the word line WWL is set at a low level and the potential of the word line RWL is set at a high level, so that the transistor 402 is turned on. Between a source and a drain of the transistor 403, a current corresponding to the potential of the gate (node FN) flows. Depending on the amount of the current flowing, the potential of the bit line BL is decreased. The readout circuit detects a shift amount of the potential of the bit line BL and determines whether data stored in the memory cell 400 is 0 or 1.

The memory cell 400 in this embodiment controls ON/OFF of only one transistor for both the readout operation and the write operation, and thus, a rapidly-operable RAM, which is nonvolatile, can be provided.

This embodiment can be combined with another embodiment as appropriate.

(Embodiment 4)

Figure 8:
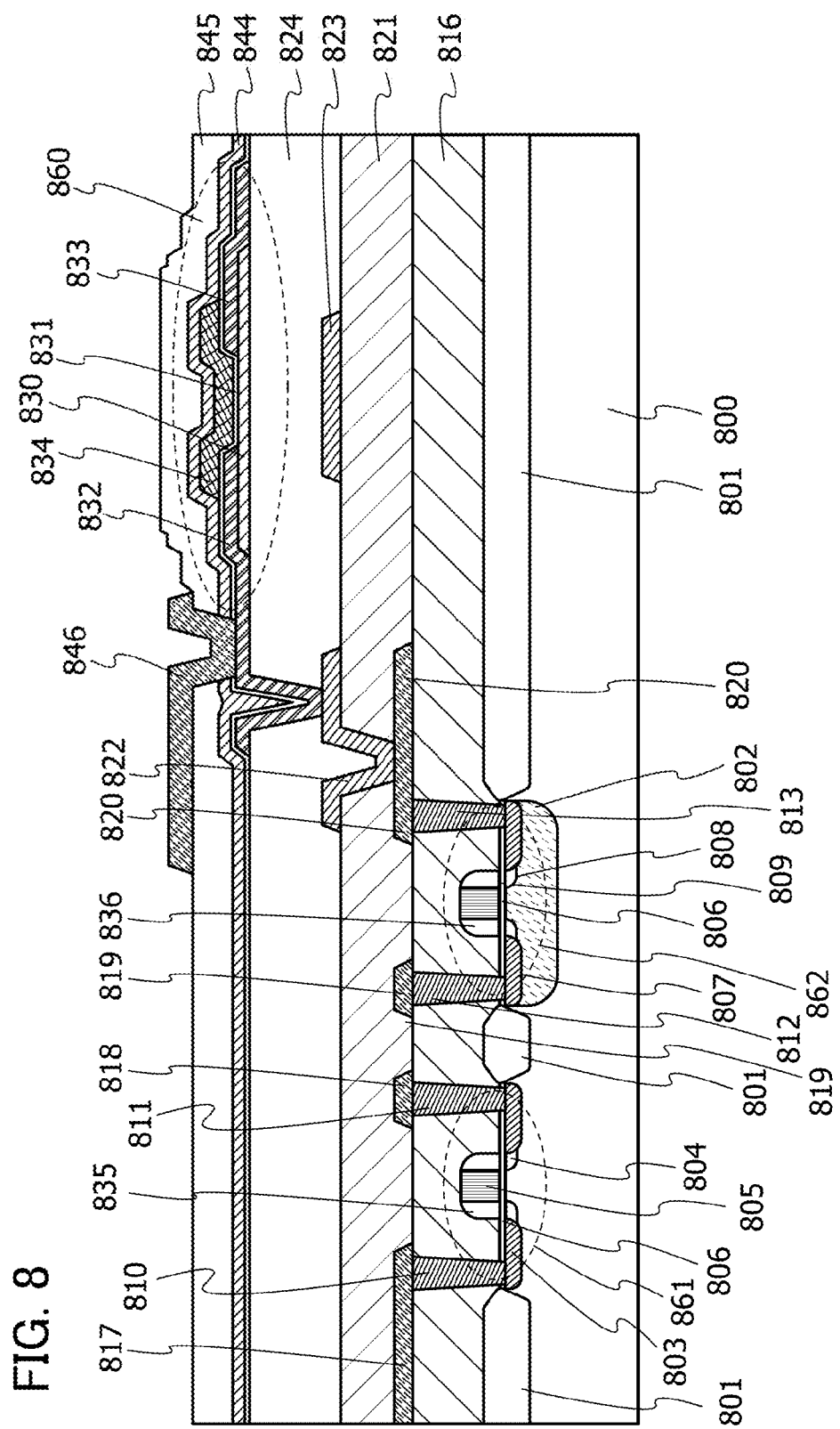
FIG. 8 is a cross-sectional view illustrating an example of a microcontroller structure.

Each circuit in the microcontroller 100 can be formed on the same semiconductor substrate. FIG. 8 illustrates an example of a cross-sectional structure of a part of the microcontroller 100. In FIG. 8, as main components making up of circuits in the microcontroller 100, a transistor 860 having a channel formation region in an oxide semiconductor layer and a p-channel transistor 861 and an n-channel transistor 862 each having a channel formation region in a silicon substrate are illustrated.

The transistor 860 is applied to the memory cell of the RAM 112 (the transistor 401 in FIG. 7), and the registers 185 to 187 (see the transistor 203 in FIG. 6). The transistors 861 and 862 can be applied to other transistors.

As illustrated in FIG. 8, the transistor 861 and the transistor 862 are formed on a semiconductor substrate 800. The semiconductor substrate 800 can be, for example, a single crystal silicon substrate having n-type or p-type conductivity, a compound semiconductor substrate (e.g., a GaAs substrate, an InP substrate, a GaN substrate, a SiC substrate, or a ZnSe substrate), or the like. In FIG. 8, a case where a single crystal silicon substrate having n-type conductivity is used is illustrated as an example.

In addition, the transistors 861 and 862 are electrically isolated from each other by an element isolation insulating film 801. The element isolation insulating film 801 can be formed by a selective oxidation method such as a local oxidation of silicon (LOCOS) method, a trench isolation method, or the like. The semiconductor substrate 800 may be an SOI type semiconductor substrate. In this case, element isolation can be conducted by dividing a semiconductor layer into elements by etching.

In a region where the transistor 862 is to be formed, a p-well 802 is formed by selective addition of an impurity element imparting p-type conductivity.

The transistor 861 includes an impurity region 803, a low concentration impurity region 804, a gate electrode 805, and a gate insulating film 806 formed between the gate electrode 805 and the semiconductor substrate 800. The gate electrode 805 includes a sidewall 836 in its periphery.

The transistor 862 includes an impurity region 807, a low concentration impurity region 808, a gate electrode 809, and the gate insulating film 806. The gate electrode 809 includes a sidewall 835 in its periphery.

An insulating film 816 is formed over the transistors 861 and 862. Opening portions are formed in the insulating film 816, and a wiring 810 and a wiring 811 are formed to be in contact with the impurity regions 803, and a wiring 812 and a wiring 813 are formed to be in contact with the impurity regions 807.

The wiring 810 is connected to a wiring 817 formed over the insulating film 816, the wiring 811 is connected to a wiring 818 formed over the insulating film 816, the wiring 812 is connected to a wiring 819 formed over the insulating film 816, and the wiring 813 is connected to a wiring 820 formed over the insulating film 816.

An insulating film 821 is formed over the wirings 817 to 820. An opening portion is formed in the insulating film 821, a wiring 822 and a wiring 823 connected to the wiring 820 in the opening portion are formed over the insulating film 821. In addition, an insulating film 824 is formed over the wiring 822 and the wiring 823.

A transistor 860 having an oxide semiconductor layer 830 is formed over the insulating film 824. The transistor 860 includes a conductive film 832 and a conductive film 833 each of which serves as a source electrode or a drain electrode, a gate insulating film 831, and a gate electrode 834 over the oxide semiconductor layer 830. The conductive film 832 is connected to the wiring 822 in the opening portion formed in the insulating film 824.

The wiring 823 is overlapped with the oxide semiconductor layer 830 with the insulating film 824 interposed therebetween. The wiring 823 acts as a backgate of the transistor 860. The wiring 823 can be formed as needed.

The transistor 860 is covered with an insulating film 844 and an insulating film 845. The insulating film 844 is preferably an insulating film that can prevent hydrogen released from the insulating film 845 from entering the oxide semiconductor layer 830. Examples of such an insulating film are a silicon nitride film and the like.

A conductive film 846 is formed over the insulating film 844. The conductive film 846 is in contact with the conductive film 832 in an opening portion formed in the insulating film 844, the insulating film 845, and the gate insulating film 831.

The thickness of the oxide semiconductor layer 830 is preferably from 2 nm to 40 nm. The oxide semiconductor layer 830 is preferably an i-type (intrinsic) or substantially intrinsic oxide semiconductor so as to form a channel formation region of the transistor 860. Note that an oxide semiconductor layer which is highly purified by reduction of impurities serving as electron donors (donors), such as moisture and hydrogen, and which includes reduced oxygen vacancies is an intrinsic (i-type) semiconductor or a substantially i-type semiconductor. Here, such an oxide semiconductor layer is referred to as a highly-purified oxide semiconductor layer. A transistor formed using a highly-purified oxide semiconductor layer has an extremely small amount of off-state current and high reliability.

The carrier density of the oxide semiconductor layer 830 is preferably $1\times10^{17}/cm^3$ or lower, more preferably $1\times10^{16}/cm^3$ or lower, $1\times10^{15}/cm^3$ or lower, $1\times10^{14}/cm^3$ or lower, or $1\times10^{13}/cm^3$ or lower, for forming a transistor with low off-state current.

The source-drain current of the transistor 860 in an off state can be $1\times10^{-18}$ A or lower at room temperature (about 25° C.) as the result of using the oxide semiconductor layer 830. The off-state source-drain current at room temperature (about 25° C.) is preferably $1\times10^{-21}$ A or lower, more preferably $1\times10^{-24}$ A or lower. Alternatively, at 85° C., the current value can be $1\times10^{-15}$ A or lower, preferably, $1\times10^{-18}$ A or lower, more preferably $1\times10^{-21}$ A or lower. An off state of a transistor refers to a state where a gate voltage is much lower than a threshold voltage in an n-channel transistor. Specifically, the transistor is in an off state when the gate voltage is lower than the threshold voltage by 1 V or more, 2 V or more, or 3 V or more.

Some experiments prove that the off-state current of the transistor using an oxide semiconductor layer is extremely low. For example, the following measurement data was obtained: a transistor with a channel width of $1\times10^6$ μm and a channel length of 10 μm can have an off-state current less than or equal to the measurement limit of a semiconductor parameter analyzer, that is, less than or equal to $1\times10^{-13}$ A when the voltage (drain voltage) between a source and a drain ranges between 1 V and 10 V. In that case, it can be seen that off-state current standardized on the channel width of the transistor is 100 zA/μm or lower.

In another experiment, off-state current is measured with a circuit in which a capacitor and a transistor are connected to each other and charge flowing to or from the capacitor is controlled by the transistor. In this case, the off-state current is measured from a change in the amount of charge of the capacitor per unit time. As a result, it is found that when the drain voltage is 3 V, an off-state current of several tens of yoctoamperes per micrometer (yA/μm) can be achieved. Accordingly, the off-state current of the transistor in which the purified oxide semiconductor film is used as a channel formation region is considerably lower than that of a transistor formed using silicon having crystallinity.

The oxide semiconductor layer 830 preferably contains at least indium (In) or zinc (Zn). Examples of oxide semiconductors are indium oxide, zinc oxide, In—Zn-based oxide, In—Ga—Zn-based oxide, In—Al—Zn-based oxide, In—Sn—Zn-based oxide, and the like.

Further, typical crystal structures of the oxide semiconductor layer 830 are single crystal, polycrystal, and amorphous. As the oxide semiconductor layer 830, a CAAC-OS (c-axis aligned crystalline oxide semiconductor) film is preferred.

The CAAC-OS film is not completely single crystal nor completely amorphous. The CAAC-OS film is one of oxide semiconductor films having a plurality of c-axis aligned crystal parts. In a transmission electron microscope (TEM) image of the CAAC-OS film, a boundary between crystal parts, that is, a grain boundary is not clearly observed. Thus, in the CAAC-OS film, a reduction in electron mobility due to the grain boundary is less likely to occur. From the results of the cross-sectional TEM image and the plan TEM image, alignment is found in the crystal parts in the CAAC-OS film. Most of the crystal parts included in the CAAC-OS film each fit inside a cube whose one side is less than 100 nm. Thus, there is a case where a crystal part included in the CAAC-OS film fits a cube whose one side is less than 10 nm, less than 5 nm, or less than 3 nm. Note that when a plurality of crystal parts included in the CAAC-OS film are connected to each other, one large crystal region is formed in some cases. For example, a crystal region with an area of 2500 $nm^2$ or more, 5 $\mu m^2$ or more, or 1000 $\mu m^2$ or more is observed in some cases in the plan TEM image.

In each of the crystal parts included in the CAAC-OS film, a c-axis is aligned in a direction parallel to a normal vector of a surface where the CAAC-OS film is formed or a normal vector of a surface of the CAAC-OS film, triangular or hexagonal atomic arrangement which is seen from the direction perpendicular to the a-b plane is formed, and metal atoms are arranged in a layered manner or metal atoms and oxygen atoms are arranged in a layered manner when seen from the direction perpendicular to the c-axis. Note that, among crystal parts, the directions of an a-axis and a b-axis of one crystal part may be different from those of another crystal part. In this specification, a simple term "perpendicular" includes a range from 85° to 95°. In addition, a simple term "parallel" includes a range from −5° to 5°.

In the CAAC-OS film, distribution of crystal parts is not necessarily uniform. For example, in the formation process of the CAAC-OS film, in the case where an oxide semiconductor layer is formed on one surface and crystal growth occurs from a surface side of the oxide semiconductor film, the proportion of crystal parts in the vicinity of the surface of the CAAC-OS film is higher than that in the vicinity of the surface where the CAAC-OS film is formed in some cases. Further, when an impurity is added to the CAAC-OS film, the crystal part in a region to which the impurity is added becomes amorphous in some cases.

Since the c-axes of the crystal parts included in the CAAC-OS film are aligned in the direction parallel to a normal vector of a surface where the CAAC-OS film is formed or a normal vector of a surface of the CAAC-OS film, the directions of the c-axes may be different from each other depending on the shape of the CAAC-OS film (the cross-sectional shape of the surface where the CAAC-OS film is formed or the cross-sectional shape of the surface of the CAAC-OS film). Note that when the CAAC-OS film is formed, the direction of c-axis of the crystal part is the direction parallel to a normal vector of the surface where the CAAC-OS film is formed or a normal vector of the surface of the CAAC-OS film. The crystal part is formed by deposition or by performing treatment for crystallization such as heat treatment after deposition.

A change in electrical characteristics due to irradiation with visible light or ultraviolet light can be small in a transistor including a CAAC-OS, and thus, the reliability of the transistor can be improved.

A formation method of the CAAC-OS film is described below. A CAAC-OS film is formed by, for example, a sputtering method using a polycrystalline oxide semiconductor sputtering target. When ions collide with the sputtering target, a crystal region included in the sputtering target might be separated from the target along an a-b plane; in other words, a sputtered particle having a plane parallel to an a-b plane (flat-plate-like sputtered particle or pellet-like sputtered particle) might be separated from the sputtering target. In that case, the flat-plate-like sputtered particle reaches a substrate while maintaining its crystal state, whereby the CAAC-OS film can be formed.

As for the flat-plate-like sputtered particle, for example, the circle diameter equivalent of a plane that is parallel to an a-b plane is from 3 nm to 10 nm and the thickness (length in the direction perpendicular to the a-b plane) is 0.7 nm or more and less than 1 nm. Note that in the flat-plate-like sputtered particle, the plane parallel to the a-b plane may be a regular triangle or a regular hexagon. Here, the term "circle diameter equivalent of a plane" refers to the diameter of a perfect circle having the same area as the plane.

For the deposition of the CAAC-OS film, the following conditions are preferably used.

By increasing the substrate heating temperature during the deposition, migration of a sputtered particle is likely to occur after the sputtered particle reaches a substrate surface. Specifically, the substrate heating temperature during the deposition is from 100° C. to 740° C., preferably from 200° C. to 500° C. By increasing the substrate heating temperature during the deposition, when the flat-plate-like sputtered particle reaches the substrate, migration occurs on the substrate surface, so that a flat plane of the flat-plate-like sputtered particles is attached to the substrate. At this time, the sputtered particles are positively charged, whereby the sputtered particles repelling each other are attached to the substrate. Therefore, the sputtered particles are not gathered and are not overlapped unevenly with each other, so that the CAAC-OS film having a uniform thickness can be formed.

By reducing the amount of impurities entering the CAAC-OS film during the deposition, the crystal state can be prevented from being broken by the impurities. For example, the concentration of impurities (e.g., hydrogen, water, carbon dioxide, and nitrogen) which exist in the deposition chamber may be reduced. Furthermore, the concentration of impurities in a deposition gas may be reduced. Specifically, a deposition gas whose dew point is −80° C. or lower, preferably −100° C. or lower is used.

Furthermore, preferably, the proportion of oxygen in the deposition gas is increased and the power is optimized in order to reduce plasma damage at the deposition. The proportion of oxygen in the deposition gas is 30 vol % or higher, preferably 100 vol %.

After the CAAC-OS film is deposited, heat treatment may be performed. The temperature of the heat treatment is from 100° C. to 740° C., preferably from 200° C. to 500° C. Further, the heat treatment is performed for 1 minute to 24 hours, preferably 6 minutes to 4 hours. The heat treatment may be performed in an inert atmosphere or an oxidation atmosphere. It is preferable to perform heat treatment in an inert atmosphere and then to perform heat treatment in an oxidation atmosphere. The heat treatment in an inert atmosphere can reduce the concentration of impurities in the CAAC-OS film for a short time. At the same time, the heat treatment in an inert atmosphere may generate oxygen vacancies in the CAAC-OS film. In this case, the heat treatment in an oxidation atmosphere can reduce the oxygen vacancies. The heat treatment can further increase the crystallinity of the CAAC-OS film. Note that the heat treatment may be performed under a reduced pressure, such as 1000 Pa or lower, 100 Pa or lower, 10 Pa or lower, or 1 Pa or lower. The heat treatment under such a reduced atmosphere can reduce the concentration of impurities in the CAAC-OS film for a shorter time.

As an example of the sputtering target, an In—Ga—Zn oxide target is described below.

The In—Ga—Zn oxide target, which is polycrystalline, is made as follows: $InO_X$ powder, $GaO_Y$ powder, and $ZnO_Z$ powder are mixed in a predetermined molar ratio, pressure is applied to the mixture, and heat treatment is performed thereto at a temperature from 1000° C. to 1500° C. Note that X, Y, and Z are each a given positive number. Here, the predetermined molar ratio of $InO_X$ powder to $GaO_Y$ powder and $ZnO_Z$ powder is, for example, 2:2:1, 8:4:3, 3:1:1, 1:1:1, 1:3:2, 1:6:4, 4:2:3, or 3:1:2. The kinds of powder and the molar ratio for mixing powder may be determined as appropriate depending on a desired sputtering target.

Alternatively, the CAAC-OS film can be formed by plural times of deposition of films. An example of such a method is described below.

First, a first oxide semiconductor layer is formed to a thickness of 1 nm or more and less than 10 nm. The first oxide semiconductor layer is formed by a sputtering method. Specifically, at this time, the substrate heating temperature is from 100° C. to 500° C., preferably, from 150° C. to 450° C., and the oxygen ratio in a deposition gas is 30 vol % or more, preferably 100 vol %.

Then, heat treatment is performed to increase the crystallinity of the first oxide semiconductor layer to give the first CAAC-OS film with high crystallinity. The temperature of the heat treatment is from 350° C. to 740° C., preferably 450° C. to 650° C. Further, the heat treatment is performed for 1 minute to 24 hours, preferably 6 minutes to 4 hours. The heat treatment may be performed in an inert atmosphere or an oxidation atmosphere. It is preferable to perform heat treatment in an inert atmosphere and then to perform heat treatment in an oxidation atmosphere. The heat treatment in an inert atmosphere can reduce the concentration of impurities in the first oxide semiconductor layer for a short time. At the same time, the heat treatment in an inert atmosphere may generate oxygen vacancies in the first oxide semiconductor layer. In this case, the heat treatment in an oxidation atmosphere can reduce the oxygen vacancies. Note that the heat treatment may be performed under a reduced pressure, such as 1000 Pa or lower, 100 Pa or lower, 10 Pa or lower, or 1 Pa or lower. The heat treatment under a reduced pressure can reduce the concentration of impurities in the first oxide semiconductor layer for a shorter time.

Because the first oxide semiconductor layer has a thickness of 1 nm or more and less than 10 nm, the first oxide semiconductor layer can be more easily crystallized than that having a thickness of 10 nm or more.

Then, a second oxide semiconductor layer having the same composition as the first oxide semiconductor layer is formed to a thickness of from 10 nm to 50 nm. The second oxide semiconductor layer is formed by a sputtering method. Specifically, at this time, the substrate heating temperature is from 100° C. to 500° C., preferably, from 150° C. to 450° C., and the oxygen ratio in a deposition gas is 30 vol % or more, preferably 100 vol %.

Then, heat treatment is conducted so that the second oxide semiconductor layer is turned into a second CAAC-OS film with high crystallinity by solid phase growth from the first CAAC-OS film. The temperature of the heat treatment is from 350° C. to 740° C., preferably from 450° C. to 650° C. Further, the heat treatment is performed for 1 minute to 24 hours, preferably 6 minutes to 4 hours. The heat treatment may be performed in an inert atmosphere or an oxidation atmosphere. It is preferable to perform heat treatment in an inert atmosphere and then to perform heat treatment in an oxidation atmosphere. The heat treatment in an inert atmosphere can reduce the concentration of impurities in the second oxide semiconductor layer for a short time. At the same time, the heat treatment in an inert atmosphere may generate oxygen vacancies in the second oxide semiconductor layer. In this case, the heat treatment in an oxidation atmosphere can reduce the oxygen vacancies. Note that the heat treatment may be performed under a reduced pressure, such as 1000 Pa or lower, 100 Pa or lower, 10 Pa or lower, or 1 Pa or lower. The heat treatment under a reduced pressure can reduce the concentration of impurities in the second oxide semiconductor layer for a shorter time.

Although the variety of films such as the metal film, the semiconductor layer, and the inorganic insulating film which are described in the above embodiment can be formed by a sputtering method or a plasma chemical vapor deposition (CVD) method, such films may be formed by another method, e.g., a thermal CVD method. A metal organic chemical vapor deposition (MOCVD) method or an atomic layer deposition (ALD) method may be employed as an example of a thermal CVD method.

A thermal CVD method has an advantage that no defect due to plasma damage is generated since it does not utilize plasma for forming a film.

Deposition by a thermal CVD method may be performed in such a manner that the pressure in a chamber is set to an atmospheric pressure or a reduced pressure, and a source gas and an oxidizer are supplied to the chamber at a time and react with each other in the vicinity of the substrate or over the substrate.

Deposition by an ALD method may be performed in such a manner that the pressure in a chamber is set to an atmospheric pressure or a reduced pressure, source gases for reaction are sequentially introduced into the chamber, and then the sequence of the gas introduction is repeated. For example, two or more kinds of source gases are sequentially supplied to the chamber by switching respective switching valves (also referred to as high-speed valves). For example, a first source gas is introduced, an inert gas (e.g., argon or nitrogen) or the like is introduced at the same time as or after the introduction of the first gas so that the source gases are not mixed, and then a second source gas is introduced. Note that in the case where the first source gas and the inert gas are introduced at a time, the inert gas serves as a carrier gas, and the inert gas may also be introduced at the same time as the introduction of the second source gas. Alternatively, the first source gas may be exhausted by vacuum evacuation instead of the introduction of the inert gas, and then the second source gas may be introduced. The first source gas is adsorbed on the surface of the substrate to form a first single-atomic layer; then the second source gas is introduced to react with the first single-atomic layer; as a result, a second single-atomic layer is stacked over the first single-atomic layer, so that a thin film is formed. The sequence of the gas introduction is repeated plural times until a desired thickness is obtained, whereby a thin film with excellent step coverage can be formed. The thickness of the thin film can be adjusted by the number of repetitions times of the sequence of the gas introduction; therefore, an ALD method makes it possible to accurately adjust a thickness and thus is suitable for manufacturing a minute FET.

The variety of films such as the metal film, the semiconductor film, and the inorganic insulating film which form elements described in the above embodiment can be formed by a thermal CVD method such as a MOCVD method or an ALD method. For example, in the case where an InGaZnO$_X$ (X>0) film is formed, trimethylindium, trimethylgallium, and diethylzinc are used. Note that the chemical formula of trimethylindium is $(CH_3)_3In$. The chemical formula of trimethylgallium is $(CH_3)_3Ga$.

The chemical formula of diethylzinc is $(CH_3)_2Zn$. Without limitation to the above combination, triethylgallium (chemical formula: $(C_2H_5)_3Ga$) can be used instead of trimethylgallium and dimethylzinc (chemical formula: $(C_2H_5)_2Zn$) can be used instead of diethylzinc.

For example, in the case where a hafnium oxide film is formed, two kinds of gases, i.e., ozone ($O_3$) as an oxidizer and a source gas which is obtained by vaporizing a solvent and liquid containing a hafnium precursor compound (a hafnium alkoxide solution, typically tetrakis(dimethylamide)hafnium (TDMAH)) are used. Note that the chemical formula of tetrakis(dimethylamide)hafnium is $Hf[N(CH_3)_2]_4$. Examples of another material liquid include tetrakis(ethylmethylamide)hafnium.

For example, in the case where an aluminum oxide film is formed, two kinds of gases, e.g., $H_2O$ as an oxidizer and a source gas which is obtained by vaporizing a solvent and liquid containing an aluminum precursor compound (e.g., trimethylaluminum (TMA)) are used. Note that the chemical formula of trimethylaluminum is $Al(CH_3)_3$. Examples of another material liquid include tris(dimethylamide)aluminum, triisobutylaluminum, and aluminum tris(2,2,6,6-tetramethyl-3,5-heptanedionato).

For example, in the case where a silicon oxide film is formed, hexadichlorosilane is adsorbed on a surface where a film is to be formed, chlorine contained in the adsorbate is removed, and radicals of an oxidizing gas (e.g., $O_2$ or dinitrogen monoxide) are supplied to react with the adsorbate.

For example, in the case where a tungsten film is formed using a deposition apparatus employing ALD, a $WF_6$ gas and a $B_2H_6$ gas are sequentially introduced plural times to form an initial tungsten film, and then a $WF_6$ gas and an $H_2$ gas are introduced at a time, so that a tungsten film is formed. Note that an $SiH_4$ gas may be used instead of a $B_2H_6$ gas.

For example, in the case where an oxide semiconductor film, e.g., an InGaZnO$_X$ (X>0) film is formed using a deposition apparatus employing ALD, an $In(CH_3)_3$ gas and an $O_3$ gas are sequentially introduced plural times to form an InO$_2$ layer, a $Ga(CH_3)_3$ gas and an $O_3$ gas are introduced at a time to form a GaO layer, and then a $Zn(CH_3)_2$ gas and an $O_3$ gas are introduced at a time to form a ZnO layer. Note that the order of these layers is not limited to this example. A mixed compound layer such as an $InGaO_2$ layer, an $InZnO_2$ layer, a GaInO layer, a ZnInO layer or a GaZnO layer may be formed by mixing of these gases. Note that although an $H_2O$ gas which is bubbled with an inert gas such as Ar may be used instead of an $O_3$ gas, it is preferable to use an $O_3$ gas, which does not contain H. Further, instead of an $In(CH_3)_3$ gas, an $In(C_2H_5)_3$ gas may be used. Instead of a $Ga(CH_3)_3$ gas, a $Ga(C_2H_5)_3$ gas may be used. Instead of an $In(CH_3)_3$ gas, an $In(C_2H_5)_3$ may be used. Furthermore, a $Zn(CH_3)_2$ gas may be used.

This embodiment can be combined with another embodiment as appropriate.

(Embodiment 5)

In this embodiment, another configuration of a microcontroller is described.

Figure 9:
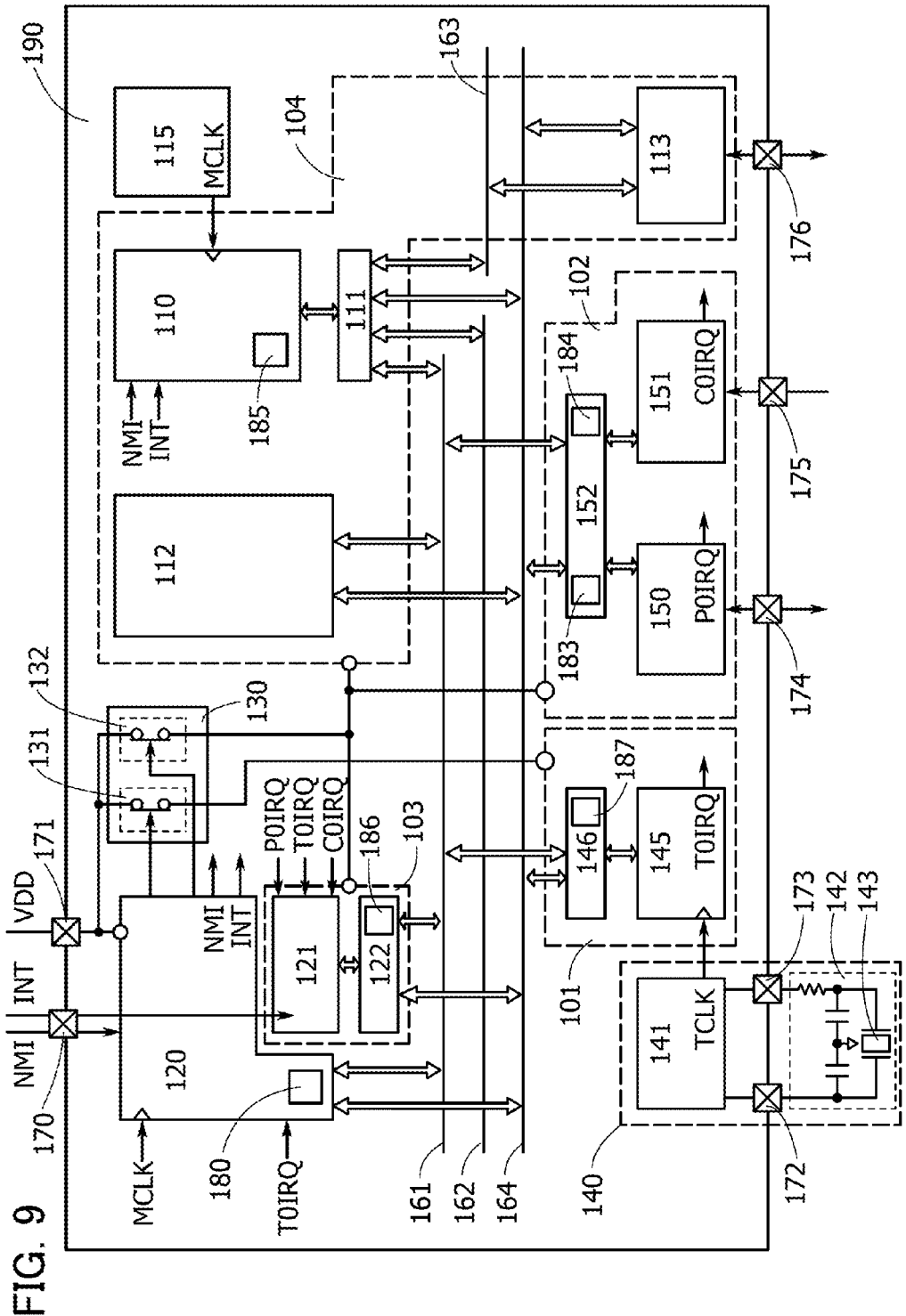
FIG. 9 is a block diagram illustrating an example of a microprocessor configuration.

FIG. 9 is a block diagram of a microcontroller 190.

Like the microcontroller 100 in FIG. 1, the microcontroller 190 includes the CPU 110, the bus bridge 111, the RAM 112, the memory interface 113, the controller 120, the interrupt controller 121, the I/O interface (input/output interface) 122, and the power gate unit 130.

The microcontroller 190 further includes the crystal oscillation circuit 141, the timer circuit 145, the I/O interface 146, the I/O port 150, the comparator 151, the I/O interface 152, the bus line 161, the bus line 162, the bus line 163, and the data bus line 164. The microcontroller 190 further includes at least the connection terminals 170 to 176 as connection parts with an external device. In addition, the microcontroller 190 is connected to the oscillator 142 having the quartz crystal unit 143 via the connection terminals 172 and 173.

Each block of the microcontroller 190 has a function similar to that of the microcontroller 100 in FIG. 1. Table 2 shows a function of each circuit in the microcontroller 100 and the microcontroller 190. Further, as in the microcontroller 100, the operation modes of the microcontroller 190 are also switched based on the flow charts of FIG. 3 to FIG. 5.

TABLE 2

| Circuit block | Function |
|---|---|
| CPU 110 | Executing instruction |
| Clock generation circuit 115 | Generating clock signal MCLK |
| Crystal oscillation circuit 141 | Generating clock signal TCLK |
| Controller 120 | Controlling the whole microcontroller 100 |
| Interrupt controller 121 | Setting priorities to interrupt requests |
| I/O interface 146 | Inputting/outputting data |
| I/O interface 152 | Inputting/outputting data |
| I/O port 150 | Interface for connecting with external device |
| Timer circuit 145 | Generating interrupt signal for timer operation |
| Comparator 151 | Comparing potentials (current) of input signal and reference signal |
| RAM 112 | Memory serving as main memory of CPU 110 |
| Memory interface 113 | Input/output interface with external memory |

The microcontroller 190 is different from the microcontroller 100 in signals for interrupt request. The difference is described below.

An external interrupt signal INT1 and an external interrupt signal NMI1 are input into the connection terminal 170 that serves as an input terminal of an external interrupt signal. The external interrupt signal NMI1 is a non-maskable interrupt signal.

The external interrupt signal NMI1 input via the connection terminal 170 is input into the controller 120. When the external interrupt signal NMI1 is input into the controller 120, the controller 120 immediately outputs an internal interrupt signal NMI2 to the CPU 110, so that the CPU 110 executes interrupt processing.

The external interrupt signal INT1 is input into the interrupt controller 121 via the connection terminal 170. Interrupt signals (T0IRQ, P0IRQ, and C0IRQ) are input into the interrupt controller 121 from the peripheral circuits (145, 150, and 151) without going through the buses (161 to 164).

When the controller 120 receives the external interrupt signal INT1, the controller 120 outputs the internal interrupt signal INT2 to the CPU 110, so that the CPU 110 executes interrupt processing.

Further, there is a case where the interrupt signal T0IRQ is directly input into the controller 120 without going through the interrupt controller 121. When the controller 120 receives the interrupt signal T0IRQ, the controller 120 outputs the internal interrupt signal NMI2 to the CPU 110, so that the CPU 110 executes interrupt processing.

As in the microcontroller 100, the power gate unit 130 of the microcontroller 190 is controlled by the controller 120. As described above, the controller 120 outputs a signal to turn off one or both of the switch circuits included in the power gate unit 130, depending on the request by the CPU 110 (power supply stop). In addition, the controller 120 outputs a signal to turn on the switch circuit 132 included in the power gate unit 130 with, as a trigger, the external interrupt signal NMI1 or the interrupt signal T0IRQ from the timer circuit 145 (start of power supply).

Further, the microcontroller 190 includes the controller 120, the power gate unit 130, and the like, and thus, the microcontroller 190 also can operate in three operation modes (Active mode, Noff1 mode and Noff2 mode), like the microcontroller 100. In addition, the circuits that are active or non-active in each operation mode are the same as those of the microcontroller 100 (see Table 1). Further, the operation modes of the microcontroller 190 are switched by the controller 120, like the microcontroller 100. The controller 120 switches the operation modes based on the flow charts in FIG. 3 to FIG. 5.

In order that the microcontroller 190 can return rapidly from Noff1/Noff2 mode to Active mode, the registers 185 to 187 each have a volatile data storage portion and a nonvolatile data storage portion for saving data as backup during power supply stop. Further, in the microcontroller 190, the register 184 in the comparator 151 has a volatile data storage portion (memory) and a nonvolatile data storage portion (memory), like the registers 185 to 187.

In the microcontroller 100, the register 184 includes no nonvolatile memories, but the register 184 in the microcontroller 100 can have a nonvolatile memory, like the registers 185 to 187.

In the shift from Active mode to Noff1/Noff2 mode, prior to power supply stop, data stored in the volatile memories in the registers 184 to 187 are written into in the nonvolatile memories, and data stored in the volatile memories are reset to initial values. Then, power supply to the registers 184 to 187 is stopped.

In the return from Noff1/Noff2 mode to Active mode, power supply to the registers 184 to 187 is started again, and data in the volatile memories are reset to initial values. Then, the data stored in the nonvolatile memories are written into the volatile memory.

Accordingly, even in the low power consumption mode, data needed for processing of the microcontroller 190 are stored in the registers 184 to 187, and thus, the microcontroller 190 can return from the low power consumption mode to Active mode immediately.

Thus, in accordance with this embodiment, the microcontroller that can operate with low power consumption by employing the low power consumption mode and can return rapidly from the low power consumption mode to the normal operation mode can be provided.

Accordingly, the microcontroller 190 is also very suitable for devices that operate by intermittent control, such as a sensing device and a monitoring device. For example, the microcontrollers 100 and 190 are suitable for control devices of fire alarms, smoke detectors, management units of secondary batteries, and the like. In particular, devices having batteries as power sources have a problem of power consumption due to long time operation. However, like the microcontroller 100, because most part of the operation period of the microcontroller 190 is in Noff1 mode, only circuits needed for allowing the microcontroller 190 to return to Active mode operate, the power consumption during operation can be lowered.

(Embodiment 6)

A structure of a multilayer film including an oxide semiconductor layer which can be used for a transistor is described using FIG. 11, FIGS. 12A and 12B, FIGS. 13A and 13B, and FIG. 14.

Figure 11:
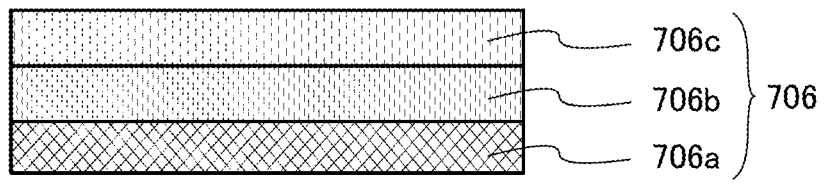
FIG. 11 is a cross-sectional view illustrating a multilayer film including an oxide semiconductor layer.

A multilayer film 706 illustrated in FIG. 11 includes an oxide layer 706*a*, an oxide semiconductor layer 706*b* provided over the oxide layer 706*a*, and an oxide layer 706*c* provided over the oxide semiconductor layer 706*b*. Although the multilayer film 706 has three layers in the following description, the multilayer film 706 may have two layers, or four or more layers. For example, the multilayer film 706 may include the oxide layer 706*a* and the oxide semiconductor layer 706*b* provided over the oxide layer 706*a*. Alternatively, the multilayer film 706 may include the oxide semiconductor layer 706*b* and the oxide layer 706*c* provided over the oxide semiconductor layer 706*b*.

Here, the band structure of the multilayer film 706 is described with reference to FIGS. 12A and 12B and FIGS. 13A and 13B.

Note that an In—Ga—Zn oxide having an energy gap of 3.15 eV was used for the oxide layer 706*a*, an In—Ga—Zn oxide having an energy gap of 2.8 eV was used for the oxide semiconductor layer 706*b*, and an oxide layer having physical properties similar to those of the oxide layer 706*a* was used for the oxide layer 706*c*. In addition, an energy gap of the vicinity of an interface between the oxide layer 706*a* and the oxide semiconductor layer 706*b* was 3 eV, and an energy gap of the vicinity of an interface between the oxide layer 706*c* and the oxide semiconductor layer 706*b* was 3 eV. The energy gap was measured with a spectroscopic ellipsometer (UT-300 manufactured by HORIBA Jobin Yvon). Further, the thicknesses of the oxide layer 706*a*, the oxide semiconductor layer 706*b*, and the oxide layer 706*c* were 10 nm, 10 nm, and 10 nm, respectively.

Figure 12A:
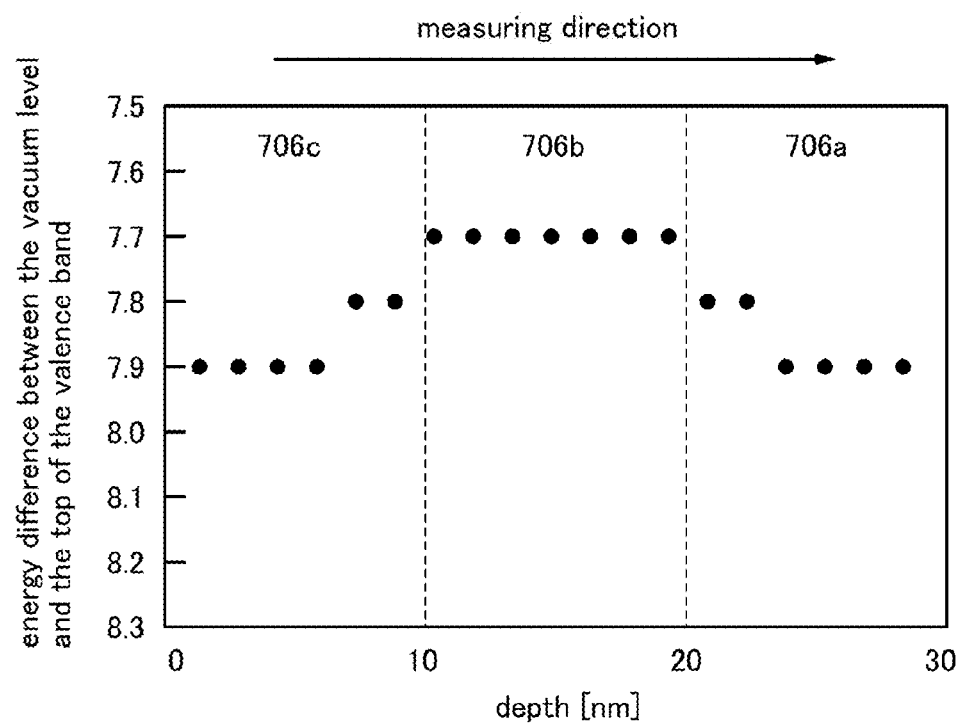
FIGS. 12A and 12B each illustrate a band structure of a multilayer film according to one embodiment of the present invention.

FIG. 12A is obtained in such a manner that an energy difference between the vacuum level and the top of the valence band in each layer was measured while the multilayer film 706 was etched from the oxide layer 706*c*, and the obtained values were plotted on a graph. The energy difference between the vacuum level and the top of the valence band was measured with an ultraviolet photoelectron spectroscopy (UPS) device manufactured by ULVAC-PHI Inc.

Figure 12B:
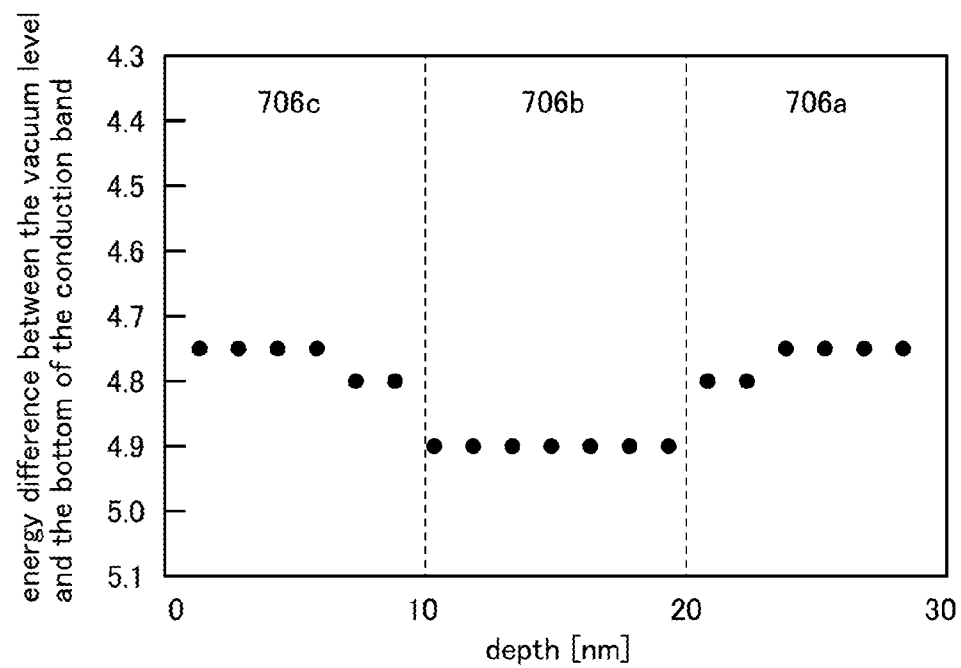

FIG. 12B is obtained in such a manner that an energy difference between the vacuum level and the bottom of the conduction band is calculated by subtracting an energy gap in each layer from the energy difference between the vacuum level and the top of the valence band, and the obtained values are plotted on a graph.

Figure 13A:
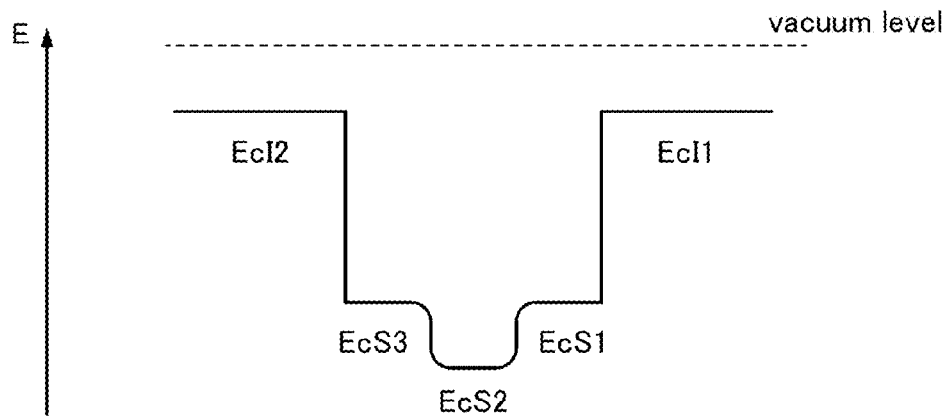
FIGS. 13A and 13B each illustrate a band structure of a multilayer film according to one embodiment of the present invention.

FIG. 13A schematically illustrates part of the band structure of FIG. 12B. FIG. 13A illustrates the case where silicon oxide films are provided in contact with the oxide layer 706*a* and the oxide layer 706*c*. In FIG. 13A, EcI1 denotes the energy of the bottom of the conduction band in the silicon oxide film; EcS1 denotes the energy of the bottom of the conduction band in the oxide layer 706*a*; EcS2 denotes the energy of the bottom of the conduction band in the oxide semiconductor layer 706*b*; EcS3 denotes the energy of the bottom of the conduction band in the oxide layer 706*c*; and EcI2 denotes the energy of the bottom of the conduction band in the silicon oxide film.

As illustrated in FIG. 13A, the energy of the bottom of the conduction band continuously changes from the oxide layer 706a toward the oxide semiconductor layer 706b and the oxide layer 706c. This is because oxygen is diffused among the oxide layer 706a, the oxide semiconductor layer 706b, and the oxide layer 706c.

As described above, the multilayer film including a stack of oxide semiconductor layers containing the same main components is not formed by simply stacking the layers but formed so that continuous junction (here, an U-shape well in which the energy of the bottom of the conduction band continuously charges between the layers) is formed. In other words, the stacked-layer structure is formed so that a defect state which serves as a trap canter or a recombination center in an oxide semiconductor, or an impurity which forms a barrier preventing the flow of carriers does not exist at interfaces between the layers. If an impurity exists between the stacked oxide semiconductor layers, the continuity of the energy band is lost, so that carriers at the interface disappear due to trap or recombination.

To form the continuous junction, the layers are preferably stacked sequentially without exposure to the air using a deposition apparatus (sputtering apparatus) of a multi chamber type with a load lock chamber. Chambers in the sputtering apparatus are preferably subjected to high vacuum evacuation (up to approximately $1\times10^{-4}$ Pa to $5\times10^{-7}$ Pa) using an adsorption vacuum pump such as a cryopump so that moisture and the like serving as impurities for an oxide semiconductor are removed as much as possible. Alternatively, it is preferable that a backward flow of a gas containing carbon, moisture, and the like from an exhaust system be prevented with the use of a combination of a turbo-molecular pump and a cold trap.

To obtain a highly purified intrinsic oxide semiconductor, not only high vacuum evacuation of the chambers but also high purification of a sputtering gas is important. When a highly purified oxygen gas or argon gas which has a dew point of −40° C. or lower, preferably −80° C. or lower, further preferably −100° C. or lower is used as the sputtering gas, moisture and the like can be prevented from mixing to the oxide semiconductor film.

Figure 13B:
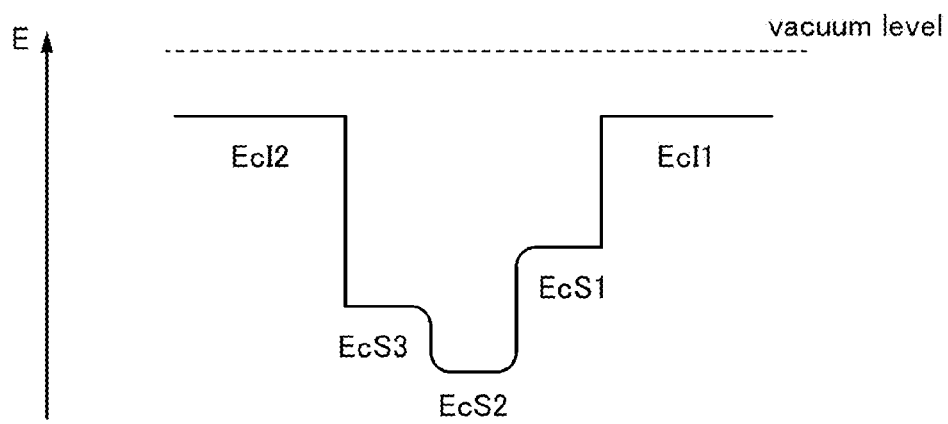

Although FIG. 13A illustrates the case where the oxide layer 706a and the oxide layer 706c are oxide layers having the similar physical properties, it is more preferable that the oxide layer 706a and the oxide layer 706c are oxide layers having different physical properties. For example, EcS1 is preferably higher than EcS3, in which case part of the band structure is illustrated as in FIG. 13B. In the band structure illustrated in FIG. 13B, for example, on the assumption that EcI2 is the energy of a gate insulating film and a gate electrode is provided on the left side of EcI2, the energy of the bottom of the conduction band is preferably such that EcS1 is higher than EcS3 as illustrated in FIG. 13B. This is because current mainly flows in EcS2 which is the vicinity of EcS3 that is positioned on the gate electrode side.

In the case where the silicon oxide film is provided between the oxide layer 706c and the gate, the silicon oxide film functions as a gate insulating film, and the oxide layer 706c can prevent indium contained in the oxide semiconductor layer 706b from diffusing to the gate insulating film. To prevent diffusion of indium by the oxide layer 706c, the oxide layer 706c preferably contains a smaller amount of indium than the oxide semiconductor layer 706b.

According to FIGS. 12A and 12B and FIGS. 13A and 13B, the oxide semiconductor layer 706b of the multilayer film 706 serves as a well, so that a channel is formed in the oxide semiconductor layer 706b in a transistor including the multilayer film 706. Note that since the energy of the bottom of the conduction band continuously changes in the multilayer film 706, the structure of the multilayer film 706 can be referred to as a U-shaped well.

As illustrated in FIG. 14, trap levels derived from an impurity or a defect can be formed in the vicinity of the interfaces between the oxide layers 706a and 706c and insulating films such as the silicon oxide films. The oxide layers 706a and 706c enables the oxide semiconductor layer 706b and the trap states to be separated from each other. However, in the case where an energy difference between EcS1 or EcS3 and EcS2 is small, electrons in the oxide semiconductor layer 706b might reach the trap state by passing over the energy gap. When the electrons are captured by the trap state, they become negative fixed charge, so that the threshold voltage of the transistor is shifted in the positive direction.

Accordingly, it is preferable that the energy differences between EcS1 and EcS2 and EcS3 and EcS2 be each 0.1 eV or more, more preferably 0.15 eV or more because a change in the threshold voltage of the transistor is prevented and stable electrical characteristics are obtained.

Next, a method for forming the oxide semiconductor layer 706b which has high crystallinity is described.

Crystals which are c-axis aligned can be formed by a sputtering method using a target including a polycrystalline oxide semiconductor which has high alignment. The oxide semiconductor layer which is obtained by deposition has a uniform thickness and uniform crystal alignment. Thus, the oxide semiconductor layer 706b is a CAAC-OS film.

Localized states in the multilayer film 706 are reduced, whereby the transistor using the multilayer film 706 can have stable electrical characteristics. The localized states of the multilayer film 706 can be measured by a constant photocurrent method (CPM).

Note that in order that the transistor has stable electrical characteristic, absorption coefficient due to the localized states in the multilayer film 706 which are obtained by CPM measurement is less than $1\times10^{-3}$ cm$^{-1}$, preferably less than $3\times10^{-4}$ cm$^{-1}$.

Next, a deposition apparatus for depositing the oxide semiconductor layer 706b having high crystallinity is described FIGS. 15A and 15B, FIGS. 16A and 16B, and FIG. 17. In addition, a method for depositing an oxide semiconductor layer using the deposition apparatus is described.

First, a structure of a deposition apparatus which allows the entry of few impurities into a film during deposition is described with reference to FIGS. 15A and 15B.

Figure 15A:
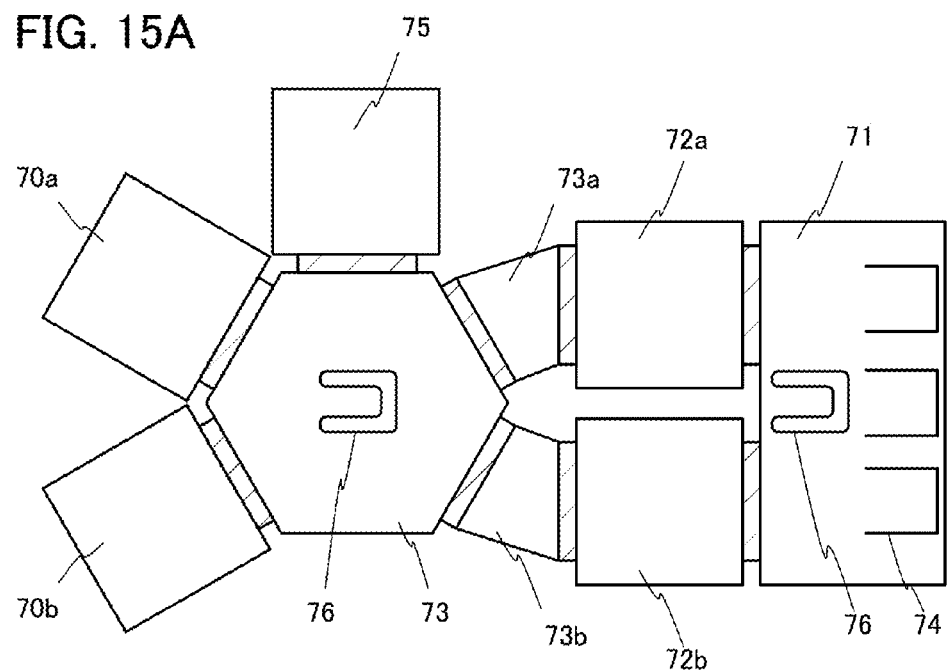
FIGS. 15A and 15B are each a top view illustrating an example of a deposition apparatus.

FIG. 15A is a top view schematically illustrating a multi-chamber deposition apparatus. The deposition apparatus includes an atmosphere-side substrate supply chamber 71 including three cassette ports 74 for holding substrates, a load lock chamber 72a, an unload lock chamber 72b, a transfer chamber 73, a transfer chamber 73a, a transfer chamber 73b, a substrate heating chamber 75, and deposition chambers 70a and 70b. The atmosphere-side substrate supply chamber 71 is connected to the load lock chamber 72a and the unload lock chamber 72b. The load lock chamber 72a and the unload lock chamber 72b are connected to the transfer chamber 73 with the transfer chambers 73a and 73b positioned therebetween. The substrate heating chamber 75 and the deposition chambers 70a and 70b are each connected only to the transfer chamber 73.

Note that connection portions between the chambers are each provided with a gate valve (hatched with diagonal lines in the drawing), and the chambers expect the atmosphere-side substrate supply chamber 71 can be independently kept at a vacuum state. Further, the atmosphere-side substrate supply chamber 71 and the transfer chamber 73 each include one or more substrate transfer robots 76 which are capable of transferring a glass substrate. Here, the substrate heating chamber 75 preferably also serves as a plasma treatment chamber. With a single wafer multi-chamber deposition apparatus, it is possible to transfer a substrate without exposure to the air between treatment and treatment, and adsorption of impurities to a substrate can be suppressed. In addition, the order of deposition, heat treatment, or the like can be freely created. Note that the number of the transfer chambers, the number of the deposition chambers, the number of the load lock chambers, the number of the unload lock chambers, and the number of the substrate heating chambers are not limited to the above, and may be determined as appropriate depending on the space for placement or the process.

Figure 15B:
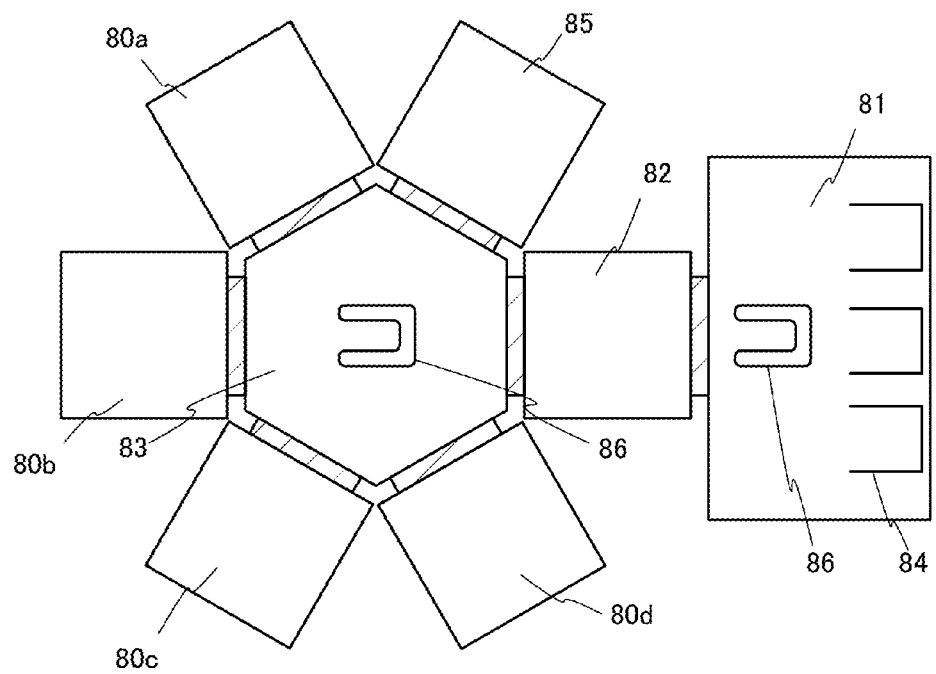

FIG. 15B illustrates a multi-chamber deposition apparatus which has a different structure from the deposition chamber of FIG. 15A. The deposition apparatus includes an atmosphere-side substrate supply chamber 81 including cassette ports 84, a load and unload lock chamber 82, a transfer chamber 83, a substrate heating chamber 85, and deposition chambers 80a, 80b, 80c, and 80d. The load and unload lock chamber 82, the substrate heating chamber 85, and the deposition chambers 80a, 80b, 80c, and 80d are connected to each other with the transfer chamber 83 positioned therebetween.

Note that connection portions between the chambers are each provided with a gate valve (hatched with diagonal lines in the drawing), and the chambers expect the atmosphere-side substrate supply chamber 81 can be independently kept at a vacuum state. Further, the atmosphere-side substrate supply chamber 81 and the transfer chamber 83 each include one or more substrate transfer robots 86 which are capable of transferring a glass substrate.

Here, the details of the deposition chamber (sputtering chamber) illustrated in FIG. 15B are described with reference to FIGS. 16A and 16B. The deposition chamber 80b in FIG. 16A includes a target 87, a deposition-preventing plate 88, and a substrate stage 90. Note that a glass substrate 89 is set on the substrate stage 90. Although not illustrated, the substrate stage 90 may include a substrate holding mechanism which holds the glass substrate 89, a rear heater which heats the glass substrate 89 from the back surface, or the like. The deposition-preventing plate 88 can prevent particles which are sputtered from the target 87 from being deposited on a region where deposition is not needed.

Figure 16A:
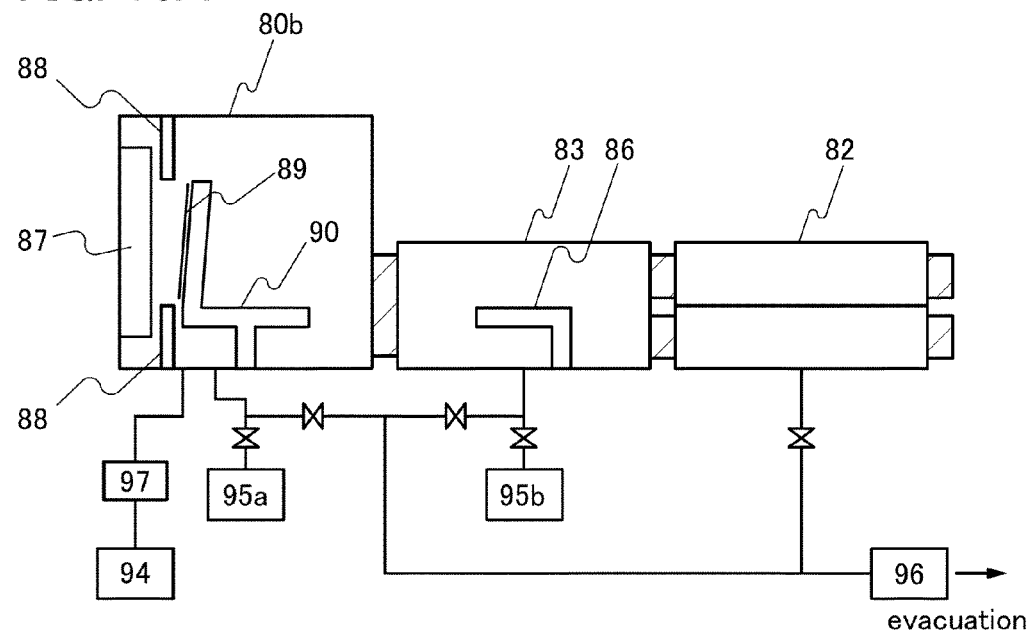
FIGS. 16A and 16B are each a cross-sectional view illustrating an example of a deposition chamber.

The deposition chamber 80b in FIG. 16A is connected to the transfer chamber 83 with a gate valve positioned therebetween, and the transfer chamber 83 is connected to the load and unload lock chamber 82 with a gate valve positioned therebetween. The transfer chamber 83 is provided with the substrate transfer robot 86 which can deliver the glass substrate from the deposition chamber 80b to the load and unload lock chamber 82 and deliver it from the load and unload lock chamber 82 to the deposition chamber 80b. The load and unload lock chamber 82 that is a vacuum chamber is split into an upper part and a bottom part. One of the upper and bottom parts can be used as a load chamber and the other thereof can be used as an unload chamber. Such a structure is preferable because the structure enables a reduction in installation area of the sputtering apparatus.

Further, the deposition chamber 80b in FIG. 16A is connected to a refiner 94 with a mass flow controller 97 positioned therebetween. Although the number of the refiners 94 and the number of the mass flow controllers 97 each correspond to the number of kinds of gases, only one refiner 94 and one mass flow controller 97 are illustrated for simplicity. As the gas introduced into the deposition chamber 80b and the like, a gas having a dew point of −80° C. or lower, preferably −100° C. or lower, is used. An oxygen gas, a rare gas (such as an argon gas), or the like, which has a low dew point, is used, whereby the amount of moisture mixing into the film during deposition can be reduced.

Further, the deposition chamber 80b in FIG. 16A is connected to a cryopump 95a with a valve positioned therebetween, the transfer chamber 83 is connected to a cryopump 95b with a valve positioned therebetween, and the load and unload lock chamber 82 is connected to a vacuum pump 96 with a valve positioned therebetween. Note that the load lock chamber and the unload lock chamber in the load and unload lock chamber 82 may be each independently connected to the vacuum pump. The deposition chamber 80b and the transfer chamber 83 are each connected to the vacuum pump 96 with a valve positioned therebetween.

Note that the vacuum pump 96 can be a pump in which a dry pump and a mechanical booster pump are connected in series. With such a structure, evacuation can be performed using the vacuum pump 96 when the pressure inside the deposition chamber 80b and the transfer chamber 83 is in the range of atmospheric pressure to low vacuum (about 0.1 Pa to 10 Pa) and then evacuation can be performed using the cryopump 95a or 95b when the pressure inside the deposition chamber 80b and the transfer chamber 83 is in the range of low vacuum to high vacuum ($1 \times 10^{-4}$ Pa to $1 \times 10^{-7}$ Pa) by switching the valve.

Figure 16B:
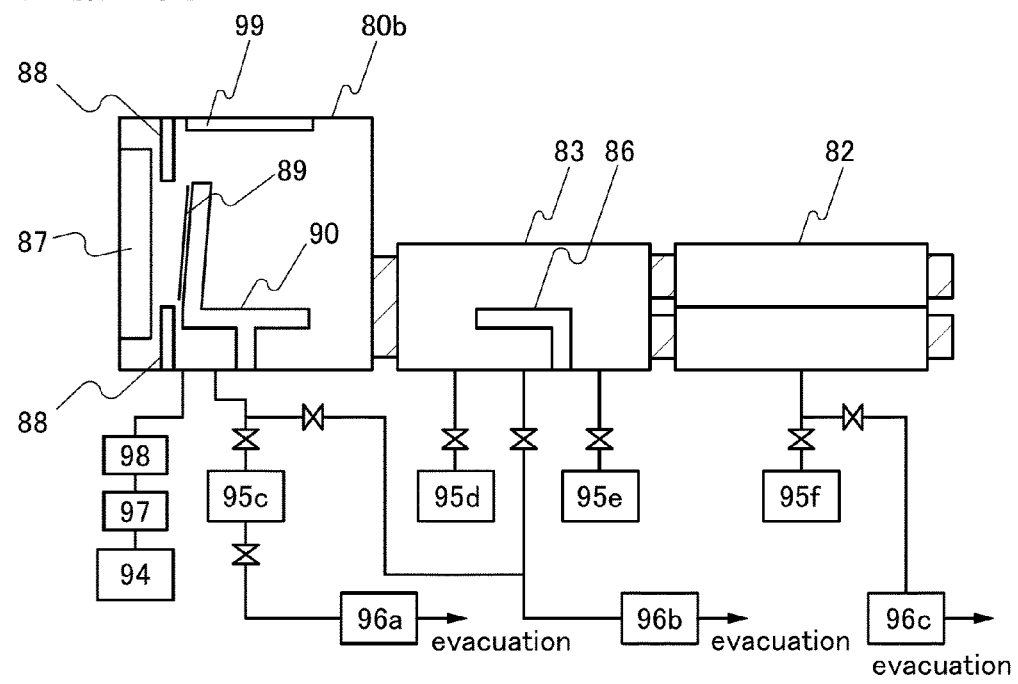

Next, an example of the deposition chamber in FIG. 15B, which is different from that illustrated in FIG. 16A, is described using FIG. 16B.

The deposition chamber 80b illustrated in FIG. 16B is connected to the transfer chamber 83 through a gate valve, and the transfer chamber 83 is connected to the load and unload lock chamber 82 through a gate valve.

The deposition chamber 80b in FIG. 16B is connected to the mass flow controller 97 through a gas heating system 98, and the gas heating system 98 is connected to the refiner 94 through the mass flow controller 97. With the gas heating system 98, a gas to be introduced to the deposition chamber 80b can be heated to a temperature higher than or equal to 40° C. and lower than or equal to 400° C., preferably higher than or equal to 50° C. and lower than or equal to 200° C. Note that although the number of gas heating systems 98 the number of the mass flow controllers 97 each correspond to the number of kinds of gases, only one gas heating system 98 and one mass flow controller 97 are provided for simplicity.

The deposition chamber 80b in FIG. 16B is connected to each of a turbo molecular pump 95c and a vacuum pump 96b with valves positioned therebetween. Note that as an auxiliary pump, a vacuum pump 96a is provided for the turbo molecular pump 95c with a valve positioned therebetween. The vacuum pump 96a and the vacuum pump 96b each may have a structure similar to that of the vacuum pump 96.

In addition, the deposition chamber 80b in FIG. 16B is provided with a cryotrap 99.

It is known that the turbo molecular pump 95c is capable of stably evacuating a large-sized molecule (or atom), needs low frequency of maintenance, and thus enables high productivity, whereas it has a low capability in evacuating hydrogen and water. Hence, the cryotrap 99 having a high capability in evacuating a molecule (or atom) having a relatively high melting point, such as water, is connected to the deposition chamber 80b. The temperature of a refrigerator of the cryotrap 99 is set to lower than or equal to 100 K, preferably lower than or equal to 80 K. In the case where the cryotrap 99 includes a plurality of refrigerators, it is preferable to set the temperature of each refrigerator at a different temperature because efficient evacuation is possible. For example, the temperatures of a first-stage refrigerator and a second-stage refrigerator may be set at 100 K or lower and 20 K or lower, respectively.

The transfer chamber 83 in FIG. 16B is connected to the vacuum pump 96b and cryopumps 95d and 95e each through a valve. In the case of one cryopump, evacuation cannot be performed while the cryopump is in regeneration; however, in the case of two or more cryopumps which are connected in parallel, even when one of the cryopumps is in regeneration, evacuation can be performed using any of the other cryopumps. Note that the above regeneration of a cryopump refers to treatment for discharging molecules (or atoms) entrapped in the cryopump. When molecules (or atoms) are entrapped too much in a cryopump, the evacuation capability of the cryopump is lowered; therefore, regeneration is performed regularly.

The load and unload lock chamber 82 in FIG. 16B is connected to a cryopump 95f and a vacuum pump 96c each with a valve positioned therebetween. Note that the vacuum pump 96c can have a structure similar to that of the vacuum pump 96.

Next, details of the substrate heating chamber 85 illustrated in FIG. 15B are described with reference to FIG. 17.

Figure 17:
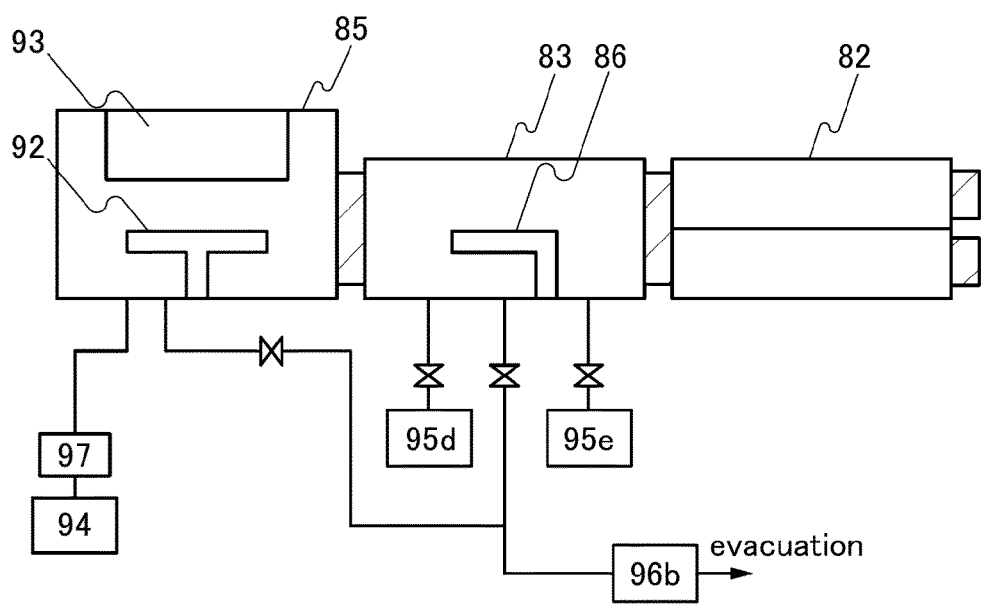
FIG. 17 is a cross-sectional view illustrating an example of a heat treatment chamber.

The substrate heating chamber 85 illustrated in FIG. 17 is connected to the transfer chamber 83 with a gate valve positioned therebetween. The transfer chamber 83 is connected to the load and unload lock chamber 82 with a gate valve positioned therebetween. Note that the exhaustion of the load and unload lock chamber 82 can be similar to that of FIG. 16A or FIG. 16B.

The substrate heating chamber 85 in FIG. 17 is connected to the refiner 94 through the mass flow controller 97. Note that although the number of the refiners 94 and the number of the mass flow controllers 97 each correspond to the number of kinds of gases, only one refiner 94 and one mass flow controller 97 are provided for simplicity. The substrate heating chamber 85 is connected to the vacuum pump 96b with a valve positioned therebetween.

The substrate heating chamber 85 includes a substrate stage 92. The substrate stage 92 holds at least one substrate and may hold a plurality of substrates. In addition, the substrate heating chamber 85 includes a heating mechanism 93. As the heating mechanism 93, for example, a heating mechanism which heats an object using a resistance heater or the like may be used. Alternatively, heat conduction or heat radiation from a medium such as a heated gas may be used as the heating mechanism. For example, RTA (rapid thermal anneal) treatment, such as GRTA (gas rapid thermal anneal) treatment or LRTA (lamp rapid thermal anneal) treatment, can be used. The LRTA treatment is treatment for heating an object by radiation of light (an electromagnetic wave) emitted from a lamp, such as a halogen lamp, a metal halide lamp, a xenon arc lamp, a carbon arc lamp, a high-pressure sodium lamp, or a high-pressure mercury lamp. A GRTA apparatus is an apparatus for performing heat treatment using a high-temperature gas. An inert gas is used as a gas.

Note that the back pressure of each of the deposition chamber 80b and the substrate heating chamber 85 is less than or equal to $1\times10^{-4}$ Pa, preferably less than or equal to $3\times10^{-5}$ Pa, more preferably less than or equal to $1\times10^{-5}$ Pa.

In each of the deposition chamber 80b and the substrate heating chamber 85, the partial pressure of a gas molecule (atom) having a mass-to-charge ratio (m/z) of 18 is less than or equal to $3\times10^{-5}$ Pa, preferably less than or equal to $1\times10^{-5}$ Pa, more preferably less than or equal to $3\times10^{-6}$ Pa.

In each of the deposition chamber 80b and the substrate heating chamber 85, the partial pressure of a gas molecule (atom) having a mass-to-charge ratio (m/z) of 28 is less than or equal to $3\times10^{-5}$ Pa, preferably less than or equal to $1\times10^{-5}$ Pa, more preferably less than or equal to $3\times10^{-6}$ Pa.

In each of the deposition chamber 80b and the substrate heating chamber 85, the partial pressure of a gas molecule (atom) having a mass-to-charge ratio (m/z) of 44 is less than or equal to $3\times10^{-5}$ Pa, preferably less than or equal to $1\times10^{-5}$ Pa, more preferably less than or equal to $3\times10^{-6}$ Pa.

Further, in each of the deposition chamber 80b and the substrate heating chamber 85, the leakage rate is $3\times10^{-6}$ Pa·m³/s or less, preferably $1\times10^{-6}$ Pa·m³/s or less.

In each of the deposition chamber 80b and the substrate heating chamber 85, the leakage rate of a gas molecule (atom) having a mass-to-charge ratio (m/z) of 18 is less than or equal to $1\times10^{-7}$ Pa·m³/s, preferably less than or equal to $3\times10^{-8}$ Pa·m³/s.

In each of the deposition chamber 80b and the substrate heating chamber 85, the leakage rate of a gas molecule (atom) having a mass-to-charge ratio (m/z) of 28 is less than or equal to $1\times10^{-5}$ Pa·m³/s, preferably less than or equal to $1\times10^{-6}$ Pa·m³/s.

In each of the deposition chamber 80b and the substrate heating chamber 85, the leakage rate of a gas molecule (atom) having a mass-to-charge ratio (m/z) of 44 is less than or equal to $3\times10^{-6}$ Pa·m³/s, preferably less than or equal to $1\times10^{-6}$ Pa·m³/s.

Note that a total pressure and a partial pressure in a vacuum chamber can be measured using a mass analyzer. For example, Qulee CGM-051, a quadrupole mass analyzer (also referred to as Q-mass) manufactured by ULVAC, Inc. can be used. Note that a leakage rate can be derived from the total pressure and partial pressure measured using the mass analyzer.

The leakage rate depends on external leakage and internal leakage. The external leakage refers to inflow of gas from the outside of a vacuum system through a minute hole, a sealing defect, or the like. The internal leakage is due to leakage through a partition, such as a valve, in a vacuum system or due to released gas from an internal member. Measures need to be taken from both aspects of external leakage and internal leakage in order that the leakage rate be lower than or equal to the above value.

For example, an open/close portion of the deposition chamber is preferably sealed with a metal gasket. For the metal gasket, metal covered with an iron fluoride, an aluminum oxide, or a chromium oxide is preferably used. The metal gasket realizes higher adhesion than an O-ring, and can reduce the external leakage. Further, with use of the metal covered with an iron fluoride, an aluminum oxide, a chromium oxide, or the like which is in the passive state, the release of gas containing impurities released from the metal gasket is suppressed, so that the internal leakage can be reduced.

For a member of the deposition apparatus, aluminum, chromium, titanium, zirconium, nickel, or vanadium, which releases a smaller amount of gas containing impurities, is used. Alternatively, an alloy containing iron, chromium, nickel, and the like covered with the above member may be used. The alloy containing iron, chromium, nickel, and the like is rigid, resistant to heat, and suitable for processing.

Here, when surface unevenness of the member is decreased by polishing or the like to reduce the surface area, the released gas can be reduced.

Alternatively, the above-mentioned member of the deposition apparatus may be covered with iron fluoride, aluminum oxide, chromium oxide, or the like.

The member of the deposition apparatus is preferably formed with only metal as much as possible. For example, in the case where a viewing window formed with quartz or the like is provided, it is preferable that the surface of the member be thinly covered with an iron fluoride, an aluminum oxide, a chromium oxide, or the like so as to suppress the released gas.

In the case where the refiner is provided just before a deposition gas is introduced, the length of a pipe between the refiner and the deposition chamber is less than or equal to 10 m, preferably less than or equal to 5 m, more preferably less than or equal to 1 m. When the length of the pipe is less than or equal to 10 m, less than or equal to 5 m, or less than or equal to 1 m, the effect of the release of gas from the pipe can be reduced accordingly.

Furthermore, as the pipe for the deposition gas, a metal pipe the inside of which is covered with iron fluoride, aluminum oxide, chromium oxide, or the like is preferably used. With the above pipe, the amount of released gas containing impurities is made small and the entry of impurities into the deposition gas can be reduced as compared with a SUS316L-EP pipe, for example. Further, a high-performance ultra-compact metal gasket joint (a UPG joint) is preferably used as a joint of the pipe. A structure where all the materials of the pipe are metals is preferable because the effect of the generated released gas or the external leakage can be reduced compared with a structure where resin or the like is used.

When an adsorbate is present in the deposition chamber, the adsorbate does not affect the pressure in the deposition chamber because it is adsorbed onto an inner wall or the like; however, the adsorbate causes gas to be released when the inside of the deposition chamber is evacuated. Therefore, although there is no correlation between the leakage rate and the evacuation rate, it is important that the adsorbate present in the deposition chamber be desorbed as much as possible and evacuation be performed in advance with the use of a pump with high evacuation capability. Note that the deposition chamber may be subjected to baking for promotion of desorption of the adsorbate. By the baking, the rate of desorption of the adsorbate can be increased about tenfold. The baking should be performed at a temperature greater than or equal to 100° C. and less than or equal to 450° C. At this time, when the adsorbate is removed while an inert gas is introduced to the deposition chamber, the desorption rate of water or the like, which is difficult to desorb simply by evacuation, can be further increased. Note that the rate of desorption of the adsorbate can be further increased by heating of the inert gas to be introduced at substantially the same temperature as the temperature of the baking. Here, a rare gas is preferably used as an inert gas. Depending on the kind of a film to be formed, oxygen or the like may be used instead of an inert gas. For example, in the case of depositing an oxide semiconductor layer, using oxygen, which is the main component of the oxide, is preferable in some cases.

Alternatively, treatment for evacuating the inside of the deposition chamber is preferably performed a certain period of time after a heated oxygen gas, a heated inert gas such as a heated rare gas, or the like is introduced to increase pressure in the deposition chamber. The introduction of the heated gas can desorb the adsorbate in the deposition chamber, and the impurities present in the deposition chamber can be reduced. Note that a positive effect can be achieved when this treatment is repeated 2 to 30 times inclusive, preferably 5 to 15 times inclusive. Specifically, an inert gas, oxygen, or the like with a temperature higher than or equal to 40° C. and lower than or equal to 400° C., preferably higher than or equal to 50° C. and lower than or equal to 500° C. is introduced to the deposition chamber, so that the pressure therein can be kept to be greater than or equal to 0.1 Pa and less than or equal to 10 kPa, preferably greater than or equal to 1 Pa and less than or equal to 1 kPa, further preferably greater than or equal to 5 Pa and less than or equal to 100 Pa in the time range of 1 minute to 300 minutes, preferably 5 minutes to 120 minutes. After that, the inside of the deposition chamber is evacuated for longer than or equal to 5 minutes and shorter than or equal to 300 minutes, preferably longer than or equal to 10 minutes and shorter than or equal to 120 minutes.

The rate of desorption of the adsorbate can be further increased also by dummy deposition. Here, the dummy deposition refers to deposition on a dummy substrate by sputtering or the like, in which a film is formed on the dummy substrate and the inner wall of the deposition chamber so that impurities in the deposition chamber and an adsorbate on the inner wall of the deposition chamber are confined in the film. For a dummy substrate, a substrate which releases a smaller amount of gas is preferably used. By performing dummy deposition, impurity concentration in a film to be formed can be reduced. Note that the dummy deposition may be performed at the same time as the baking of the deposition chamber.

When an oxide semiconductor layer is formed with the use of the above deposition apparatus, the mixing of impurities into the oxide semiconductor layer can be suppressed. Further, when a film in contact with the oxide semiconductor layer is formed with use of the above deposition apparatus, the mixing of impurities into the oxide semiconductor layer from the film in contact therewith can be prevented.

Next, a method for forming a CAAC-OS with the use of the above deposition apparatus is described.

The surface temperature of the target is set to lower than or equal to 100° C., preferably lower than or equal to 50° C., further preferably about room temperature (typically, 20° C. or 25° C.). In a sputtering apparatus for a large substrate, a target having a large area is often used. However, it is difficult to form a target for a large substrate without a juncture. In fact, although to obtain a large shape a plurality of targets are arranged so that there is as little space as possible therebetween, a slight space is inevitably generated. When the surface temperature of the target increases, in some cases, Zn or the like is volatilized from such a slight space, and the space might be expanded gradually. When the space expands, a metal of a backing plate or a metal used for adhesion might be sputtered and cause an increase in impurity concentration. Thus, it is preferable that the target be cooled sufficiently.

Specifically, for the backing plate, a metal having high conductivity and a high heat dissipation property (specifically Cu) is used. The target can be cooled efficiently by making a sufficient amount of cooling water flow through a water channel which is formed in the backing plate. Here, the sufficient amount of cooling water, which depends on the size of the target, is set to greater than or equal to 3 L/min, greater than or equal to 5 L/min, or greater than or equal to 10 L/min in the case of, for example, a circular target whose diameter is 300 mm.

The CAAC-OS is formed in an oxygen gas atmosphere at a substrate heating temperature of higher than or equal to 100° C. and lower than or equal to 600° C., preferably higher than or equal to 150° C. and lower than or equal 550° C., and further preferably higher than or equal to 200° C. and lower than or equal 500° C. The thickness of the CAAC-OS is greater than or equal to 1 nm and less than or equal to 40 nm, preferably greater than or equal to 3 nm and less than or equal to 20 nm. As the heating temperature during the deposition is higher, the impurity concentration in the obtained CAAC-OS is lower. Further, migration of sputtered particles on a deposition surface is likely to occur; therefore, the atomic arrangement in the oxide film is ordered and the density thereof is increased, so that a CAAC-OS with high crystallinity is formed easily. Furthermore, when the deposition is performed in an oxygen gas atmosphere, plasma damage is alleviated and a surplus atom such as a rare gas atom is not contained in the oxide film, whereby a CAAC-OS with high crystallinity is formed easily. Note that the deposition may be performed in a mixed atmosphere of an oxygen gas and a rare gas. In that case, the percentage of the oxygen gas is higher than or equal to 30 vol. %, preferably higher than or equal to 50 vol. %, further preferably higher than or equal to 80 vol. %, still further more preferably 100 vol. %.

Note that in the case where the target includes Zn, plasma damage is alleviated by the deposition in an oxygen gas atmosphere; thus, a CAAC-OS in which Zn is unlikely to be volatilized can be obtained.

The CAAC-OS is formed under the following conditions: the deposition pressure is less than or equal to 0.8 Pa, preferably less than or equal to 0.4 Pa, and the distance between the target and a substrate is less than or equal to 40 mm, preferably less than or equal to 25 mm. When the CAAC-OS is deposited under such a condition, the frequency of the collision between a sputtered particle and another sputtered particle, a gas molecule, or an ion can be reduced. That is, depending on the deposition pressure, the distance between the target and the substrate is made shorter than the mean free path of a sputtered particle, a gas molecule, or an ion, so that the concentration of impurities to be mixed into the film can be reduced.

For example, when the pressure is 0.4 Pa and the temperature is 25° C. (the absolute temperature is 298 K), a hydrogen molecule ($H_2$) has a mean free path of 48.7 mm, a helium atom (He) has a mean free path of 57.9 mm, a water molecule ($H_2O$) has a mean free path of 31.3 mm, an methane molecule ($CH_4$) has a mean free path of 13.2 mm, a neon atom (Ne) has a mean free path of 42.3 mm, a nitrogen molecule ($N_2$) has a mean free path of 23.2 mm, a carbon monoxide molecule (CO) has a mean free path of 16.0 mm, an oxygen molecule ($O_2$) has a mean free path of 26.4 mm, an argon atom (Ar) has a mean free path of 28.3 mm, a carbon dioxide molecule ($CO_2$) has a mean free path of 10.9 mm, a krypton atom (Kr) has a mean free path of 13.4 mm, and a xenon atom (Xe) has a mean free path of 9.6 mm. Note that doubling of the pressure halves a mean free path and doubling of the absolute temperature doubles a mean free path.

The mean free path depends on pressure, temperature, and the diameter of a molecule (atom). In the case where pressure and temperature are constant, as the diameter of a molecule (atom) is larger, the mean free path is shorter. Note that the diameters of the molecules (atoms) are as follows: $H_2$: 0.218 nm; He: 0.200 nm; $H_2O$: 0.272 nm; $CH_4$: 0.419 nm; Ne: 0.234 nm; $N_2$: 0.316 nm; CO: 0.380 nm; $O_2$: 0.296 nm; Ar: 0.286 nm; $CO_2$: 0.460 nm; Kr: 0.415 nm; and Xe: 0.491 nm.

Thus, as the diameter of a molecule (atom) is larger, the mean free path is shorter and the degree of crystallinity is lowered due to the large diameter of the molecule (atom) when the molecule (atom) enters the film. For this reason, it can be said that, for example, a molecule (atom) whose diameter is larger than that of Ar is likely to behave as an impurity.

Next, heat treatment is performed. The heat treatment is performed under reduced pressure or in an inert atmosphere or an oxidation atmosphere. By the heat treatment, the impurity concentration in the CAAC-OS can be reduced.

The heat treatment is preferably performed in a manner such that after heat treatment is performed under reduced pressure or in an inert atmosphere, the atmosphere is switched to an oxidation atmosphere with the temperature maintained and heat treatment is further performed. When the heat treatment is performed under reduced pressure or in an inert atmosphere, the impurity concentration in the CAAC-OS can be reduced; however, oxygen vacancies are generated at the same time. By the heat treatment in an oxidation atmosphere, the generated oxygen vacancies can be reduced.

When heat treatment is performed on the CAAC-OS in addition to the substrate heating during the deposition, the impurity concentration in the film can be reduced.

Specifically, the concentration of hydrogen in the CAAC-OS, which is measured by SIMS, can be set to lower than or equal to $2 \times 10^{20}$ atoms/cm$^3$, preferably lower than or equal to $5 \times 10^{19}$ atoms/cm$^3$, further preferably lower than or equal to $1 \times 10^{19}$ atoms/cm$^3$, still further preferably lower than or equal to $5 \times 10^{18}$ atoms/cm$^3$.

The concentration of nitrogen in the CAAC-OS, which is measured by SIMS, can be set to lower than $5 \times 10^{19}$ atoms/cm$^3$, preferably lower than or equal to $5 \times 10^{18}$ atoms/cm$^3$, more preferably lower than or equal to $1 \times 10^{18}$ atoms/cm$^3$, still further preferably lower than or equal to $5 \times 10^{17}$ atoms/cm$^3$.

The concentration of carbon in the oxide semiconductor layer, which is measured by SIMS, can be set to lower than $5 \times 10^{19}$ atoms/cm$^3$, preferably lower than or equal to $5 \times 10^{18}$ atoms/cm$^3$, further preferably lower than or equal to $1 \times 10^{18}$ atoms/cm$^3$, still further preferably lower than or equal to $5 \times 10^{17}$ atoms/cm$^3$.

The amount of each of the following gas molecules (atoms) released from the CAAC-OS can be less than or equal to $1 \times 10^{19}$/cm$^3$, preferably less than or equal to $1 \times 10^{18}$/cm$^3$ or less, which is measured by TDS analysis: a gas molecule (atom) having a mass-to-charge ratio (m/z) of 2 (e.g., hydrogen molecule), a gas molecule (atom) having a mass-to-charge ratio (m/z) of 18, a gas molecule (atom) having a mass-to-charge ratio (m/z) of 28, and a gas molecule (atom) having a mass-to-charge ratio (m/z) of 44.

Description of a measurement method of the amount of released oxygen atoms, which is described later, is referred to for a measurement method of the release amount using TDS analysis.

In the above manner, a CAAC-OS film with high crystallinity can be formed.

Next, a top-gate top-contact (TGTC) transistor, which is one kind of top gate transistor, is described with reference to FIGS. 18A to 18C.

Figure 18A:
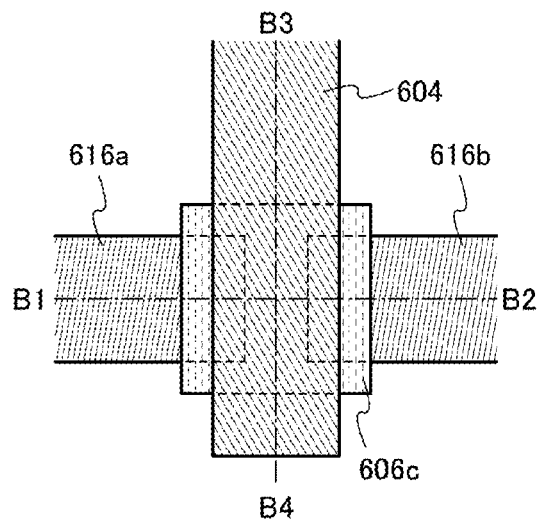
FIGS. 18A to 18C are a top view and cross-sectional views illustrating a transistor according to one embodiment of the present invention.
Figure 18C:
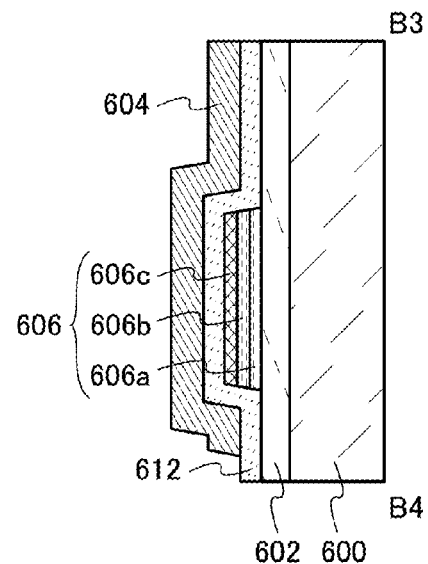
Figure 18B:
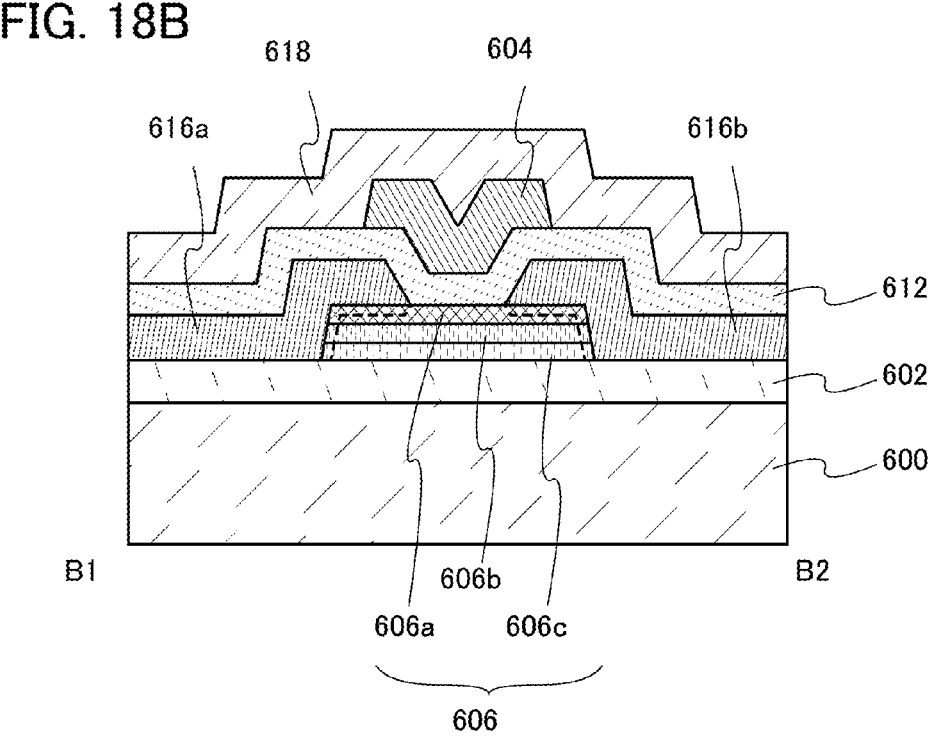

FIGS. 18A to 18C are a top view and cross-sectional views of a TGTC transistor. FIG. 18A is the top view of the transistor. FIG. 18B is a cross-sectional view taken along dashed-dotted line B1-B2 in FIG. 18A. FIG. 18C is a cross-sectional view taken along dashed-dotted line B3-B4 in FIG. 18A.

The transistor illustrated in FIG. 18B includes a base insulating film 602 provided over a semiconductor substrate 600; a multilayer film 606 which includes an oxide layer 606a provided over the base insulating film 602, an oxide semiconductor layer 606b provided over the oxide layer 606a, and an oxide layer 606c provided over the oxide semiconductor layer 606b; a source electrode 616a and a drain electrode 616b which are provided over the base insulating film 602 and the multilayer film 606; a gate insulating film 612 which is provided over the multilayer film 606, the source electrode 616a, and the drain electrode 616b; a gate electrode 604 which is provided over the gate insulating film 612; and a protective insulating film 618 which is provided over the gate insulating film 612 and the gate electrode 604. Note that the transistor does not necessarily include the base insulating film 602 and/or the protective insulating film 618.

Note that the source electrode 616a and the drain electrode 616b are provided in contact with side edges of the oxide semiconductor layer 606b.

As illustrated in FIG. 18B, depending on the kind of a conductive film used for the source electrode 616a and the drain electrode 616b, oxygen included in part of the oxide layer 606c is removed, so that n-type regions are formed to be serve as a source region and a drain region in some cases. Further, the n-type region is a region where many oxygen defects exist in the oxide layer. Further, a component of the source electrode 616a is mixed into the n-type region; for example, in the case where a tungsten film is used for the source electrode 616a, an element of tungsten is mixed into the n-type regions. Further, although not illustrated, oxygen in the oxide layer is mixed into a region of the source electrode 616a which is in contact with the oxide layer, so that a mixed layer can be formed in the region. Note that also in the oxide layer on the drain electrode 616b side, the above n-type region is formed. In FIG. 18B, a boundary of the n-type region is denoted by a dotted line.

In FIG. 18A, in a region which overlaps with the gate electrode 604, a distance between the source electrode 616a and the drain electrode 616b is referred to as a channel length. Note that in the case where the transistor includes the source region and the drain region, a distance between the source region and the drain region in the region overlapping with the gate electrode 604 may be referred to as a channel length.

Note that a channel formation corresponds to a region of the multilayer film 606 which overlaps with the gate electrode 604 and is positioned between the source electrode 616a and the drain electrode 616b. Further, the channel corresponds to a region of the channel formation region, where current mainly flows. Here, the channel is part of the oxide semiconductor layer 606b in the channel formation region.

The description of the multilayer film 706 in FIG. 11 is referred to for the multilayer film 606. Specifically, the description of the oxide layer 706c is referred to for the oxide layer 606a, the description of the oxide semiconductor layer 706b is referred to for the oxide semiconductor layer 606b, and the description of the oxide layer 706a is referred to for the oxide layer 606c.

The oxide layer 606c contains one or more kinds of elements contained in the oxide semiconductor layer 606b. The energy of the bottom of the conduction band in the oxide layer 606c is located closer to the vacuum level than that in the oxide semiconductor layer 606b by 0.05 eV or more, 0.07 eV or more, 0.1 eV or more, or 0.15 eV or more and 2 eV or less, 1 eV or less, 0.5 eV or less, or 0.4 eV or less. Note that to increase carrier mobility of the oxide semiconductor layer 606b, the oxide semiconductor layer 606b preferably contains at least indium. At this time, application of an electric field to the gate electrode 604 forms a channel in the oxide semiconductor layer 606b in the multilayer film 606, where the energy of the bottom of the conduction band is low. That is, when the oxide layer 606c is provided between the oxide semiconductor layer 606b and the gate insulating film 612, the channel of the transistor can be formed in the oxide semiconductor layer 606b, which is not in contact with the gate insulating film 612. Further, since the oxide layer 606c contains one or more kinds of elements contained in the oxide semiconductor layer 606b, interface scattering is not likely to occur at the interface between the oxide semiconductor layer 606b and the oxide layer 606c. Thus, carriers are not inhibited from moving at the interface, which results in an increase in the field-effect mobility of the transistor.

The oxide layer 606c has a thickness greater than or equal to 3 nm and less than or equal to 100 nm, preferably greater than or equal to 3 nm and less than or equal to 50 nm. The oxide semiconductor layer 606b has a thickness greater than or equal to 3 nm and less than or equal to 200 nm, preferably greater than or equal to 3 nm and less than or equal to 100 nm, further preferably greater than or equal to 3 nm and less than or equal to 15 nm. The oxide layer 606a has a thickness greater than or equal to 3 nm and less than or equal to 100 nm, preferably greater than or equal to 3 nm and less than or equal to 50 nm.

The oxide layer 606a contains one or more kinds of elements contained the oxide semiconductor layer 606b. The energy of the bottom of the conduction band in the oxide layer 606a is located closer to the vacuum level than that in the oxide semiconductor layer 606b by 0.05 eV or more, 0.07 eV or more, 0.1 eV or more, or 0.15 eV or more and 2 eV or less, 1 eV or less, 0.5 eV or less, or 0.4 eV or less. Since the oxide layer 606a contains one or more kinds of elements contained in the oxide semiconductor layer 606b, interface scattering is not likely to occur at the interface between the oxide semiconductor layer 606b and the oxide layer 606a. When the interface has an interface state, a second transistor in which the interface serves as a channel is formed and the apparent threshold voltage of the transistor varies in some cases. Thus, providing the oxide layer 606a makes it possible to reduce variation in the electrical characteristics of the transistor, such as threshold voltage.

For example, each of the oxide layer 606a and the oxide layer 606c can be an oxide layer which contains the same elements as the oxide semiconductor layer 606b (i.e., indium, gallium, and zinc) as the main components and in which the atomic ratio of gallium is higher than that of the oxide semiconductor layer 606b. Specifically, an oxide layer in which the atomic ratio of gallium is 1.5 times or more, preferably 2 times or more, further preferably 3 times or more that of the oxide semiconductor layer 606b is used as each of the oxide layer 606a and the oxide layer 606c. Gallium is strongly bonded to oxygen, and thus has a function of preventing generation of oxygen vacancies in the oxide layer. In other words, the oxide layer 606a and the oxide layer 606c are oxide layers in which oxygen vacancies are less likely to occur than in the oxide semiconductor layer 606b.

Note that the oxide layer 606a, the oxide semiconductor layer 606b, and the oxide layer 606c are amorphous or crystalline. It is preferable that the oxide layer 606a be amorphous or crystalline, the oxide semiconductor layer 606b be crystalline, and the oxide layer 606c be amorphous. When the oxide semiconductor layer 606b in which the channel is formed is crystalline, the transistor can have stable electrical characteristics.

Next, other structures of the transistor are described below.

The description of the semiconductor substrate 800 is referred to for the semiconductor substrate 600.

The source electrode 616a and the drain electrode 616b may be formed with a single layer or a stacked layer using one or more conductive films containing one or more of the following elements: aluminum, titanium, chromium, cobalt, nickel, copper, yttrium, zirconium, molybdenum, ruthenium, silver, tantalum, and tungsten. Note that the source electrode 616a and the drain electrode 616b may have the same composition or different compositions. For example, a stack of a tungsten film and a tantalum nitride film is used.

Note that although the multilayer film 606 is formed to extend to the outside of the gate electrode 604 in FIG. 18A, the multilayer film 606 may be formed inside the gate electrode 604 to prevent generation of carriers in the multilayer film 606 due to light.

The base insulating film 602 may be formed using a single layer or a stacked layer using an insulating film containing one or more kinds of aluminum oxide, magnesium oxide, silicon oxide, silicon oxynitride, silicon nitride oxide, silicon nitride, gallium oxide, germanium oxide, yttrium oxide, zirconium oxide, lanthanum oxide, neodymium oxide, hafnium oxide, and tantalum oxide.

For example, the base insulating film 602 may be a multilayer film of a silicon nitride layer as the first layer and a silicon oxide layer as the second layer. In this case, a silicon oxynitride layer may be used instead of the silicon oxide layer. As the silicon oxide layer, a silicon oxide layer with a low defect density is preferably used. Specifically, a silicon oxide layer which has a spin density of $3 \times 10^{17}$ spins/cm$^3$ or less, preferably $5 \times 10^{16}$ spins/cm$^3$ or less corresponding to a signal at a g-factor of 2.001 in electron spin resonance (ESR) spectroscopy is used. As the silicon nitride layer, a silicon nitride layer which releases a small amount of hydrogen and a small amount of ammonia is used. The amount of released hydrogen and the amount of released ammonia can be measured by TDS analysis. Further, a silicon nitride layer which oxygen does not penetrates or hardly penetrate is used as the silicon nitride layer.

Alternatively, for example, the base insulating film 602 may be a multilayer film of a first silicon nitride layer as the first layer, a first silicon oxide layer as the second layer, and a second silicon oxide layer as the third layer. In that case, the first and/or second silicon oxide layer may be a silicon oxynitride layer. Alternatively, the silicon nitride layer may be a silicon nitride oxide layer. The first silicon oxide layer is preferably a silicon oxide layer with a low defect density. Specifically, a silicon oxide layer which has a spin density of $3 \times 10^{17}$ spins/cm$^3$ or less, preferably $5 \times 10^{16}$ spins/cm$^3$ or less corresponding to a signal at a g-factor of 2.001 in electron spin resonance (ESR) spectroscopy is used. As the second oxide layer, a silicon oxide layer containing excess oxygen is used. As the silicon nitride layer, a silicon nitride layer which releases a small amount of hydrogen and a small amount of ammonia is used. Further, a silicon nitride layer which oxygen does not penetrates or hardly penetrate is used as the silicon nitride layer.

The silicon oxide layer containing excess oxygen refers to a silicon oxide layer which can release oxygen by heat treatment or the like. When the silicon oxide layer is applied broadly to an insulating film, the thus obtained insulating film containing excess oxygen is an insulating film having a function of releasing oxygen by heat treatment.

Here, a film from which releases oxygen by heat treatment may release oxygen, the amount of which is higher than or equal to $1 \times 10^{18}$ atoms/cm$^3$, higher than or equal to $1 \times 10^{19}$ atoms/cm$^3$, or higher than or equal to $1 \times 10^{20}$ atoms/cm$^3$ in TDS analysis (converted into the number of oxygen atoms).

Here, a method to measure the amount of released oxygen using TDS analysis is described.

The total amount of released gas from a measurement sample in TDS is proportional to the integral value of the ion intensity of the released gas. Then, a comparison with a reference sample is made, whereby the total amount of released gas can be calculated.

For example, the number of released oxygen molecules ($N_{O2}$) from a measurement sample can be calculated according to Formula (1) using the TDS results of a silicon wafer containing hydrogen at a predetermined density, which is the reference sample, and the TDS results of the measurement sample. Here, all gases having a mass number of 32 which are obtained in the TDS analysis are assumed to originate from an oxygen molecule. CH$_3$OH, which is given as a gas having a mass number of 32, is not taken into consideration on the assumption that it is unlikely to be present. Further, an oxygen molecule including an oxygen atom having a mass number of 17 or 18 which is an isotope of an oxygen atom is also not taken into consideration because the proportion of such a molecule in the natural world is minimal.

$$N_{O2} = \frac{N_{H2}}{S_{H2}} \times S_{O2} \times \alpha \qquad \text{[Formula 1]}$$

$N_{H2}$ is the value obtained by conversion of the number of hydrogen molecules desorbed from the standard sample into densities. $S_{H2}$ is the integral value of ion intensity when the standard sample is subjected to TDS analysis. Here, the reference value of the standard sample is set to $N_{H2}/S_{H2}$. $S_{O2}$ is the integral value of ion intensity when the measurement sample is analyzed by TDS. $\alpha$ is a coefficient affecting the ion intensity in the TDS analysis. Refer to Japanese Published Patent Application No. H6-275697 for details of the Formula (I). Note that the amount of released oxygen is measured with a thermal desorption spectroscopy apparatus produced by ESCO Ltd., EMD-WA1000S/W using a silicon wafer containing hydrogen atoms at $1 \times 10^{16}$ atoms/cm$^3$ as the reference sample.

Further, in the TDS analysis, oxygen is partly detected as an oxygen atom. The ratio between oxygen molecules and oxygen atoms can be calculated from the ionization rate of the oxygen molecules. Note that, since the above $\alpha$ includes the ionization rate of the oxygen molecules, the number of the released oxygen atoms can also be estimated through the evaluation of the number of the released oxygen molecules.

Note that $N_{O2}$ is the number of the released oxygen molecules. The amount of released oxygen when converted into oxygen atoms is twice the number of the released oxygen molecules.

Further, the film from which oxygen is released by heat treatment may contain a peroxide radical. Specifically, the spin density attributed to a peroxide radical is $5 \times 10^{17}$ spins/cm$^3$ or higher. Note that to contain a peroxide radical means to have an asymmetric signal at a g value of around 2.01 in ESR.

The insulating film containing excess oxygen may be formed using oxygen-excess silicon oxide ($SiO_x$ (X>2)). In the oxygen-excess silicon oxide ($SiO_X$ (X>2)), the number of oxygen atoms per unit volume is more than twice the number of silicon atoms per unit volume. The number of silicon atoms and the number of oxygen atoms per unit volume are measured by RBS.

In the case where at least one of the gate insulating film 612 and the base insulating film 602 includes an insulating film containing excess oxygen, oxygen vacancies in the oxide semiconductor layer 606*b* can be reduced.

The protective insulating film 618 may be formed of a single layer or a stacked layer using an insulating film containing one or more of aluminum oxide, magnesium oxide, silicon oxide, silicon oxynitride, silicon nitride oxide, silicon nitride, gallium oxide, germanium oxide, yttrium oxide, zirconium oxide, lanthanum oxide, neodymium oxide, hafnium oxide, and tantalum oxide.

In the transistor formed in the above manner, a channel is formed in the oxide semiconductor layer 606*b* of the multilayer film 606; accordingly, the transistor has stable electrical characteristics and high field-effect mobility.

Here, a method for manufacturing the transistor is described with reference to FIGS. 19A to 19C and FIGS. 20A and 20B.

First, the semiconductor substrate 600 over which the base insulating film 602 is formed is prepared. As the base insulating film 602, a silicon oxide layer containing excess oxygen is formed using a sputtering apparatus.

Then, an oxide layer to be the oxide layer 606*a* is deposited. A 20-nm-thick IGZO (In:Ga:Zn=1:3:2) film is formed as the oxide layer 606*a*. Note that the deposition of the IGZO (In:Ga:Zn=1:3:2) film is performed under the following deposition conditions: a sputtering apparatus is used; the substrate temperature is 200° C., flow rates of Ar and $O_2$ were 30 sccm and 15 sccm, respectively; the deposition pressure is 0.4 Pa; the deposition power (DC) is 0.5 kW; and a distance between the substrate and the target (T-S distance) is 60 mm.

Then, an oxide semiconductor layer to be the oxide semiconductor layer 606*b* is deposited. A 15-nm-thick IGZO (In:Ga:Zn=1:1:1) film is formed as the oxide semiconductor layer 606*b*. Note that the deposition of the IGZO (In:Ga:Zn=1:1:1) film is performed under the following deposition conditions: a sputtering apparatus is used; the substrate temperature is 300° C., flow rates of Ar and $O_2$ were 30 sccm and 15 sccm, respectively; the deposition pressure is 0.4 Pa; the deposition power (DC) is 0.5 kW; and a distance between the substrate and the target (T-S distance) is 60 mm.

Then, an oxide layer to be the oxide layer 606*c* is deposited. A 5-nm-thick IGZO (In:Ga:Zn=1:3:2) film is formed as the oxide layer 606*c*. Note that the deposition of the IGZO (In:Ga:Zn=1:3:2) film is performed under the following deposition conditions: a sputtering apparatus is used; the substrate temperature is 200° C., flow rates of Ar and $O_2$ were 30 sccm and 15 sccm, respectively; the deposition pressure is 0.4 Pa; the deposition power (DC) is 0.5 kW; and a distance between the substrate and the target (T-S distance) is 60 mm.

Next, first heat treatment is preferably performed. The first heat treatment can be performed at a temperature higher than or equal to 250° C. and lower than or equal to 650° C., preferably higher than or equal to 300° C. and lower than or equal to 500° C. The first heat treatment is performed in an inert gas atmosphere, an atmosphere containing an oxidizing gas at 10 ppm or more, preferably 1% or more, further preferably 10% or more, or under reduced pressure. Alternatively, the first heat treatment may be performed in such a manner that heat treatment is performed in an inert gas atmosphere, and then another heat treatment is performed in an atmosphere containing an oxidizing gas at 10 ppm or more, preferably 1% or more, further preferably 10% or more in order to compensate desorbed oxygen. By the first heat treatment, the crystallinity of the oxide semiconductor layer to be the oxide semiconductor layer 606*b* can be increased, and impurities such as hydrogen and moisture can be removed from the base insulating film 602, the oxide layer to be the oxide layer 606*a*, the oxide semiconductor layer to be the oxide semiconductor layer 606*b* and/or the oxide layer to be the oxide layer 606*c*.

Figure 19A:
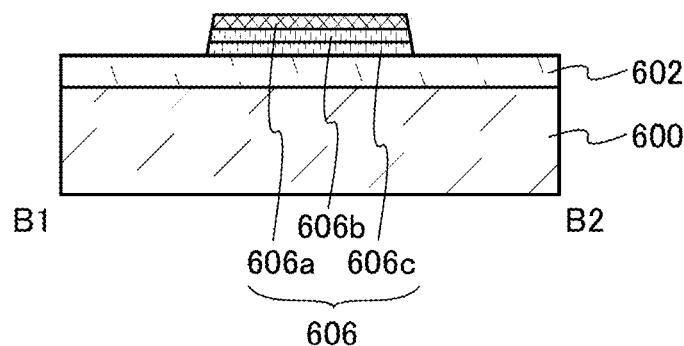
FIGS. 19A to 19C are cross-sectional views illustrating a method for manufacturing a transistor according to one embodiment of the present invention.

Next, the oxide layer to be the oxide layer 606*a*, the oxide semiconductor layer to be the oxide semiconductor layer 606*b*, and the oxide layer to be the oxide layer 606*c* are partly etched to form the multilayer film 606 including the oxide layer 606*a*, the oxide semiconductor layer 606*b*, and the oxide layer 606*c* (see FIG. 19A).

Next, a conductive film to be the source electrode 616*a* and the drain electrode 616*b* is formed.

Figure 19B:
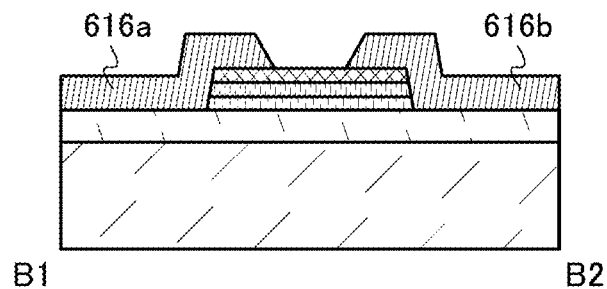

Next, the conductive film to be the source electrode 616*a* and the drain electrode 616*b* is partly etched to form the source electrode 616*a* and the drain electrode 616*b* (see FIG. 19B).

Next, second heat treatment is preferably performed. The description of the first heat treatment can be referred to for the second heat treatment. By the second heat treatment, impurities such as hydrogen and water can be removed from the multilayer film 606.

Figure 19C:
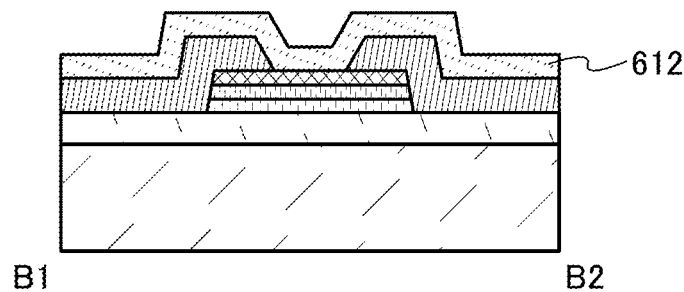

Then, the gate insulating film 612 is formed (see FIG. 19C). The gate insulating film 612 may be a multilayer film including a first silicon oxide layer as the first layer, a second silicon oxide layer 418*b* as the second layer, and a silicon nitride layer as the third layer. In that case, the first silicon oxide layer and/or the second silicon oxide layer may be a silicon oxynitride layer. Further, the silicon nitride layer may be a silicon nitride oxide layer. The first silicon oxide layer is preferably a silicon oxide layer with a low defect density. Specifically, a silicon oxide layer which has a spin density of $3 \times 10^{17}$ spins/cm$^3$ or less, preferably $5 \times 10^{16}$ spins/cm$^3$ or less corresponding to a signal at a g-factor of 2.001 in ESR is used. As the second oxide layer, a silicon oxide layer containing excess oxygen is used. As the silicon nitride layer, a silicon nitride layer which releases a small amount of hydrogen and ammonia is used. Further, a silicon nitride layer which oxygen does not penetrates or hardly penetrate is used.

Next, a conductive film to be the gate electrode 604 is formed.

Figure 20A:
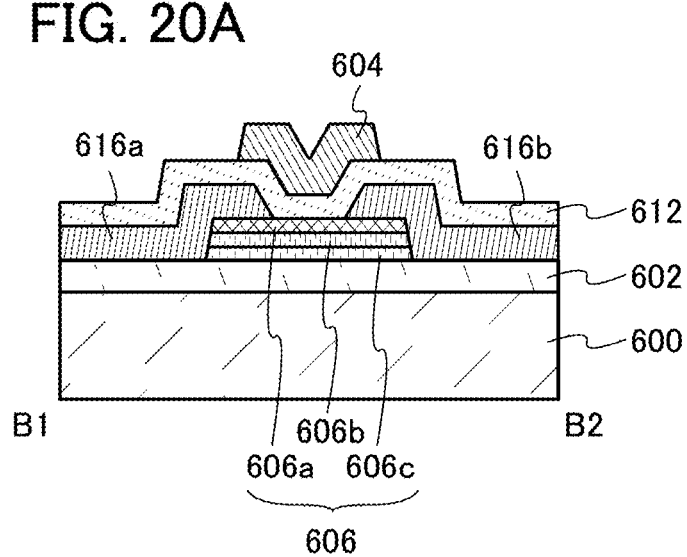
FIGS. 20A and 20B are cross-sectional views illustrating a method for manufacturing a transistor according to one embodiment of the present invention.

Then, the conductive film to be the gate electrode 604 is partly etched to form the gate electrode 604 (see FIG. 20A).

Figure 20B:
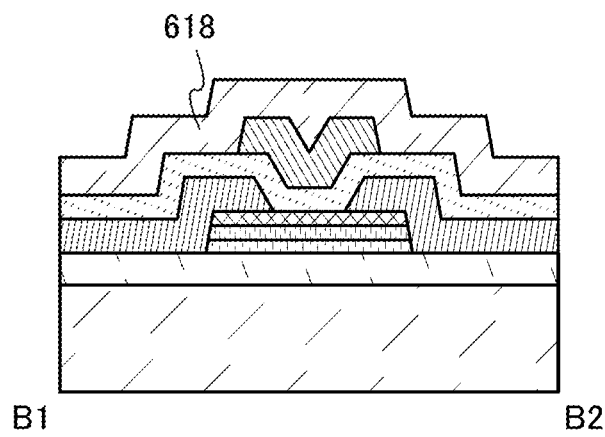

Subsequently, the protective insulating film 618 is deposited (see FIG. 20B).

In this manner, the transistor in FIGS. 18A to 18C can be manufactured.

Since oxygen vacancies in the oxide semiconductor layer 606*b* of the multilayer film 606 are reduced, the transistor has stable electrical characteristics.

(Embodiment 7)

The microcontroller disclosed in this specification can be applied to a variety of electronic appliances (including game machines). Examples of the electronic devices include display devices of televisions, monitors, and the like, lighting devices, desktop personal computers and notebook personal computers, word processors, image reproduction devices which reproduce still images or moving images stored in recording media such as digital versatile discs (DVDs), portable compact disc (CD) players, radio receivers, tape recorders, headphone stereos, stereos, cordless phone handsets, transceivers, cellular phones, car phones, portable game machines, calculators, portable information terminals, electronic notebooks, e-book readers, electronic translators, audio input devices, cameras such as video cameras and digital still cameras, electric shavers, IC chips, high-frequency heating appliances such as microwave ovens, electric rice cookers, electric washing machines, electric vacuum cleaners, air-conditioning systems such as air conditioners, dishwashers, dish dryers, clothes dryers, futon dryers, electric refrigerators, electric freezers, electric refrigerator-freezers, freezers for preserving DNA, smoke detectors, radiation counters, and medical equipment such as dialyzers. Further, the examples include industrial equipment such as guide lights, traffic lights, belt conveyors, elevators, escalators, industrial robots, and power storage systems. In addition, movable objects and the like driven by oil engines or motors using power from non-aqueous secondary batteries are also included in the category of electronic devices. Examples of the moving objects include electric vehicles (EV), hybrid electric vehicles (HEV) which include both an internal-combustion engine and a motor, plug-in hybrid electric vehicles (PHEV), tracked vehicles in which caterpillar tracks are substituted for wheels of these vehicles, motorized bicycles including motor-assisted bicycles, motorcycles, electric wheelchairs, golf carts, boats or ships, submarines, helicopters, aircrafts, rockets, artificial satellites, space probes, planetary probes, spacecrafts, and the like. Specific examples of these electronic devices are illustrated in FIGS. 21A to 21C.

Figure 21A:
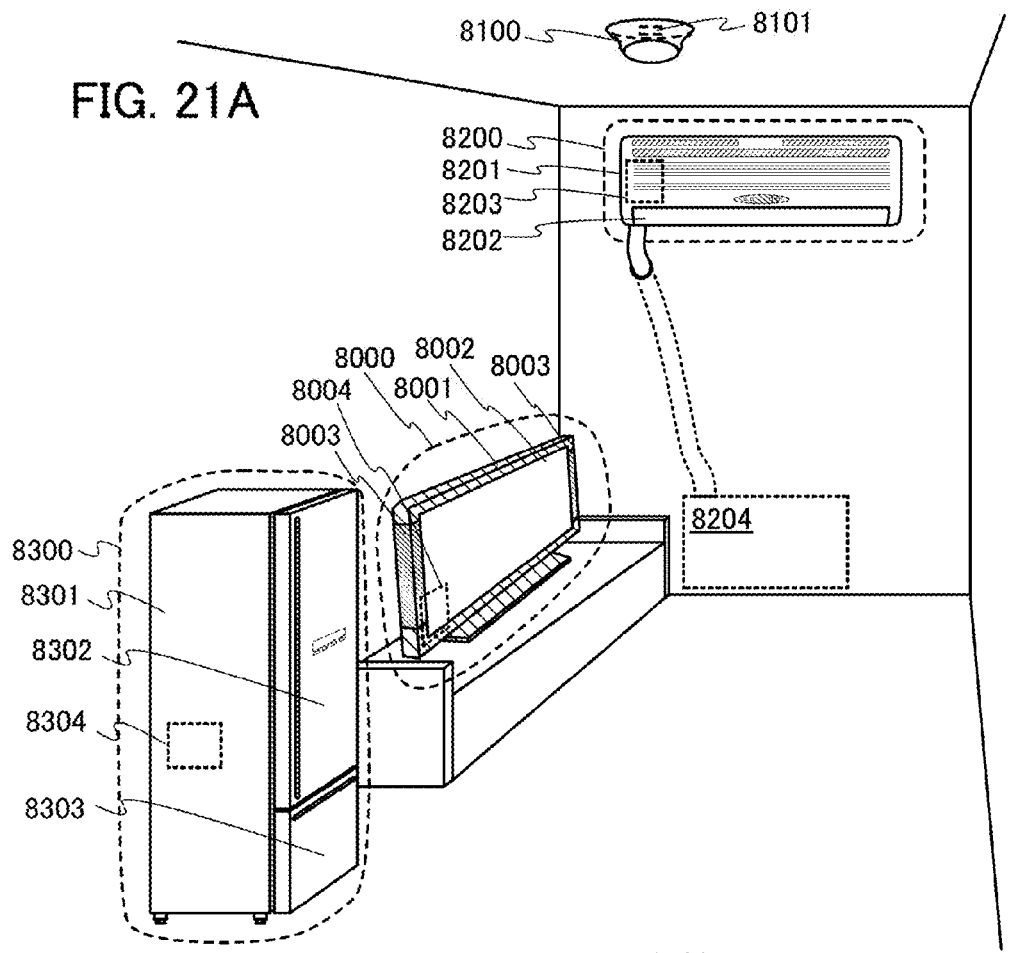
FIGS. 21A to 21C illustrate electronic appliances.
Figure 21B:
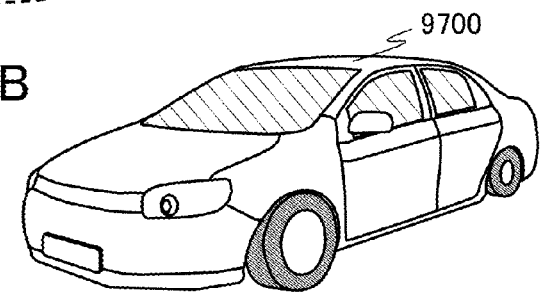
Figure 21C:
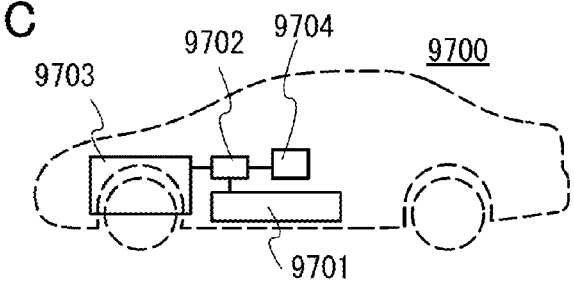

In FIG. 21A, an alarm device 8100 is a home fire alarm and includes a detector and a microcomputer 8101 including an oxide semiconductor.

In FIG. 21A, an air conditioner including an indoor unit 8200 and an outdoor unit 8204 is an example of an electric appliance using a microcomputer including an oxide semiconductor. Specifically, the indoor unit 8200 includes a housing 8201, an air outlet 8202, a microcomputer 8203, and the like. Although the microcomputer 8203 is provided in the indoor unit 8200 in FIG. 21A, the microcomputer 8203 may be provided in the outdoor unit 8204. Alternatively, the microcomputer 8203 may be provided in both the indoor unit 8200 and the outdoor unit 8204. Application of the microcomputer described in the above embodiment to the microcomputer of the air conditioner leads to electric power saving.

In FIG. 21A, an electric refrigerator-freezer 8300 is an example of an electrical appliance which is provided with the microcomputer using an oxide semiconductor. Specifically, the electric refrigerator-freezer 8300 includes a housing 8301, a door for a refrigerator 8302, a door for a freezer 8303, a microcomputer 8304, and the like. In FIG. 21A, the microcomputer 8304 is provided in the housing 8301. Application of the transistor described in the above embodiment to the microcomputer of the electric refrigerator-freezer 8300 leads to electric power saving.

FIG. 21B illustrates an example of an electric vehicle which is an example of an electric appliance. An electric vehicle 9700 is equipped with a secondary battery 9701. The output of the electric power of the secondary battery 9701 is adjusted by a control circuit 9702 and the electric power is supplied to a driving device 9703. The control circuit 9702 is controlled by a microcomputer 9704 including a ROM, a RAM, a CPU, or the like which is not illustrated. Application of the microcomputer using an oxide semiconductor to the microcomputer 9704 of the electric vehicle 9700 leads to electric power saving.

The driving device 9703 includes a DC motor or an AC motor either alone or in combination with an internal-combustion engine. The microcomputer 9704 outputs a control signal to the control circuit 9702 based on input data such as data of operation (e.g., acceleration, deceleration, or stop) by a driver or data during driving (e.g., data on an upgrade or a downgrade, or data on a load on a driving wheel) of the electric vehicle 9700. The control circuit 9702 adjusts the electric energy supplied from the secondary battery 9701 in accordance with the control signal of the microcomputer 9704 to control the output of the driving device 9703. In the case where the AC motor is mounted, although not illustrated, an inverter which converts direct current into alternate current is also incorporated.

(Embodiment 8)

Figure 22:
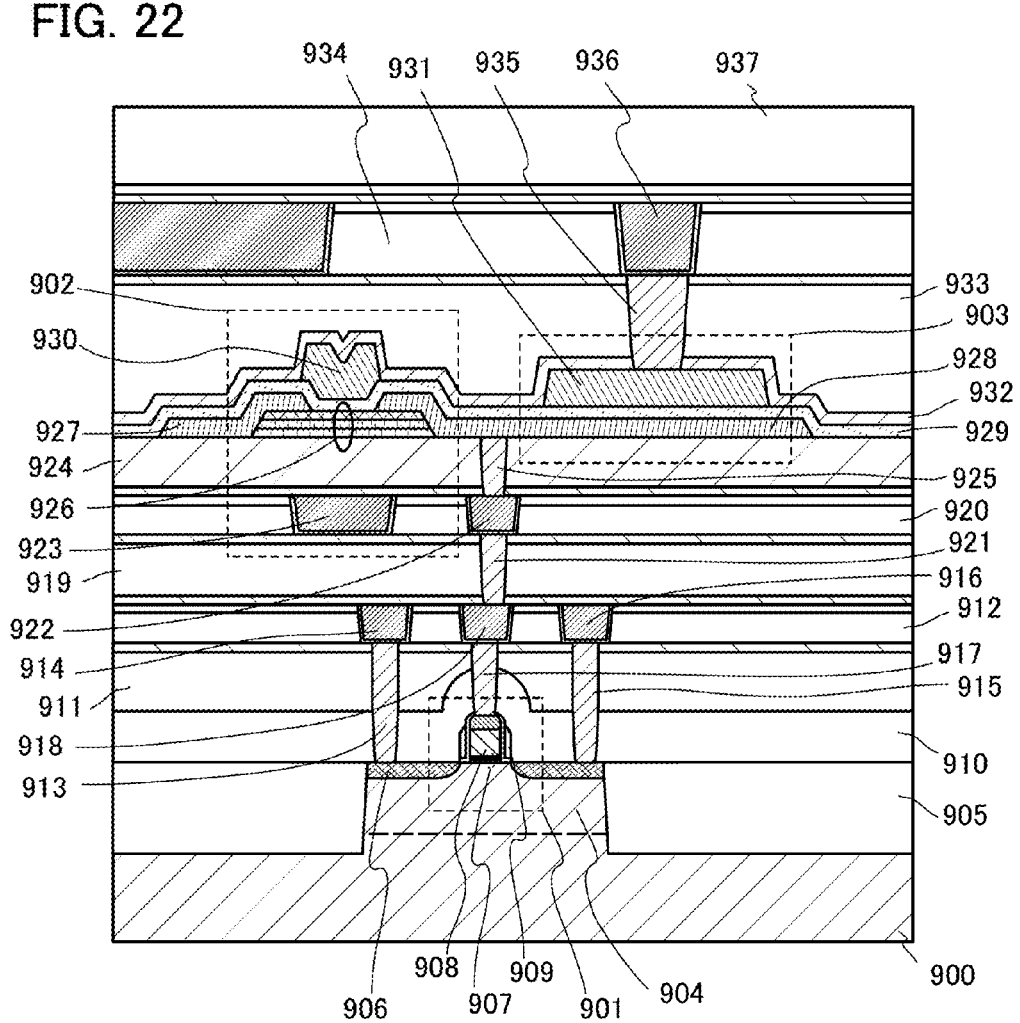
FIG. 22 is a cross-sectional view illustrating one embodiment of a semiconductor device.

In this embodiment, FIG. 22 illustrates, an example of a cross-sectional structure of the switch described in the above embodiment in which an oxide semiconductor is used for a channel formation region of a first transistor 902 and a single crystal silicon wafer is used for a channel formation region of a second transistor 901, and an example of a fabrication method thereof is described below.

Note that a semiconductor material such as germanium, silicon germanium, or silicon carbide as well as single crystal silicon may be used for the second transistor 901 included in the switch. For example, the transistor including silicon can be formed using a silicon thin film which is formed by an SOI method, a silicon thin film which is formed by a vapor deposition method, or the like.

Although only a cross section of the structure of part of the switch is shown in this embodiment, a logic element or another circuit can be configured with this stacked-layer structure.

The second transistor 901 formed using a substrate 900 containing a semiconductor material can be either an n-channel transistor (NMOSFET) or a p-channel transistor (PMOSFET). In the example illustrated in FIG. 22, the second transistor 901 is electrically isolated from other elements by a shallow trench isolation (STI) 905. The use of the STI 905 can reduce generation of a bird's beak, which is caused by a LOCOS element isolation method, in an element isolation region and can reduce the size of the element isolation region. On the other hand, in a semiconductor device that is not required to be structurally miniaturized, the STI 905 is not necessarily formed and an element isolation means such as LOCOS can be used. In the substrate 900 where the second transistor 901 is formed, a well 904 to which an impurity imparting conductivity, such as boron, phosphorus, or arsenic, is added is formed.

The second transistor 901 in FIG. 22 includes a channel formation region in the substrate 900, impurity regions 906 (also referred to as a source region and a drain region) provided such that the channel formation region is positioned therebetween, a gate insulating film 907 provided over the channel formation region, and a gate electrode layer 908 provided over the gate insulating film 907 to overlap with the channel formation region. The gate electrode layer can have a stacked of a gate electrode layer including a first material for increasing processing accuracy and a gate electrode layer including a second material for decreasing the resistance as a wiring. For example, the gate electrode layer can have a stacked structure of crystalline silicon to which an impurity imparting conductivity, such as phosphorus, is added and nickel silicide. Note that the structure is not limited to this, and materials, the number of stacked layers, the shape, or the like can be adjusted as appropriate depending on required specifications.

Contact plugs 913 and 915 are connected to the impurity regions 906 in the substrate 900. Here, the contact plugs 913 and 915 also function as a source electrode and a drain electrode of the second transistor 901 to which the contact plugs 913 and 915 are connected. In addition, impurity regions that are different from the impurity regions 906 may be provided between the impurity regions 906 and the channel formation region. The impurity regions function as LDD regions or extension regions for controlling the distribution of an electric field in the vicinity of the channel formation region, depending on the concentration of an impurity introduced thereto. Sidewall insulating films 909 are provided at side surfaces of the gate electrode layer 908 with an insulating film placed therebetween. By using this insulating film and the sidewall insulating films 909, the LDD regions or extension regions can be formed.

The second transistor 901 is covered with an insulating film 910. The insulating film 910 can function as a protective film and can prevent impurities from being mixed into the channel formation region from the outside. With the insulating film 910 formed by a PE-CVD method using a material such as silicon nitride, hydrogenation can be performed by heat treatment in the case where single crystal silicon is used for the channel formation region. When an insulating film having tensile stress or compressive stress is used as the insulating film 910, distortion can be provided to the semiconductor material used for the channel formation region. By application of tensile stress to a silicon material used for the channel formation region of an n-channel transistor or application of compressive stress to a silicon material used for the channel formation region of a p-channel transistor, the field-effect mobility of the transistor can be increased.

An insulating film 911 is provided over the insulating film 910, and a surface of the insulating film 911 is planarized by CMP. Consequently, element layers can be stacked with high accuracy above a layer including the second transistor 901.

A layer including a capacitor 903 and the first transistor 902 in which an oxide semiconductor film is used for a channel formation region is formed above the layer including the second transistor 901.

The first transistor 902 is a top-gate transistor including a multilayer film 926, a source electrode layer 927, a drain electrode layer 928, a gate insulating film 929, and a gate electrode layer 930. The first transistor 902 has the same structure as the transistor in FIG. 20B in the above embodiment, and thus the above description can be referred to for the first transistor 902. Accordingly, other structures are described below.

As the insulating film 924, an oxygen-release type oxide insulating film which releases oxygen by heat treatment is preferably used.

The oxide insulating film from which part of oxygen is released by heating can diffuse oxygen, by heating, into the oxide semiconductor film which is included in the multilayer film 926 and is formed later, because oxygen is released from the oxide insulating film by heating. For example, in the case where a silicon oxide film is used as the insulating film 924, the composition formula is $SiO_{2+\alpha}$ ($\alpha>0$). With the insulating film 924 thus formed, oxygen can be supplied to the oxide semiconductor film, whereby oxygen vacancies in the oxide semiconductor film can be compensated.

Further, the insulating film 924 can be formed by a sputtering method, plasma PE-CVD method, or the like. For example, in the case where the insulating film 924 is formed by a PE-CVD method, hydrogen or water derived from a source gas is sometimes mixed into the insulating film 924. Therefore, heat treatment is preferably performed as dehydrogenation or dehydration after the insulating film 924 is formed by a PE-CVD method. The heat treatment is preferably performed at a temperature at which hydrogen or water is released from the insulating film 924. An electric furnace, an RTA apparatus, or the like can be used for the heat treatment. With the use of an RTA apparatus, the heat treatment can be performed at a temperature of higher than or equal to the strain point of the substrate if the heating time is short. Thus, time during which hydrogen or water is released from the insulating film 924 can be shortened.

By the heat treatment, dehydrogenation or dehydration can be performed on the insulating film 924 and thus, diffusion of hydrogen or water to the oxide semiconductor film in the multilayer film 926 to be formed later can be prevented.

In the case of introducing oxygen to the insulating film 924, the amount of oxygen released by heating can be increased. Oxygen can be introduced to the insulating film 924 by an ion implantation method, an ion doping method, plasma treatment, or the like.

The multilayer film 926 was formed in such a manner that a first oxide layer was formed to be in contact with the insulating film 924, an oxide semiconductor was formed in contact with the first oxide layer, and a second oxide layer was formed in contact with the oxide semiconductor layer.

Note that each of the gate electrode layer 930 and the upper electrode layer 931 has a thickness of 10 nm to 400 nm, preferably 100 nm to 300 nm. In this embodiment, the gate electrode layer 930 and the upper electrode layer 931 are formed in the following manner: a 135-nm-thick tungsten film is stacked over a 30-nm-thick tantalum nitride film by a sputtering method to form a conductive film for the gate electrode, and then, the conductive film is processed (patterned) into a desired shape by etching.

Note that a resist mask may be formed by an inkjet method. Formation of the resist mask by an inkjet method needs no photomask; thus, manufacturing cost can be reduced.

The first transistor 902 includes a backgate electrode layer 923. With the backgate electrode layer 923, the first transistor 902 can serve as a normally-off transistor. For example, when the potential of the backgate electrode layer 923 is set at GND or a fixed potential, the threshold voltage of the first transistor 902 can shift further in the positive direction, which leads to the formation of a normally-off transistor. As described above, the first transistor 902 may be a multi-gate transistor including a plurality channel formation regions.

In order to electrically connect the second transistor 901, the first transistor 902, and the capacitor 903 to form an electric circuit, one or more wiring layers for connecting these elements are stacked between layers and on the upper layer.

In FIG. 22, one of the source and the drain of the second transistor 901 is electrically connected to a wiring layer 914 via the contact plug 913. The wiring layer 914 is electrically connected to an output terminal of a logic element. The other of the source and the drain of the second transistor 901 is electrically connected to a wiring layer 916 via the contact plug 915.

The wiring layer 916 is electrically connected to an input terminal of another logic element. The gate of the second transistor 901 is electrically connected to the drain electrode layer 928 of the first transistor 902 via a contact plug 917, a wiring layer 918, a contact plug 921, a wiring layer 922, and a contact plug 925.

The drain electrode layer 928 is extended in the right direction in FIG. 22 and functions as a lower electrode layer of the capacitor 903. The gate insulating film 929 of the first transistor 902 is provided over the drain electrode layer 928. In a region where the capacitor 903 is formed, the gate insulating film 929 functions as an interelectrode dielectric film of the capacitor 903. The upper electrode layer 931 is provided over the interelectrode dielectric film and electrically connected to a wiring layer 936 through a contact plug 935.

The wiring layers 914, 916, 918, 922, and 936 and the backgate electrode layer 923 are embedded in insulating films. These wiring layers and the like are preferably formed using a low-resistance conductive material such as copper or aluminum. Alternatively, the wiring layers can be formed using graphene formed by a PE-CVD method as a conductive material. Graphene is a one-atom thick sheet of $sp^2$-bonded carbon molecules or a stack of 2 to 100 sheets of the carbon molecules. Examples of a method of manufacturing such graphene are a thermal CVD method by which graphene is formed on a metal catalyst; and a PE-CVD method by which graphene is formed from methane, without using a catalyst, by plasma generated locally with ultraviolet light irradiation.

By using such a low-resistance conductive material, RC delay of signals transmitted through the wiring layers can be reduced. When copper is used for the wiring layers, a barrier film is formed in order to prevent copper from diffusing into the channel formation region. The barrier films can each be formed using a film of tantalum nitride, a stacked-layer film of tantalum nitride and tantalum, a film of titanium nitride, a stacked-layer film of titanium nitride and titanium, or the like for example, but are not limited to the films of these materials as long as their function of preventing diffusion of a wiring material and their adhesion to the wiring material, a base film, or the like are secured. The barrier film may be formed as a layer that is independently formed, or may be formed in such a manner that a material of the barrier film is included in a wiring material and precipitated by heat treatment on the inner wall of an opening provided in an insulating film.

The insulating films 911, 912, 919, 920, 933, and 934 can be formed using an insulator such as silicon oxide, silicon oxynitride, silicon nitride oxide, borophosphosilicate glass (BPSG), phosphosilicate glass (PSG), silicon oxide to which carbon is added (SiOC), silicon oxide to which fluorine is added (SiOF), silicon oxide made from $Si(OC_2H_5)_4$ (tetraethylorthosilicate: TEOS), hydrogen silsesquioxane (HSQ), methyl silsesquioxane (MSQ), organosilicate glass (OSG), or an organic polymer-based material. In particular, in the case of advancing miniaturization of the semiconductor device, parasitic capacitance between wirings is significant and signal delay is increased. Therefore, the relative permittivity of silicon oxide (k=4.0 to 4.5) is too high, and it is preferable to use a material with k=3.0 or less. In addition, since CMP treatment is performed after the wiring is embedded in the insulating film, the insulating film needs to have high mechanical strength. As long as their mechanical strength can be secured, the interlayer insulating films can be made porous to have a lower dielectric constant. The insulating films are formed by sputtering, CVD, a coating method including spin coating (also referred to as spin on glass (SOG)), or the like.

An insulating film functioning as an etching stopper for planarization treatment by CMP or the like that is performed after the wiring material is embedded in the insulating films 911, 912, 919, 920, 933, and 934 may be additionally provided.

Barrier films are provided over the wiring layers 914, 916, 918, 922, and 936 and the backgate electrode layer 923, and a protective film is provided over each barrier film. The barrier film is provided in order to prevent diffusion of the wiring material such as copper. The barrier film can be formed using an insulating material such as silicon nitride, SiC, or SiBON. Note that a thick barrier film increases capacitance between wirings; therefore, a material having a barrier property and a low dielectric constant is preferably used.

Each of the contact plugs 913, 915, 917, 921, 925, and 935 is formed in such a manner that an opening (a via hole) with a high aspect ratio is formed in the insulating film and is filled with a conductive material such as tungsten. The opening is preferably formed by highly anisotropic dry etching. In particular, a reactive ion etching (RIE) method is preferably used. The inner wall of the opening is covered with a barrier film (diffusion prevention film) formed of a titanium film, a titanium nitride film, a stack of such films, or the like, and a material such as tungsten or polysilicon doped with phosphorus or the like fills the opening. For example, tungsten is embedded in the via hole by blanket CVD, and an upper surface of the contact plug is planarized by CMP.

A protective insulating film 937 is provided in the top layer and prevents moisture and contaminant from being mixed into the semiconductor device from the outside. The protective insulating film 937 can have a single-layer structure or a stacked-layer structure using a material such as silicon nitride, silicon oxynitride, or silicon nitride oxide.

The semiconductor device has the above-described structure in which a transistor that includes a first semiconductor material and is capable of operating at high speed is used in combination with a transistor that includes a second semiconductor material and has significantly small off-state current, whereby it is possible to fabricate a microcomputer that is capable of operating with low power.

This embodiment can be combined with any of the other embodiments as appropriate.

EXAMPLE 1

Figure 10:
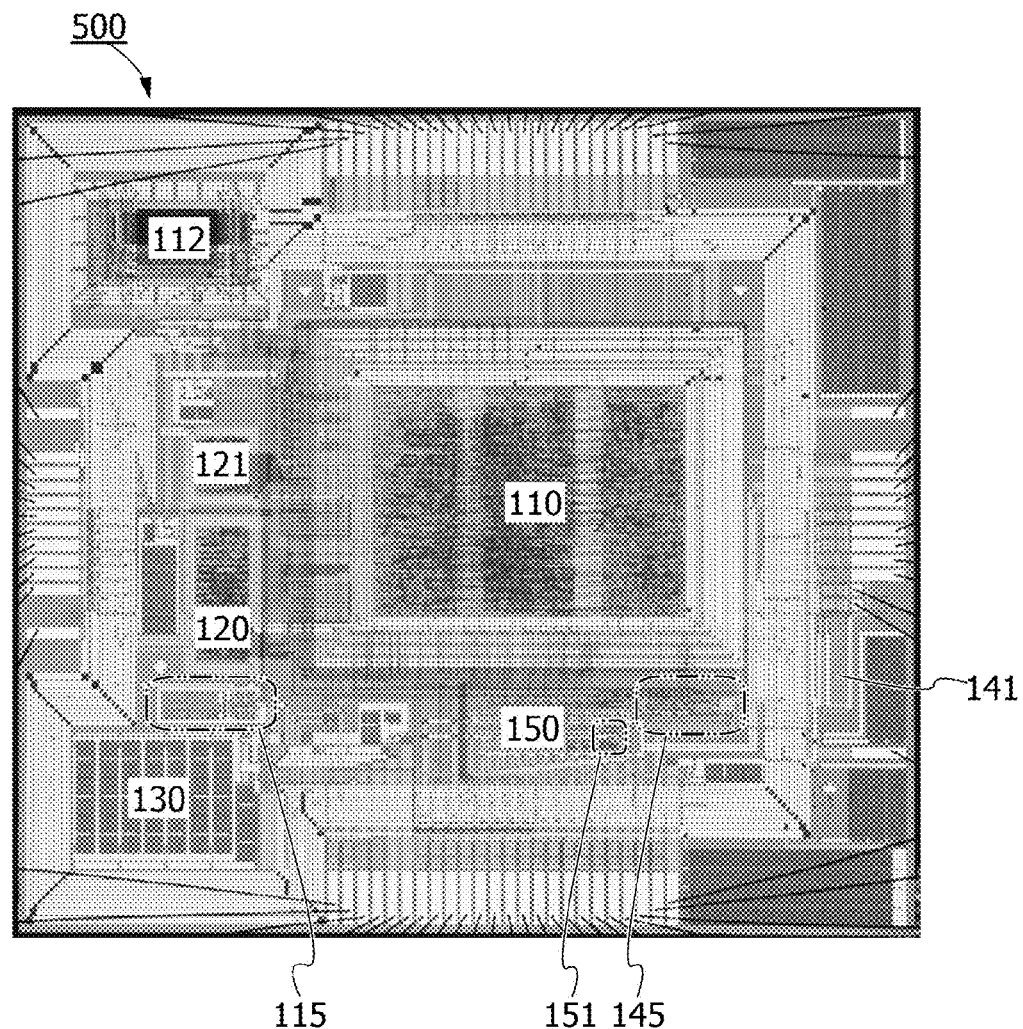
FIG. 10 is an optical micrograph of a microcontroller.

FIG. 10 is an optical micrograph of a microcontroller 500 that is fabricated using a silicon substrate. The microcontroller 500 has circuit blocks and functions similar to those of the microcontroller 190 illustrated in FIG. 9. Note that some of the reference numerals attached to the circuit blocks in FIG. 9 are used in FIG. 10.

The process technology of the microcontroller 500 in FIG. 10 is as follows: the 0.35 µm process technology is used for the transistor formed using silicon, and the 0.8 µm process technology is used for the transistor formed using an oxide semiconductor layer, like the microcontroller 100 in FIG. 2. The size of the microcontroller 500 is 11.0 mm×12.0 mm.

It is confirmed that data is stored in the register 185 in the CPU 110, when the operation mode of the microcontroller 500 is shifted from Active mode to the Noff2 mode with no power supply. The result is described below with reference to signal waveform diagrams in FIG. 23 and FIGS. 24A and 24B.

To confirm if data is stored or not is performed as follows: data is stored in a HL register in the volatile memory of the register 185 in Active mode and the data stored in the HL register is read out after the operation mode returned to Active mode from Noff2 mode with no power supply.

Figure 23:
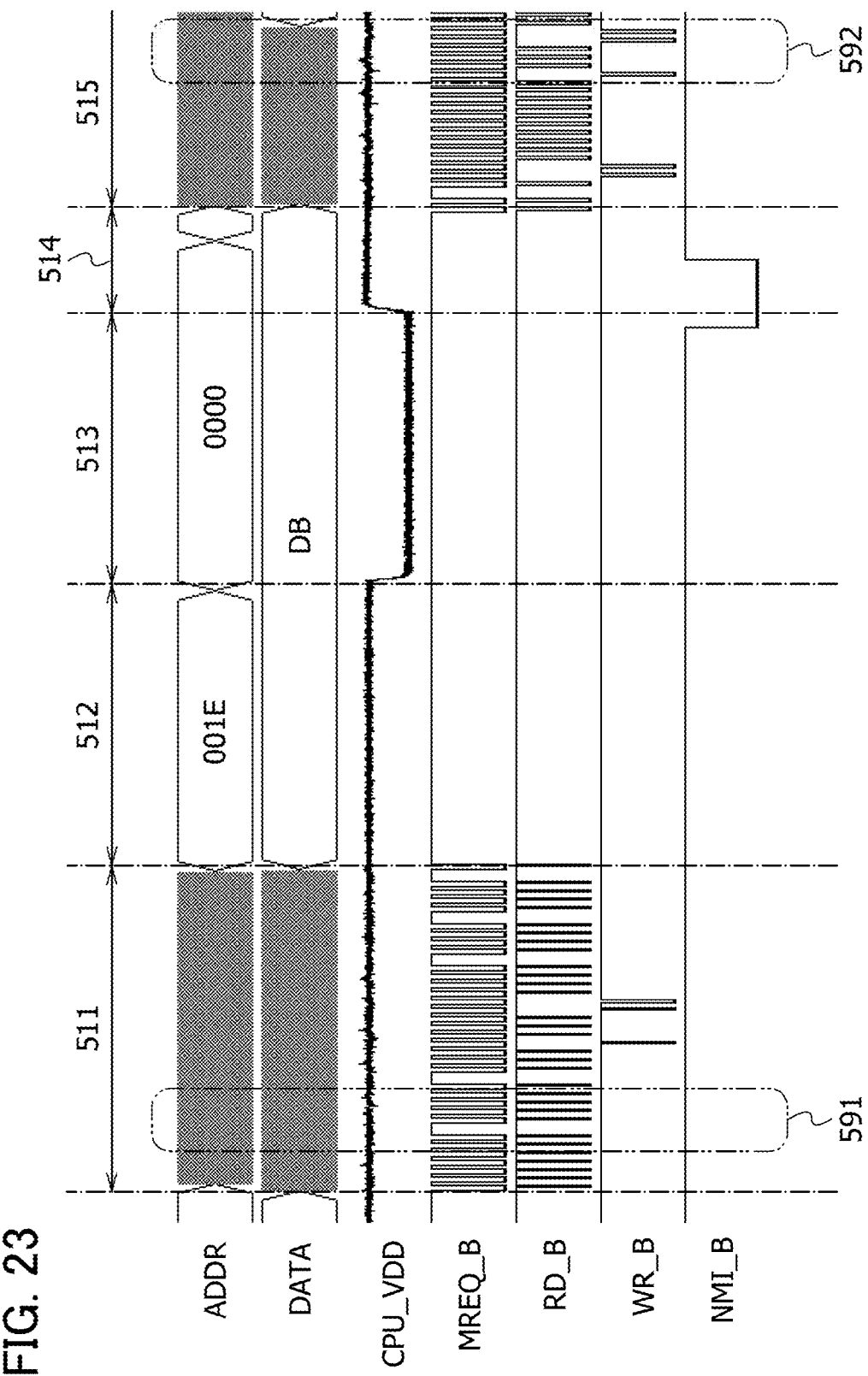
FIG. 23 is a signal waveform diagram of input-output terminals of a microcontroller, which is measured for operation verification of a register in a CPU.
Figures 24A, 24B:
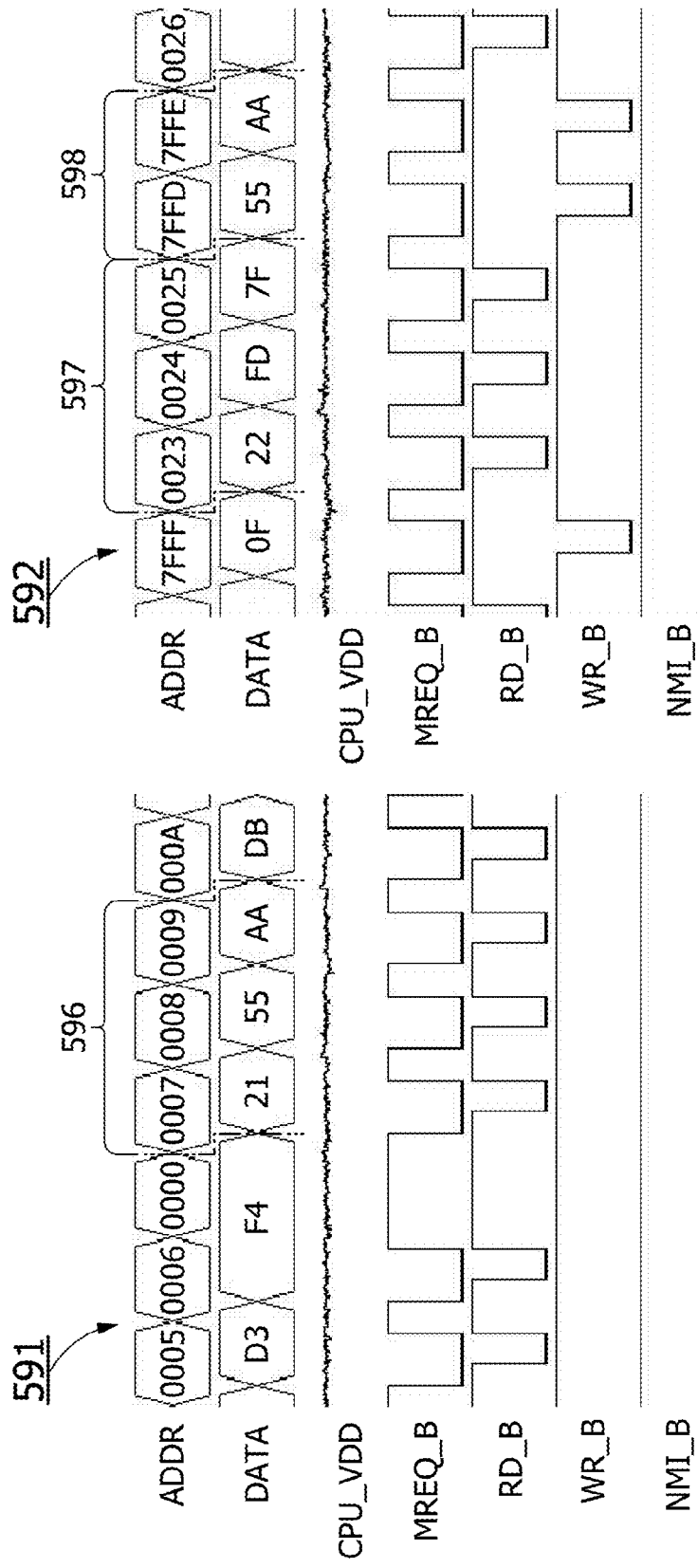
FIGS. 24A and 24B are enlarged views of the signal waveform diagram in FIG. 23, which are signal waveform diagrams during operation in Active mode.

FIG. 23, FIG. 24A, and FIG. 24B show results obtained by the following manner: a signal generated by a pattern generator module TLA7PG2 produced by Tektronix, Inc. is input into the microcontroller 500, and a signal generated at the input-output terminal (connection terminal) of the microcontroller 500 is measured by a logic analyzer TLA7AA2 produced by Tektronix, Inc. "ADDR", "DATA", "CPU_VDD", "MREQ_B", "RD_B", "WR_B", and "NMI_B" shown in FIG. 23, FIG. 24A, and FIG. 24B are names of the input-output terminals measured by the logic analyzer.

From the ADDR terminal, the number of steps calculated by the CPU 110 (the value is changed sequentially depending on the number of processing) or an address accessed by the CPU 110 can be detected. In addition, from the DATA terminal, an instruction code executed by the CPU 110 in the microcontroller 500 or data input or output by the microcontroller 500 can be detected. In addition, from the CPU_VDD terminal, a potential of VDD supplied to the CPU 110 can be detected.

Further, from the MREQ_B terminal, a signal for determining access to an external memory can be detected. When the MREQ_B terminal has a low potential, access to the external memory is allowed, and when the MREQ_B terminal has a high potential, access to the external memory is denied. In addition, when the MREQ_B terminal has a low potential and the RD_B terminal has a low potential, readout of data from the external memory is allowed, and when the MREQ_B terminal has a low potential and the WR_B terminal has a low potential, writing of data to the external memory is allowed.

In addition, from the NMI_B terminal, a non-maskable interrupt signal can be detected. Although a high potential is usually supplied to the NMI_B terminal, when a low potential is supplied to the NMI_B terminal, interrupt processing is executed.

Note that the "high potential" means a potential higher than a reference potential and the "low potential" means a potential lower than the reference potential. In the case where the reference potential is 0 V, the high potential can be called a positive potential and the low potential can be called a negative potential. Alternatively, one of the high potential and the low potential can be equal to the reference potential.

In addition, periods 511 and 515 illustrated in FIG. 23 are periods in which the microcontroller 500 operates in Active mode. A period 512 is a backup process period in which data is transferred from the volatile memory to the nonvolatile memory in each register, before the operation mode of the microcontroller 500 is shifted from Active mode to Noff2 mode. A period 513 is a period in which the microcontroller 500 operates in Noff2 mode. A period 514 is a return process period in which data is returned back to the volatile memory from the nonvolatile memory in each register, before the operation mode of the microcontroller 500 returns from Noff2 mode to Active mode.

FIG. 24A illustrates signals in a period 591 which are partly-enlarged signals of the signals measured in the period 511 in Active mode operation. In addition, FIG. 24B illustrates signals in a period 592 which are partly-enlarged signals of the signals measured in the period 515 in Active mode operation.

In the period 511 (Active mode period), data "AA55" is stored in the HL register that is a part of the register 185. This process is called as a process 596 (see FIG. 24A). In the process 596, "21" detected from the DATA terminal when the ADDR terminal is "0007" is an instruction code for storing data in the HL register. In addition, "55" and "AA" that are subsequently detected from the DATA terminal are data stored in the HL register. Note that the microcontroller 500 processed data in terms of bytes, and thus "55" is detected as the low byte first and then "AA" is detected as the high byte (see FIG. 23 and FIG. 24A).

Next, operation verification of the microcontroller 500 in the shift from Active mode to Noff2 mode illustrated in FIG. 4 is described.

For the operation verification, a signal for switching the operation mode to Noff2 mode is input into the microcontroller 500. When the signal for switching the operation mode to Noff2 mode is input into the microcontroller 500, the microcontroller 500 transfers data that is needed to be stored after power supply stop, of data stored in the volatile memories of the registers (184 to 187), to the nonvolatile memories and the data is stored in the nonvolatile memories (period 512). At this time, the data "AA55" stored in HL register that is one of the volatile memories is transferred to and stored in the nonvolatile memory.

After the microcontroller 500 finishes data transfer and data storage to the nonvolatile storage portion, the microcontroller 500 allows the power gate unit 130 to operate so as to stop power supply to each circuit block, and thereby the operation mode becomes Noff2 mode (period 513). In the period 513 in FIG. 23, power supply to the CPU_VDD terminal is stopped.

Next, operation verification of the microcontroller 500 in the shift from Noff2 mode to Active mode as illustrated in FIG. 5 is described.

The return from Noff2 mode to Active mode is started by supply of a low potential to the NMI_B terminal. When the low potential is supplied to the NMI_B terminal, the power gate unit 130 operates to restart power supply to each circuit block. Then, data stored in the nonvolatile memory is transferred to and stored in the volatile memory. At this time, the data "AA55" stored in the nonvolatile memory is transferred to and stored again in the HL register (period 514).

After return of data from the nonvolatile memory to the volatile memory is finished, the microcontroller 500 operates again in Active mode in response to the returned data (period 515).

Then, in the period 515, processes 597 and 598 are conducted so that data returned in the HL register is confirmed.

During the process 597, "22" detected from the "DATA" terminal when "0023" is detected from the "ADDR" terminal is an instruction code for transferring data stored in HL register to the external memory. Further, "FD" and "7F" that are subsequently detected from the "DATA" terminal mean an address "7FFD" of the external memory that is an address to which data is to be transferred (see FIG. 23 and FIG. 24B).

The microcontroller 500 transfers data in the HL register to the external memory in the process 598 following the process 597. As described above, the microcontroller 500 processes data in terms of bytes. In addition, the external memory stores one byte of data per address. Thus, the microcontroller 500 that have received an instruction of the process 597 transfers data as the low byte in HL register to the address "7FFD" in the external memory, and then transfers data as the high byte to an address "7FFE" in the external memory in the process 598.

As shown in FIG. 24B, in the process 598, the microcontroller 500 outputs "7FFD" to the ADDR terminal, and outputs "55" to the DATA terminal as data of the low byte in the HL register. At this time, a low potential is supplied to the MREQ_B terminal and the WR_B terminal, so that "55" is written into the address "7FFD" in the external memory.

Then, as shown in FIG. 24B, the microcontroller 500 outputs "7FFE" to the ADDR terminal, and outputs "AA" as data of the high byte in the HL register to the DATA terminal. At this time, a low potential is supplied to the MREQ_B terminal and the WR_B terminal, so that "AA" is written into the address "7FFE" in the external memory.

The measurement results of the ADDR terminal and the DATA terminal in the processes 597 and 598 show that data "AA55" is stored in the HL register in the period 515. Thus, it is confirmed that the microcontroller 500 holds data in the register 185 even when the microcontroller 500 is switched from Active mode to Noff2 mode with no power supply. In addition, it is also confirmed that the microcontroller 500 operated normally after the microcontroller 500 returned from Noff2 mode to Active mode.

In addition, it is also confirmed that necessary data is backed up in the nonvolatile memory of the register before power supply is stopped. In other words, the microcontroller 500 can start to execute processing for power supply stop before processing by the CPU finishes; therefore, flexibility in timing for power supply stop can be increased. It is also confirmed that the microcontroller can return from the low power consumption mode to the normal operation mode rapidly.

EXPLANATION OF REFERENCE

MCLK, TCLK: clock signal; T0IRQ, P0IRQ, C0IRQ, NT, NMI: interrupt signal; 100, 190, 500: microcontroller; 101 to 104: unit; 110: CPU; 111: bus bridge; 112: RAM; 113: memory interface; 115: clock generation circuit; 120: controller; 121: interrupt controller; 122, 146, 152 I/O: interface; 130: power gate unit; 131, 132: switch circuit; 140: clock generation circuit; 141: crystal oscillation circuit; 142: oscillator; 143: quartz crystal unit; 145: timer circuit; 150: I/O port; 151: comparator; 161 to 163: bus line; 164: data bus line; 170 to 176: connection terminal; 180, 183 to 187: register; FN: node; 200: register; 201, 202: memory circuit; 203, 204, 207: transistor; 205: capacitor; 206: transmission gate; 208, 209: inverter; BL: bit line; RWL: word line; WWL; word line; 400: memory cell; 401 to 403: transistor; 404: capacitor; 405: power supply line; 511 to 515, 591, 592: period; 596 to 598: process; 800: semiconductor substrate; 801: element isolation insulating film; 802: p-well; 803, 807: impurity region; 804, 808: low concentration impurity region; 805, 809: gate electrode; 806, 831: gate insulating film; 810 to 813, 817 to 820, 822, 823: wiring; 816, 821, 824, 844, 845: insulating film; 830: oxide semiconductor layer; 832, 833, 846: conductive film; 834: gate electrode; 835, 836: sidewall; 860 to 862: transistor.

This application is based on Japanese Patent Application serial no. 2012-230352 filed with Japan Patent Office on Oct. 17, 2012, the entire contents of which are hereby incorporated by reference.

The invention claimed is:
1. A microcontroller comprising:
a CPU;
a controller;
a timer circuit;
a first register in the CPU;
a second register electrically connected to the timer circuit; and
a power gate configured to supply power to the CPU, the timer circuit, the first register and the second register,
wherein the microcontroller is configured to be in an operation mode,
wherein the operation mode includes at least:
a first mode, the first mode being a mode where the CPU, the timer circuit, the first register, the second register and the controller operate;
a second mode, the second mode being a mode where the timer circuit, the second register and the controller operate; and
a third mode, the third mode being a mode where the controller operates,
wherein the microcontroller is configured to shift from the first mode to one of the second mode and the third mode by an instruction of the CPU,
wherein the microcontroller is configured to shift from the second mode to the first mode by the controller in accordance with a first signal supplied from the timer circuit,
wherein the microcontroller is configured to shift from the third mode to the first mode by the controller in accordance with a second signal supplied to the controller, and
wherein the first register and the second register each comprises:
a first volatile memory; and
a first nonvolatile memory comprising a first transistor, wherein a channel formation region of the first transistor comprises a first multilayer film,
wherein the first multilayer film has a structure in which a first oxide layer, an oxide semiconductor layer, and a second oxide layer are stacked in number order, and
wherein the first oxide layer has a larger energy gap than the oxide semiconductor layer.
2. The microcontroller according to claim 1,
wherein the CPU and the first register do not operate in the second mode, and
wherein the CPU, the first register, the timer circuit, and the second register do not operate in the third mode.
3. The microcontroller according to claim 1, further comprising:
an I/O port;
a third register electrically connected to the I/O port;
a comparator; and
a fourth register electrically connected to the comparator,
wherein the I/O port, the third register, the comparator, and the fourth register operate in the first mode, and do not operate in the second and third modes.
4. The microcontroller according to claim 1, further comprising:
an interrupt controller; and
a fifth register electrically connected to the interrupt controller,
wherein the interrupt controller and the fifth register operate in the first mode, and do not operate in the second and third modes.
5. The microcontroller according to claim 1, further comprising:
an interrupt controller; and
a fifth register electrically connected to the interrupt controller, wherein the interrupt controller and the fifth register operate in the first mode, and do not operate in the second and third modes, and wherein the fifth register comprises:
a second volatile memory; and
a second nonvolatile memory comprising a second transistor, wherein a channel formation region of the second transistor comprises a second multilayer film.

6. The microcontroller according to claim 1, further comprising:
a RAM electrically connected to the CPU,
wherein the RAM comprising a third transistor, and
wherein a channel formation region of the third transistor comprises a third multilayer film.

7. The microcontroller according to claim 1, wherein the timer circuit is configured to output the first signal at regular intervals.

8. The microcontroller according to claim 1,
wherein the first nonvolatile memory is configured to back up a data stored in the first volatile memory before power supply is stopped by the power gate, and
wherein the data backed up in the first nonvolatile memory is written into the first volatile memory in a case where power supply is started again by the power gate.

9. The microcontroller according to claim 1, wherein the first multilayer film comprises indium, gallium, and zinc.

10. The microcontroller according to claim 1,
wherein the first oxide layer or the second oxide layer comprises indium more than or equal to 1.5 times of the amount of the oxide semiconductor layer interposed between the first oxide layer and the second oxide layer.

11. A microcontroller comprising:
a CPU;
a controller;
a timer circuit;
a first register in the CPU;
a second register electrically connected to the timer circuit; and
a power gate configured to supply power to the CPU, the timer circuit, the first register and the second register,
wherein the microcontroller is configured to be in an operation mode,
wherein the operation mode includes at least:
a first mode, the first mode being a mode where the CPU, the timer circuit, the first register, the second register and the controller operate;
a second mode, the second mode being a mode where the timer circuit, the second register and the controller operate; and
a third mode, the third mode being a mode where the controller operates,
wherein the microcontroller is configured to shift from the first mode to one of the second mode and the third mode by an instruction of the CPU,
wherein the microcontroller is configured to shift from the second mode to the first mode by the controller in accordance with a first signal supplied from the timer circuit,
wherein the microcontroller is configured to shift from the third mode to the first mode by the controller in accordance with a second signal supplied to the controller, wherein the first register and the second register each comprises:
a first volatile memory; and
a first nonvolatile memory comprising a first transistor and a fourth transistor,
wherein a channel formation region of the first transistor comprises a first multilayer film, and wherein a channel formation region of the fourth transistor comprises single crystal silicon,
wherein the first multilayer film has a structure in which a first oxide layer, an oxide semiconductor layer, and a second oxide layer are stacked in number order, and
wherein the first oxide layer has a larger energy gap than the oxide semiconductor layer.

12. The microcontroller according to claim 11,
wherein the CPU and the first register do not operate in the second mode, and
wherein the CPU, the first register, the timer circuit and the second register do not operate in the third mode.

13. The microcontroller according to claim 11, further comprising:
an I/O port;
a third register electrically connected to the I/O port;
a comparator; and
a fourth register electrically connected to the comparator,
wherein the I/O port, the third register, the comparator, and the fourth register operate in the first mode, and do not operate in the second and third modes.

14. The microcontroller according to claim 11, further comprising:
an interrupt controller; and
a fifth register electrically connected to the interrupt controller,
wherein the interrupt controller and the fifth register operate in the first mode, and do not operate in the second and third modes.

15. The microcontroller according to claim 11, further comprising:
an interrupt controller; and
a fifth register electrically connected to the interrupt controller,
wherein the interrupt controller and the fifth register operate in the first mode, and do not operate in the second and third modes, and
wherein the fifth register comprises:
a second volatile memory; and
a second nonvolatile memory comprising a second transistor, wherein a channel formation region of the second transistor comprises a second multilayer film.

16. The microcontroller according to claim 11, further comprising:
a RAM electrically connected to the CPU,
wherein the RAM comprising a third transistor, and
wherein a channel formation region of the third transistor comprises a third multilayer film.

17. The microcontroller according to claim 11, wherein the timer circuit is configured to output the first signal at regular intervals.

18. The microcontroller according to claim 11,
wherein the first nonvolatile memory is configured to back up a data stored in the first volatile memory before power supply is stopped by the power gate, and
wherein the data backed up in the first nonvolatile memory is written into the first volatile memory in a case where power supply is started again by the power gate.

19. The microcontroller according to claim 11, wherein the first multilayer film comprises indium, gallium, and zinc.

20. The microcontroller according to claim 11, wherein the first oxide layer or the second oxide layer comprises indium more than or equal to 1.5 times of the amount of the oxide semiconductor layer interposed between the first oxide layer and the second oxide layer.

* * * * *